US008311773B2

(12) United States Patent
Spiesberger

(10) Patent No.: US 8,311,773 B2
(45) Date of Patent: Nov. 13, 2012

(54) METHODS AND APPARATUS FOR COMPUTER-ESTIMATING A FUNCTION OF A PROBABILITY DISTRIBUTION OF A VARIABLE

(75) Inventor: John Louis Spiesberger, Radnor, PA (US)

(73) Assignee: Scientific Innovations, Inc., Radnor, PA (US)

( * ) Notice: Subject to any disclaimer, the term of this patent is extended or adjusted under 35 U.S.C. 154(b) by 0 days.

(21) Appl. No.: 13/220,390

(22) Filed: Aug. 29, 2011

(65) Prior Publication Data

US 2012/0004889 A1    Jan. 5, 2012

Related U.S. Application Data

(60) Continuation of application No. 12/769,450, filed on Apr. 28, 2010, now Pat. No. 8,010,314, which is a division of application No. 12/104,275, filed on Apr. 16, 2008, now abandoned, which is a continuation of application No. 11/803,235, filed on May 14, 2007, now Pat. No. 7,363,191, which is a division of application No. 10/419,712, filed on Apr. 20, 2003, now Pat. No. 7,219,032.

(60) Provisional application No. 60/373,934, filed on Apr. 20, 2002, provisional application No. 60/428,994, filed on Nov. 25, 2002, provisional application No. 60/451,523, filed on Mar. 3, 2003.

(51) Int. Cl.
*G06F 17/18* (2006.01)

(52) U.S. Cl. ....................................................... 702/181

(58) Field of Classification Search .................. 702/150, 702/181
See application file for complete search history.

(56) References Cited

U.S. PATENT DOCUMENTS

| | | | |
|---|---|---|---|
| 4,995,011 A | 2/1991 | Spiesberger | |
| 5,323,322 A | 6/1994 | Mueller et al. | |
| 5,548,539 A * | 8/1996 | Vlach et al. | 703/6 |
| 6,028,823 A | 2/2000 | Vincent et al. | |
| 6,160,758 A | 12/2000 | Spiesberger | |
| 6,388,948 B1 | 5/2002 | Vincent et al. | |
| 6,961,743 B2 | 11/2005 | Walster et al. | |
| 7,099,796 B2 | 8/2006 | Hamza | |
| 2004/0015531 A1 | 1/2004 | Walster et al. | |

OTHER PUBLICATIONS

Chestnut, Emitter location accuracy using TDOA and differential Doppler, Mar. 1982, 214-218, vol. AES-18, No. 2, IEEE Transactions on Aerospace and Electronic Systems.

Dailey and Bell, A method for GPS positioning, IEEE Transactions on Aerospace and Electronic Systems, Jul. 1996, 1148-1154, vol. 32, No. 3.

(Continued)

*Primary Examiner* — Stephen Cherry
(74) *Attorney, Agent, or Firm* — Louis J. Hoffman

(57) ABSTRACT

Robust methods are developed to provide bounds and probability distributions for the locations of objects as well as for associated variables that affect the accuracy of the location such as the positions of stations, the measurements, and errors in the speed of signal propagation. Realistic prior probability distributions of pertinent variables are permitted for the locations of stations, the speed of signal propagation, and errors in measurements. Bounds and probability distributions can be obtained without making any assumption of linearity. The sequential methods used for location are applicable in other applications in which a function of the probability distribution is desired for variables that are related to measurements.

3 Claims, 19 Drawing Sheets

OTHER PUBLICATIONS

Figure 1:
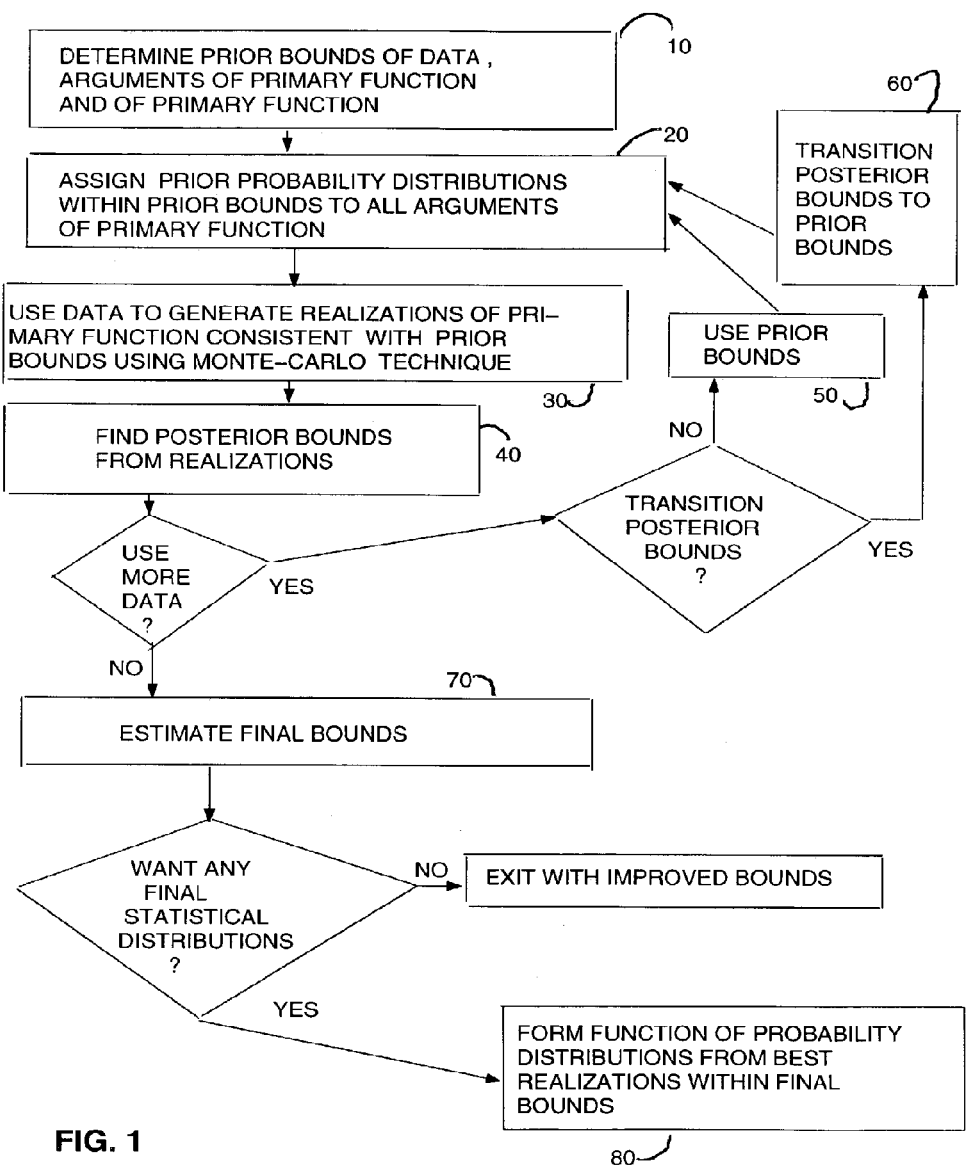

Wahlberg, Mohl, and Madsen, Estimating source position accuracy of a large-aperture hydrophone array for bioacoustics, J. Acoustical Society of America, Jan. 2001, 397-406, vol. 109(1).
Abel, A divide and conquer approach to least-squares estimation, IEEE Transactions on Aerospace and Electronic Systems, Mar. 1990, 423-427, vol. 26, No 2.
Vincent, Models, algorithms, and measurements for underwater acoustic positioning, Univ. Rhode Island Ph.D. thesis, 2001, p. 5-8.
Schmidt, A new approach to geometry of range difference location, IEEE Transactions on Aerospace and Electronic Systems, Nov. 1972, 821-835, vol. AES-8, No. 6.
Gelb, Applied Optimal Estimation, 14'th printing, 1996, ISBN 0-262-57048-3, 105-107, M.I.T. Press, Cambridge, MA.
Dosso and Collison, Acoustic tracking of a freely drifting sono-buoy field, Journal Acoustical Society of Americal, May 2002, vol. 111 (5), 2166-2177.
Wormley, GPS errors and estimating your receiver's accuracy, from http://www.edu-observatory.org/gps/check_accuracy.html, 2003.
Spiesberger, Hyperbolic location errors due to insufficient numbers of receivers, Journal of the Acoustical Society of America, Jun. 2001 3076-3079, vol. 109 (6).
Spiesberger, Probability density functions for hyperbolic and iso-diachronic locations, Journal of the Acoustical Society of America, Dec. 2002, 3046-3052, vol. 112(6).
Spiesberger, Locating animals from their sounds and tomography of the atmosphere: Experimental demonstration, Journal of the Acoustical Society of America, Aug. 1999, 837-846, vol. 106(2).
Eberly, Intersection of ellipses, from http://www.magic-software.com, Oct. 10, 2000, p. 1-4, Magic Software, Inc.
Closed-form expression, from http://en.wikipedia.org/wiki/Closed_form_solution, Apr. 12, 2006. 1 page.
Sun Microsystems, Interval Arithmetic in High Performance Technical Computing, Sep. 2002, white paper, from http://www.sun.com/processors/whitepapers/ia12_wp.pdf, 22 pages.
Ashokaraj, Tsourdos, Silson, and White, Sensor Based Robot Localisation and Navigation: Using Interval Analysis and Extended Kalman Filter, Control Conference, 2004, 5th Asian, vol. 2, Jul. 20-23, pp. 1086-1093, IEEE Conference.
Ashokaraj, Tsourdos, White, and Silson, Robot Localisation using Interval Analysis, Sensors, 2003, Proceedings of IEEE, vol. 1, Oct. 22-24 pp. 30-35.
Ashokaraj, Tsourdos, Silson, White, and Economou, Feature Based Robot Navigation: Using Fuzzy Logic and Interval Analysis, Fuzzy Systems, 2004, Proceedings. 2004 IEEE International Conference on, vol. 3, pp. 1461-1466, Jul. 25-29.
Ashokaraj, Tsourdos, Silson, and White, Sensor Based Localisation and Navigation: Using Interval Analysis and Unscented Kalman Filter, Proceedings of 2004 IEEE/RSJ International Conference on Intelligent Robots and Systems, Sep. 28-Oct. 2, 2004, pp. 7-12.
Walster, Interval Arithmetic: The New Floating-Point Arithmetic Paradigm, from www.math.uu.se/~warwick/summer04/material/reading/week2/f90-support-clean.ps, 2004, pp. 1-8.
Kieffer, Jaulin, and Walter, Robust autonomous robot localization using interval analysis, Reliable Computing, vol. 6, pp. 337-362, 2000. Kluwer Academic Publishers, Netherlands.
Alt, Lamotte, and Kreinovich, Random interval arithmetic is closer to common sense: An observation, 2004, pp. 1-5, from http://www.cs.utep.edu/vladik/2004/tr04-33.pdf.
Joslyn and Kreinovich, Convergence properties of an interval probabilistic approach to system reliability estimation, Int. J. General Systems, v. 34:4, pp. 465-482, 2005.
Berleant and Zhang, Representation and problem solving with distbution envelope determination (DEnv), Reliability Engineering and System Safety, vol. 85, pp. 153-168, 2004.
Ferson, Ginzburg, Kreinovich, and Aviles, Exact bounds on sample variance of interval data, pp. 1-3, Mar. 18, 2002, http://www.cs.utep.edu/vladik/2002/tr02-13.pdf.
Ferson and Ginzburg, Interval computations as a particular case of a general scheme involving classes of probability distributions, In Juergen Wolff von Gudenberg and Walter Kraemer (eds.), Scientific Computing, Validated Numerics, Interval Methods, Kluwer, Dordrecht, pp. 355-365, 2001.
Dantsin, Kreinovich, Wolpert, and Xiang, Population variance under interval uncertainty: A new algorithm, pp. 1-9, 2006, http://cs.roosevelt.edu/~dantsin/pdf/DKWX05.pdf.
Ceberio, Kreinovich, and Ginzburg, Towards joint use of probabilities and intervals in scientific computing: Waht is the best transition from linear to quadratic approximation?, pp. 1-7, 2004 http://www.cs.utep.edu/vladik/2004/tr04-07.pdf.
Beck, Kreinovich, and Wu, Interval-valued and fuzzy-valued random variables: From Computing sample variances to computing sample covariances, pp. 1-8, Apr. 18, 2004, http://www.cs.utep.edu/vladik/2004/tr04-03a.pdf.
Kreinovich, Beck, Ferregut, Sanchez, Keller, Averill, and Starks, Monte-carlo-type techniques for processing interval uncertainty, and their engineering applications, pp. 1-25, Aug. 8, 2004, http://www.cs.utep.edu/vladik/2004/tr04-23.pdf.
Starks, Kreinovich, Longpre, Ceberio, Xiang, Araiza, Beck, Kandathi, Nayak, and Torres, Towards combining probabilistic and interval uncertainty in engineering calculations, pp. 1-25, Jul. 31, 2004, http://www.cs.utep.edu/vladik/2004/tr04-20.pdf.
Kreinovich, Longpre, Patangay, Ferson, and Ginzburg, Outlier detection under interval uncertainty: algorithmic solvability and computational complexity, pp. 1-20, Jul. 17, 2003, http://www.cs.utep.edu/vladik/2003/tr03-10f.pdf.
Kreinovich, Berleant, Ferson, and Lodwick, Combining interval and probabilistic uncertainty: Foundations, Algorithms, Challenge—an overview, pp. 1-10, Jul. 3, 2005, http://www.cs.utep.edu/vladik/2005/tr05-09a.pdf.
Shaalan, Broadwater, Fabrycky, and Lee, The application of interval analysis to economic decision evaluations of electric energy systems, The Engineering Economist, vol. 39(3), 209-233, 1994.
Berleant, Zhang, Hu, and Shebl, Economic dispatch: applying the interval-based distribution envelope algorithm to an electric power problem, pp. 1-4, Mar. 31, 2002, http://www.cs.utep.edu/interval-comp/interval.02/berla.pdf.
Tucker and Ferson, Probability bounds analysis in environmental risk assessments, Applied Biomathematics Report, pp. 1-63, 2003, http://www.ramas.com/pbawhite.pdf.
Walley and Fine, Towards a frequentist theory of upper and lower probability, The Annals of Statistics, vol. 10(3), pp. 741-761, 1982.
Ferson and Burgman, Correlations, dependency bounds, and extinction risks, Biological Conversation, vol. 73, pp. 101-105, 1995.
Helton, Sampling-based methods for uncertainty and sensitivity analysis, Hanson and Hemez (eds.), Sensitivity analysis of model output, Los Alamos National Lab., 2005, pp. 221-229.
Helton, Johnson, and Oberkampf, Sensitivity analysis in conjunction with evidence theory representation of epistemic uncertainty, in Sensitivity Analysis of Model Output, Hanson and Hemez (eds.), pp. 410-420, 2005.
Josylyn and Ferson, Approximate representations of random intervals for hybrid uncertainty quantification in engineering modeling, pp. 1-17, Feb 2004, ftp://ftp.c3.lanl.gov/pub/users/joslyn/samo04.pdf.
Emden and Moa, Termination criteria in the Moore-Skelboe algorithm for global optimization by interval arithmetic, pp. 1-13, Sep. 23, 2004, http://csr.uvic.ca/~vanemden/Publications/mooreSke1b.pdf.
Hansen and Walster, Global Optimization using Interval Analysis, 2nd Ed., Dekker, New York, 2004, cover, pp. xii-xv, 2,3, 16, 17, 23 256-257.
Julier and Uhlmann, A new extension of the Kalman Filter to non-Systems, pp. 1-12, 1997, http://www.cs.unc.edu/welch/kalman/media/pdf/Julier1997_SPIE_RF.pdf.
Doucet, Freitas, and Gordon, Sequential Monte Carlo Methods in Practice, (authors above are editors), Springer, New York, 2001, pp. cover, 6-9, and 1st page of Chapt. 2.
Thrun, Fox, Burgard, and Dellaert, Robust Monte Carlo localization for Mobile Robots, Artificial Intelligence, vol. 128, pp. 99-141, 2001.
Fox, Burgard, Dellaert, and Thrun, Monte Carlo localization: Efficient position estimation for mobile robots, pp. 1-7, 1999, http://robots.stanford.edu/papers/fox.aaai99.pdf.

Moravec and Elfes, High resolution maps from wide angle sonar, Robotics and Automation, Proceedings, 1985 IEEE International Conference on , vol. 2, March, pp. 116-121.

Burgard, Fox, Henning, and Schmidt, Estimating the absolute position of a mobile robot using position probability grids, pp. 1-6, 1996, from http://www.cs.cmu.edu/~dfox/postscripts/localize-aaai-96.ps.gz.

Dellaert, Fox, Burgard, and Thrun, Monte Carlo localization for mobile robots, IEEE International Conference on Robotics and Automation (ICRA), vol. 2, pp. 1322-1328, May 10-15, 1999.

Leveque, Jaulin, Meizel, and Walter, Vehicle localization from inaccurate telemetric data: A set-inversion approach, Proc. 5th IFAC Symp. On Robot Control SY RO CO '97, Nantes, France,.vol. 1, pp. 179-186, 1997.

Ferson, Ginzburg, and Akcakaya, Whereof one cannot speak: When input distributions are unknown, Applied Biomathematics Report, pp. 1-18, http://www.ramas.com/whereof.pdf. 1998.

Mozzone et al., Acoustic Localization of Marine Crafts with Multistatic Deployable Sonar, Proceedings 5th IFAC Conference Manoeuvring and Control of Marine Craft, Aalborg, Denmark, Aug. 23-25, 2000, pp. 111-116.

Marrs, A.D., Asynchronous Multi-sensor Tracking in Clutter with Uncertain Sensor Locations using Bayesian Sequential Monte Carlo Methods, Proceedings of IEEE Aerospace Conference, 2001, vol. 5, pp. 2171-2177.

Jaschke, L. and Chapman, N. R., Matched field inversion of broadband data using the freeze bath method, J. Acoust. Soc. Am. 106 (4), Pt. 1, Oct. 1999, pp. 1838-1851.

Stone, L.D. et al., Bayesian Multiple Target Tracking, Ad House, Inc., 1999, p. 210.

Pignot, P. and Chapman, N. R., Tomographic inversion of geoacoustic properties in a range-dependent shallow-water environment, J. Acoust. Soc. Am. 110, 2001, pp. 1338-1348.

Hodgkiss, W.S. et al, Direct Measurement and Matched-Field Inversion Approaches to Array Shape Estimation, IEEE Journal of Oceanic Engineering, vol. 21, No. 4, Oct. 1996, pp. 393-401.

Hodgkiss, W.S., Shape Determination of a Shallow-Water Bottomed Array; Oceans '89. Proceedings vol. 4, Sep. 18-21, 1989 pp. 1199-1204.

Caiti, A. et al.; Set-Membership Acoustic Tracking of Autonomous Underwater Vehicles, Acta Acustica united with Acustica, vol. 88, No. 5, 2002, pp. 648-652.

Caiti, A. et al., Set-membership localization and tracking of autonomous underwater vehicles, Proc. of the 6th European Conference on Underwater Acoustics, Cracovia, Poland, Jun. 24-27, 2002.

Sutherland, K.T. and Thompson, W.B., Localizing in Unstructured Environments: Dealing with the Errors, IEEE Transactions on Robotics and Automation, vol. 10, No. 6, Dec. 1994, pp. 740-754.

Smith, J. O. and Abel, J.S., Closed-Form Least-Squares Source Location Estimation from Range-Difference Measurements, IEEE Transactions on Acoustics, Speeach, and Signal Processing, vol. ASSP-35, No. 12, Dec. 1987, pp. 1661-1669.

Bai, Er-Wei et al., Optimization With Few Violated Constraints for Linear Bounded Error Parameter Estimation, IEEE Transactions on Automatic Control, vol. 47, No. 7, Jul. 2002, p. 1067-1077.

Bechaz, C. and Thomas, H., GIB System: The Underwater GPS Solution, Proceedings of the Fifth European Conference on Underwater Acoustics, Lyon, France, 2000, pp. 613-618.

Gustafsson F. and Gunnarsson, F., Positioning Using Time-Difference of Arrival Measurements, International Conference on Acoustics, Speech, and Signal Processing Proceedings, Apr. 6-10, 2003.

Collin, L. et al., On Spatial Uncertainty in a Surface Long Baseline Positioning System, Proceedings of the Fifth European Conference on Underwater Acoustics, Lyon, France, 2000, pp. 607-612.

Mozzone, L. et al., Target Motion Analysis with Multiple Distributed Acoustic Sensors, Proceedings of the Fifth European Conference on Underwater Acoustics, Lyon, France, 2000, pp. 1067-1072.

Poirot, J.L. and McWilliams, G.V., Application of Linear Statistical Models to Radar Location Techniques, IEEE Transactions on Aerospace and Electronic Systems, vol. AES-10, No. 6, Nov. 1974, pp. 830-834.

Poirot, J.L. and Arbid, G., Position Location: Triangulation Versus Circulation, IEEE Transactions on Aerospace and Electronic Systems, vol. 14, No. 1, 1978, pp. 48-53.

Spingarn, Karl, Passive Position Location Estimation Using the Extended Kalman Filter, IEEE Transactions on Aerospace and Electronic Systems, vol. AES-23, No. 4, Jul. 1987, pp. 558-567.

Challa, S. and Faruqi, F.A, A New Approach to Optimal Nonlinear Filtering, International Conference on Acoustics, Speech, and Signal Processing, Munich, Apr. 21-24, 1997, pp. 2413-2416.

Dosso, S.E. and Wilmut, M.J., Quantifying Data Information Content in Geoacoustic Inversion, IEEE Jounal of Oceanic Engineering, vol. 27, No. 2, Apr. 2002, pp. 296-304.

Jakoby, A. et al., Source Localization in Shallow Water in the Presence of Sensor Location Uncertainty, IEEE Journal of Oceanic Engineering, vol. 25, No. 3, Jul. 2000, pp. 331-336.

Moses, R.L. et al., A Self-Localization Method for Wireless Sensor Networks, EURASIP Journal on Applied Signal Processing, vol. 2003, No. 4, 2003, pp. 348-358.

Zotkin, D.N. et al., Joint Audio-Visual Tracking using Particle Filters, EURASIP Journal on Applied Signal Processing, Special Issue on Joint Audio-Visual Speech Processing, 2001, pp. 1-25.

Moses, R.L. et al., An Auto-Calibration Method for Unattended Ground Sensors, Proceedings of the IEEE International Conference on Acoustics, Speech, and Signal Processing, May 2002, vol. 3, pp. 2941-2944.

Raykar, V.C. et al., Self Localization of acoustic sensors and actuators on Distributed platforms, International Workshop on Multimedia Technologies in E-Learning and Collaboration, Nice, France, Oct. 2003, pp. 1-8.

Raykar, Vikas C., Position Calibration of Acoustic Sensors and Actuators on Distributed General Purpose Computing Platforms, Masters Thesis, Department of electrical engineering, University of Maryland College Park, Dec. 2003.

Fistas, N. and Manikas, A., A New General Global Array Calibration Method, ICASSP Proceedings, Apr. 1994, vol. 4, pp. 73-76.

Wyeth, N. Conyers, Methods of Array Element Localization for a Towed Underwater Acoustic Array, IEEE Journal of Oceanic Engineering, vol. 19, No. 1, Jan. 1994, pp. 128-133.

Lu, Feng et al., New Towed-Array Shape-Estimation Scheme for Real-Time Sonar Systems, IEEE Journal of Oceanic Engineering, vol. 28, No. 3, Jul. 2003, pp. 552-563.

Dosso, S.E. et al., Array element localization for horizontal arrays via Occam's inversion, J. Acoust. Soc. Am., Vol. 104(2), Pt. 1, 1998, pp. 846-859.

Ferguson, B.G. et al., Comparison of sharpness and eigenvector methods for towed array shape estimation, J. Acoust. Soc. Am. 91(3), Mar. 1992, pp. 1565-1570.

Dosso, S.E. and Riedel, M., Array element localization for towed marine seismic arrays, J. Acoust. Soc. Am. vol. 110(2), Aug. 2001, pp. 955-966.

Dosso, S.E. and Sotirin, B.J., Optimal array element localization, J. Acoust. Soc. Am., vol. 106(6), Dec. 1999, pp. 3445-3459.

* cited by examiner

METHODS AND APPARATUS FOR COMPUTER-ESTIMATING A FUNCTION OF A PROBABILITY DISTRIBUTION OF A VARIABLE

RELATED APPLICATIONS

This application is a continuation of application Ser. No. 12/769,450, filed Apr. 28, 2010, now U.S. Pat. No. 8,010,314, which is a division of application Ser. No. 12/104,275, filed Apr. 16, 2008, abandoned, which is a continuation of application Ser. No. 11/803,235, filed May 14, 2007, now U.S. Pat. 7,363,191, which is a division of application Ser. No. 10/419, 712, filed Apr. 20, 2003, now U.S. Pat. No. 7,219,032, which claims the benefit of provisional applications Ser. No. 60/373, 934, filed Apr. 20, 2002, Ser. No. 60/428,994, filed Nov. 25, 2002, and Ser. No. 60/451,523, filed Mar. 3, 2003.

COMPUTER PROGRAM LISTING APPENDIX

The present application incorporates by reference the material on a computer program listing appendix. This material resides on identical compact disks labeled copy 1 and copy 2. All files were created on 20 Apr. 2003. The names and sizes in bytes respectively of the files on each disk are:

1. PU__1m.m 3928
2. Pc_im.m 4547
3. Pcc_im.m 7224
4. Precpcs_im.m 6139
5. Ptxyz.m 6216
6. Pxyz.m 6176
7. bin_numb_to_coord.m 1371
8. boundP.m 34978
9. boundP__2d.m 23932
10. boundP__3d.m 34942
11. boundsposit__4rec_d.m 44643
12. chkint_type.m 1014
13. comb1.m 592
14. comp1.m 769
15. confidlim.m 2327
16. drawisosigma.m 7528
17. funl.m 96
18. genarr.m 5336
19. getisosigma.m 8934
20. getrv.m 5876
21. getrvar.m 3846
22. getsrcbnds.m 6313
23. getx_rv.m 8181
24. isodiachron.m 5060
25. plot_c.m 2088
26. plot_tbounds.m 2606
27. plt_U.m 1377
28. plt_c.m 1710
29. plt_reclim.m 2258
30. plt_sbnds.m 3167
31. plt_sourcelim.m 3524
32. plt_tbnds.m 3099
33. ranint.m 792
34. removepair.m 985
35. sbnds_ttdgroup.m 3020
36. sign_chg.m 3409
37. sol_quartic_isosig_loc.m 19350
38. sol_quartic_isosig_location.m 16343
39. solve_quartic_location.m 13679
40. unpack_binmatch.m 760
41. usedirninfo.m 2625

BACKGROUND

1. Field of the Invention

In general, the present invention relates to methods for locating objects from measurements of distances and travel times of signals. It also relates to methods in sequential estimation.

2. Description of Prior Art

Hyperbolic locations are typically derived by intersecting hyperboloids from estimates of the differences in distances between a primary point and pairs of stations located in space. The technique has numerous applications including the Global Positioning System, systems to locate cell phones, systems to locate calling animals, sonar systems used in the Navy, systems to locate lightening, underwater navigation systems, algorithms to locate earthquakes from seismic recordings, systems to locate aircraft using electromagnetic signals, systems to locate aircrafts, missiles, and ground equipment from their acoustic emissions, systems for locating electromagnetic emissions in general including radar and communication systems, and Positron Emission Tomography (PET) for the medical field.

Probability distributions for location have been estimated by either assuming that the variables, such as signal speed and station location, are linearly related to the location of the primary point (Chestnut, IEEE Transactions on Aerospace and Electronic Systems, Vol AES-18, No. 2, 214-218, 1982; Dailey and Bell, IEEE Transactions on Aerospace and Electronic Systems, Vol. 32 No. 3, p. 1148-1154, 1996; Wahlberg, Mohl, and Madsen, J. Acoustical Society America, Vol. 109, 397-406, 2001) or that the differences in distances are Gaussian random variables (Abel, IEEE Transactions on Aerospace and Electronic Systems, Vol. 26, No. 2, 423-426, 1990). Both assumptions are often invalid even though they are widely used. For example, the difference in distance is mathematically equal to the difference in distance between the primary point and each station. If the initial estimates of the station's locations are Gaussian random variables, then the difference in distance is also a random variable, but it is not Gaussian as approximated in prior art (Abel, 1990). It would be useful to be able to estimate probability distributions for primary points using realistic probability distributions for station coordinates, such as truncated Gaussian or uniform distributions.

Furthermore, hyperbolic locations are restricted to the case where the speed of signal propagation is constant throughout space, in which case the difference in distance is estimated from the difference in propagation time of the signal. But there are many situations in which the speed of the signal is not constant between a primary point and different stations. Examples of this occur in Global Positioning Systems (GPS), acoustic propagation in the sea, acoustic propagation in the Earth, mixed propagation cases where a signal propagates through different medium such as water and Earth, etc. U.S. Pat. No. 6,028,823 by Vincent and Hu titled "GEODETIC POSITION ESTIMATION FOR UNDERWATER ACOUSTIC SENSORS," generalize hyperbolic location to one in which the speed of sound is restricted to a function of depth only in the sea. Non-linear equations are solved for location with an iterative linearization based on a Newton-Raphson method. One of the inventors says that it is not possible to solve the equations analytically, so an iterative procedure is used (Vincent, Ph.D thesis, Models, Algorithms, and Measurements for Underwater Acoustic Positioning, U. Rhode Island, p. 25, 2001). He says that this iterative least squares technique "suffers from several well known disadvantages such as (1) an initial guess of object position is required to linearize the systems of equations by expansion as a truncated Taylor series, (2) the procedure is iterative, (3) convergence is not guaranteed, and (4) the procedure has a relatively high computational burden" (Vincent, p. 25 2001). The procedure in U.S. Pat. No. 6,028,823 does not provide a method for solving for location when the speed of propagation varies in more than one Cartesian coordinate or when the variation in speed in not pre-computed as a function of one Cartesian coordinate (U.S. Pat. No. 6,388,948, Vincent and Hu). But there are many situations when the speed of the signal is not known ahead of time and also when the speed of propagation varies in more than one spatial coordinate both in the sea and in other environments. The method in U.S. Pat. No. 6,028,823 does not provide a means to solve these types of problems which commonly occur in GPS systems and even for systems for locating objects via their sounds in the sea, air, or Earth.

There appears to be another technical difficulty in estimating location errors even when one accounts for the fact that the linear approximation is invalid. When one has more than the minimum number of stations required to locate an object, the method for assessing errors does not appear to have been dealt with in the literature in a satisfying method. Schmidt's paper (Schmidt, IEEE Transactions on Aerospace and Electronic Systems, Vol. AES-8, No. 6, 821-835, 1972), uses Monte Carlo simulations to estimate maximum location errors of a primary point. Suppose for the moment that a mathematically unambiguous location can be achieved with three stations for a two-dimensional geometry. Schmidt jiggles ideal travel time differences and station coordinates within their expected errors to see how much a location changes with respect to the correct location. Errors are obtained by taking the largest misfit between the jiggled and correct estimate of location. When there are more than three stations, say $\mathcal{R}$, he suggests using this procedure for each combination of three stations giving, $$\binom{\mathcal{R}}{3} = \frac{\mathcal{R}!}{(\mathcal{R}-3)!3!},$$

total combinations. Each combination is referred to as a "constellation" here. Schmidt suggests using a least squares procedure to find a final estimate of error from the results of the largest misfit from each constellation. He does not prove this least-squares procedure is optimal, and indeeds states that he is not sure of any advantages in using a least-squares procedure in this situation.

There does not appear to be a practical method for estimating probability distributions for hyperbolic location for the overdetermined problem mentioned by Schmidt (1972) when the distributions for station locations and estimates of differences of distance are not Gaussian random variables.

Bayes theorem provides a method to compute the probability distribution for location but it requires an enormous number of computations to implement. Suppose one wants the joint probability density function, $f(\vec{s}, \vec{r}, \vec{c}|\tau_{ij})$, of the source location, $\vec{s}$, receiver locations, $\vec{r}$, and speeds of propagation between the source and each receiver, $\vec{c}$, given a measurement of the difference in propagation time between the source and receivers i and j, $\tau_{ij}$. Bayes theorem supplies the desired result, $$f(\vec{s}, \vec{r}, \vec{c}|\tau_{ij}) = \frac{f(\tau_{ij}|\vec{s}, \vec{r}, \vec{c})\pi(\vec{s}, \vec{r}, \vec{c})}{\int f(\tau_{ij}|\vec{s}, \vec{r}, \vec{c})\pi(\vec{s}, \vec{r}, \vec{c})d\vec{s}d\vec{r}d\vec{c}}, \quad (1)$$

in terms of the conditional probability, $f(\tau_{ij}|\vec{s}, \vec{r}, \vec{c})$, of obtaining the data, $\tau_{ij}$, given the locations of the source and receivers, and speeds of propagation, and in terms of the prior joint distribution, $\pi(\vec{s}, \vec{r}, \vec{c})$. If the distributions on the right side could be evaluated analytically, then evaluating Eq. (1) would possibly provide a practical solution to the problem. One could introduce new data, and keep finding better estimates of the distribution on the left given updated distributions on the right. It appears difficult to find analytical solutions for the distributions on the right because the variables are related in nonlinear ways from which progress appears to be at a standstill. Brute force evaluation of the distributions on the right also appears computationally impractical because of the high dimensionality of the joint distributions. In hyperbolic location, for example, for R receivers, there are three variables for the Cartesian coordinates of the source and each receiver, as well as a speed of propagation making a total of 3+3R+1=3R+4 variables. For R=5, one would need to estimate the joint probability density functions of 19 variables, for each introduced datum (a 19 dimensional space). Suppose each variable is divided into ten bins. Accurate estimation of the joint distribution requires a reliable probability of occurrence in $10^{19}$ bins in the example given above. Since this is not practical to compute, Bayes theorem does not offer a practical means to compute probability distributions of location for many cases of interest.

It is useful to be able to estimate probability distributions for variables of interest that occur in non-linear situations or when a priori distributions are not Gaussian. The location of a primary point from measurements of the difference in arrival time at two or more stations is an example of a non-linear problem when variables may not be described as being Gaussian. When variables are Gaussian, a Kalman filter can be used to estimate their probability distributions (Gelb, Applied Optimal Estimation, p. 105-107, M.I.T. Press, Cambridge, Mass. 1996). When the Kalman filter is not applicable to a problem, one can attempt to find solutions by linearizing equations and iterating to optimize an objective function. This approach may not converge to the correct solution if the initial guess is not close to the correct answer. There is a need for a procedure to estimate probability distributions for non-linear systems or for systems in which the variables are not Gaussian.

For ellipsoidal locations, there does not appear to be a method for obtaining probability distributions for the primary point when using the sums of distances or the sums of travel times between two points and a primary point without making a linear approximation or without assuming some or all of the variables are Gaussian random variables. Furthermore, when one uses measurements of travel time to estimate the sums of distances, ellipsoidal location methods assume that the speed of propagation is constant. Ellipsoidal locations are strictly invalid when the speed of propagation varies between the stations. It would be useful to have a method to obtain locations when the speeds of propagation are not the same between each instrument.

There do not appear to be methods to estimate probability distributions for initially unknown locations of a primary point and for locations of the stations and the speed of propagation without recourse to linearizing approximations and assumptions of Gaussian distributions. For example, Dosso and Collison (Journal of the Acoustical Society of America, Vol. 111, 2166-2177, 2002) linearize equations between underwater station locations and the location of a acoustic source in a problem dealing with hyperbolic location. They assume the location of the source is approximately known and that prior probability distributions for the data and locations of source and stations are Gaussian. But it would be useful to have a robust method to estimate these distributions without recourse to Gaussian statistics and without making a linear approximation, which may be inaccurate and which may lead to a solution in a non-global minimum of a cost function.

SUMMARY

In accordance with the present invention, methods are developed for estimating probability distributions for location and for the variables that affect location such as the coordinates of stations and the speeds of signal propagation. The methods are robust, practical to implement, and admit nonlinear relationships between data and variables of interest without recourse to any linear approximation. The estimation methods of the present invention have applications in many other fields.

OBJECTS AND ADVANTAGES

The invention provides a method for estimating probability distributions for variables that are functionally related to data. The prior distribution of the variables can be realistic and need not be Gaussian. The function relating the variables to the data can be linear or nonlinear. When it is nonlinear, it is not necessary to use a linear approximation to implement the method. For location problems, the invention yields probability distributions for the location of the primary point as well as for the coordinates of stations and the speeds of signal propagation when the data consist of travel times or differences in travel times. Thus, the method provides a means to conduct self surveying and tomography, with accompanying probability distributions, at the same time as providing distributions for location.

The invention provides a method for locating a primary point from differences in travel time when the speed of propagation can be different for any path. To facilitate an understanding of the geometry of this situation, which is no longer hyperbolic, a new geometrical object called an "isodiachron" is introduced. The word is derived from the Greek words "iso", for same, "dia", for difference, and "chron", for time. The surface is one along which the locus of points has the same difference in travel time between two stations. This reduces to a hyperboloid only if the signal speed is spatially homogeneous. Despite the fact that the literature states that there is no analytical solution for location in this situation (Vincent, 2001), an analytical solution for location is derived as part of the present invention. This solution is not constrained to permit only variations of speed with depth, but allows variations to occur for any and all coordinates. The invention of the analytical solution is efficient enough to allow estimation of probability distributions for any variables in the problem.

The inventions for estimating location reveal, perhaps for the first time, how badly the ubiquitous linear approximation is for estimating errors for hyperbolic locations in many cases of interest. In fact, the invention demonstrates that probability distributions for location are sometimes overestimated by ten to one-hundred times compared with the fully nonlinear estimates obtained from this invention.

As said previously, the invention provides a different method for obtaining probability distributions of location than obtained elsewhere (Chestnut, 1982: Dailey and Bell, 1996; Wahlberg, Mold, and Madsen, 2001). In particular, when one has more than the minimum number of necessary stations to obtain the location of a primary point, (the over-determined problem), the new method called "Sequential Bound Estimation" is used to obtain probability distributions.

The invention provides means for estimating probability distributions of ellipsoidal or "isosigmachronic" (defined below) location without making use of a linear approximation or an approximation that the data and other variables are Gaussian. Instead, the invention provides probability distributions of location based on a priori distributions of the speeds of the signal, locations of stations, and errors in the measurements of the travel times of the signal.

In order to facilitate an analytical solution for location when the speed of signal propagation differs between the primary point and some of the stations, a new geometrical object is introduced called an "isosigmachron." It is derived from the Greek words "iso", for same, "sigma" , for sum, and "chron", for time. The surface is one along which the locus of points has the same sum in travel times between two stations and a primary point. The isosigmachron reduces to an ellipsoid only if the signal speed is spatially homogeneous.

The invention provides means for estimating probability distributions for problems in spherical navigation through use of Sequential Bound Estimation.

These as well as other novel advantages, details, embodiments, features and objects of the present invention will be apparent to those skilled in the art from the following detailed description of the invention, the attached claims and accompanying drawings, listed hereinbelow, which are useful in explaining the invention

DRAWING FIGURES

In the text which follows and in the drawings, wherein similar reference numerals denote similar elements throughout the several views thereof, the present invention is explained with reference to illustrate embodiments, in which:

FIG. 1 Flowchart for Sequential Bound Estimation.

Figure 2:
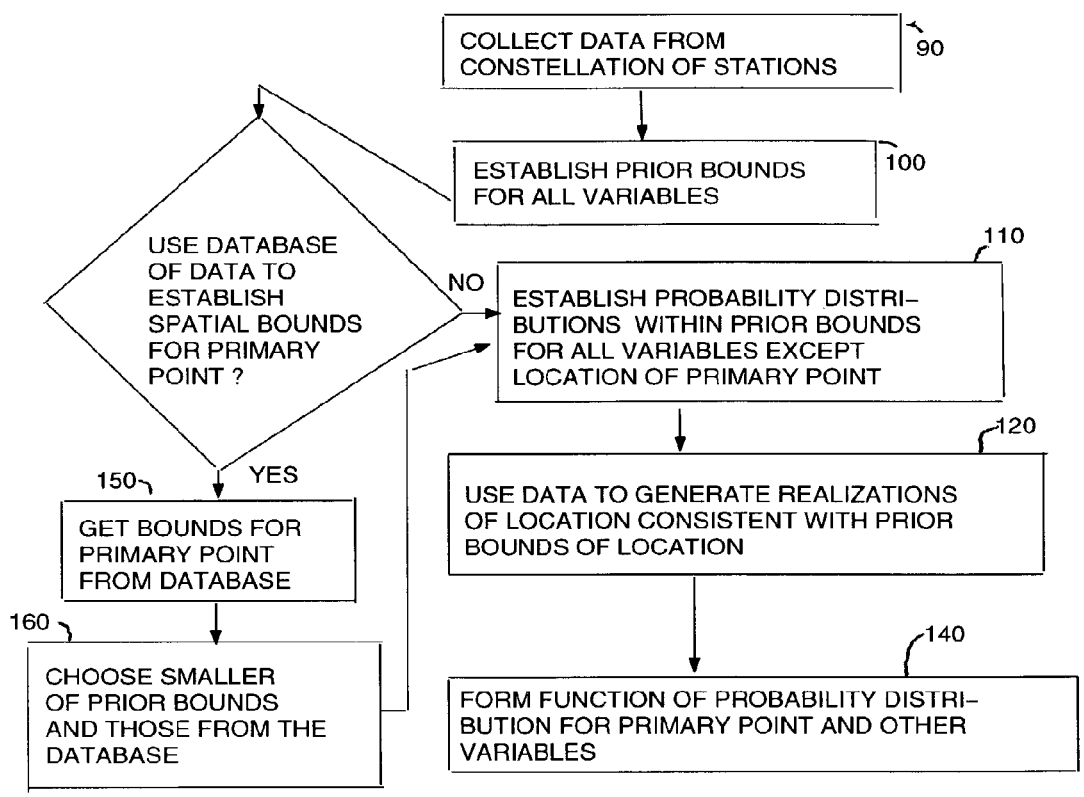

FIG. 2. Flowchart for obtaining a function of the probability distribution for the hyperbolic location of a primary point and a function of the probability distribution for other variables that affect the location of a primary point.

Figure 3:
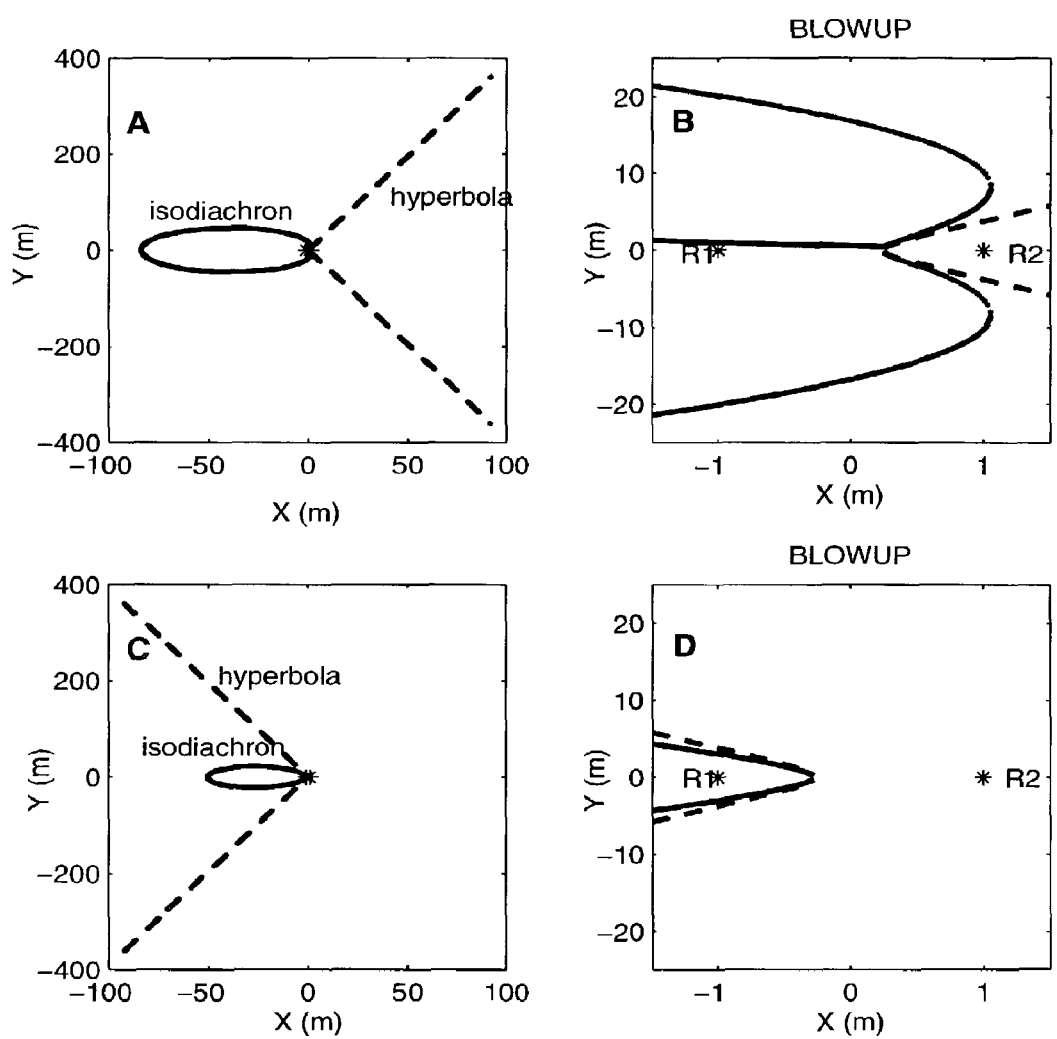

FIG. 3. A,B: Two dimensional hyperbola (dashed) compared with two-dimensional isodiachron (solid). Locations of the two receivers (asterisks) are at Cartesian coordinates (−1, 0) and (1,0). The average speeds of propagation between the source and receivers one and two are 330 and 340 m s$^{-1}$ respectively. The lag, $\tau_{12}$ is 0.0015 s. The hyperbola is computed for a speed of 330 m s$^{-1}$. C,D: Same except the lag is −0.0015 s.

Figure 4:
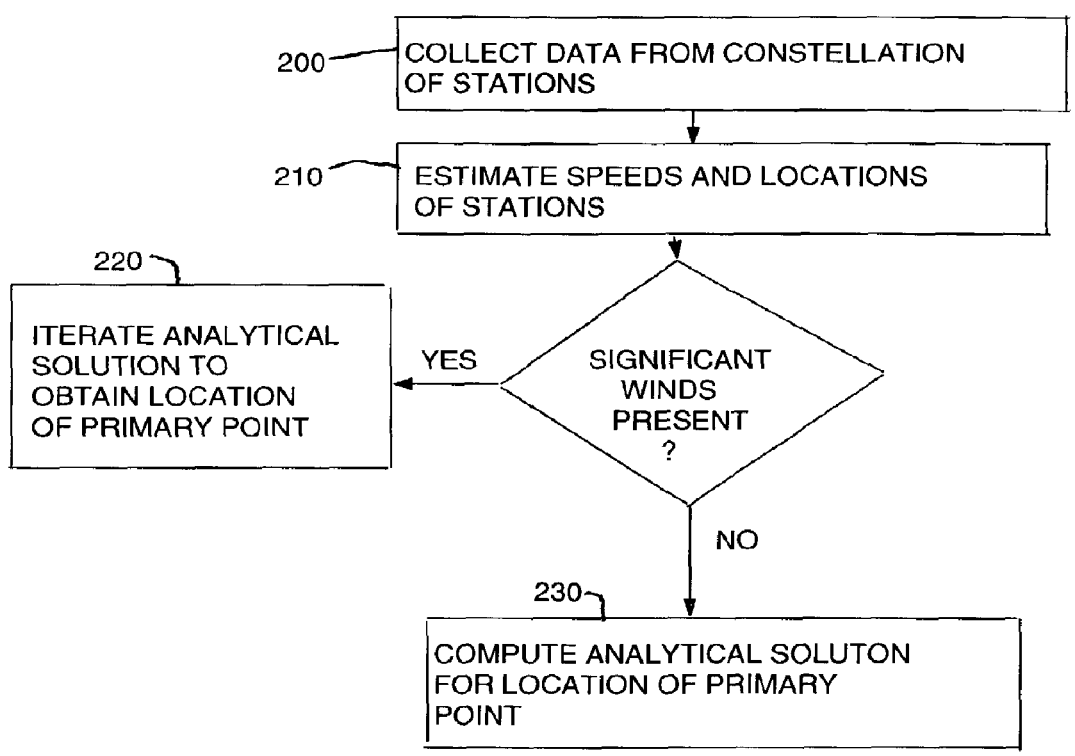

FIG. 4. Flowchart for obtaining analytical solution for location of primary point using isodiachronic or isosigmachronic location.

Figure 5:
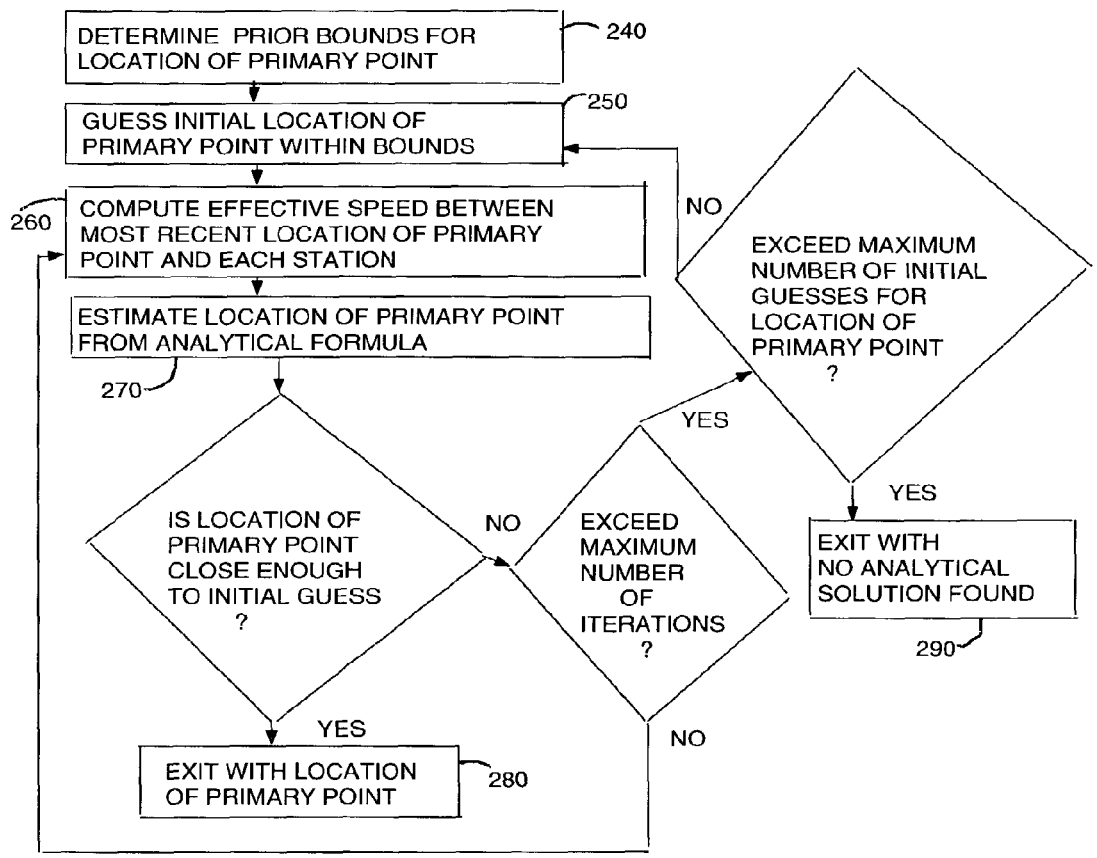

FIG. 5. Flowchart for iterating analytical solution of isodiachronic and isosigmachron location when the affects of advection significantly affect the travel time of a signal between a primary point and a station.

Figure 6:
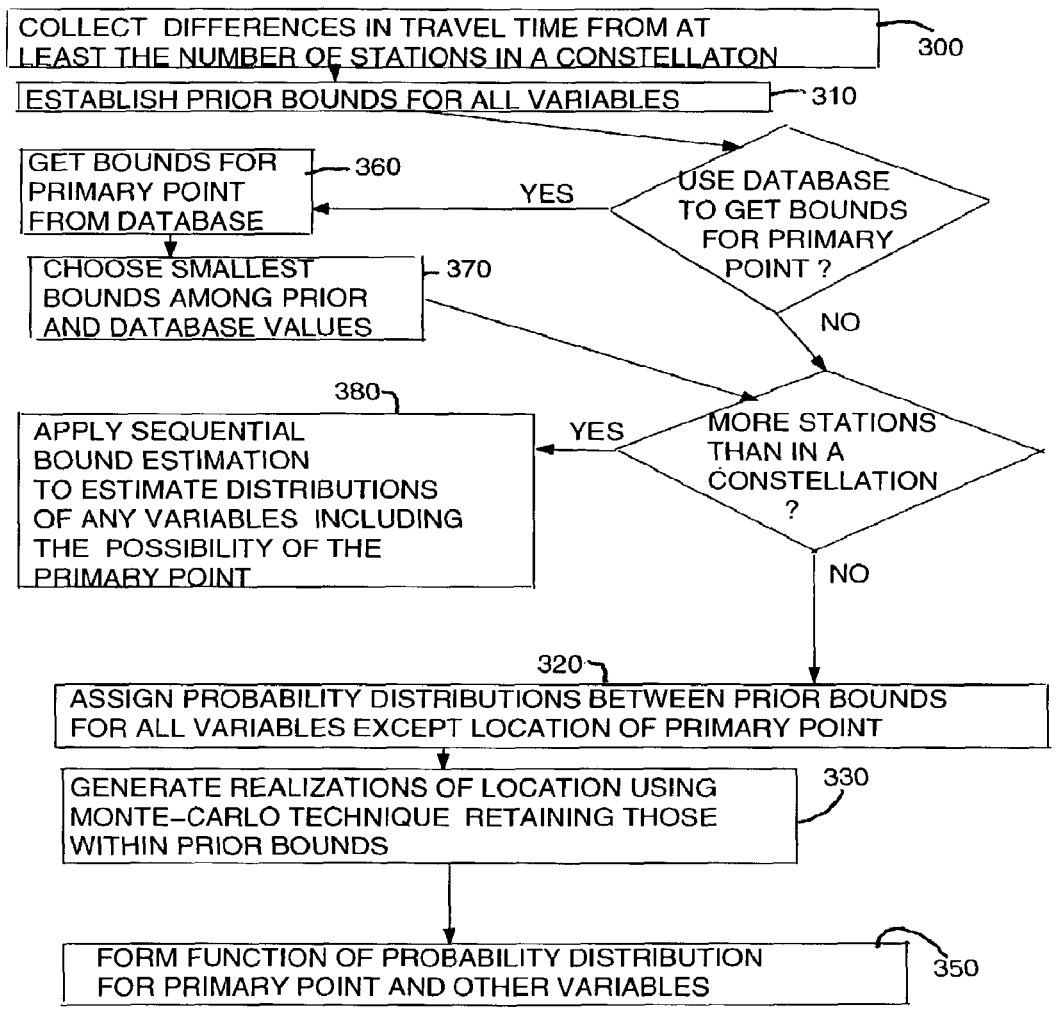

FIG. 6. Flowchart for estimating probability distribution for any variable related to isodiachronic location.

Figure 7:
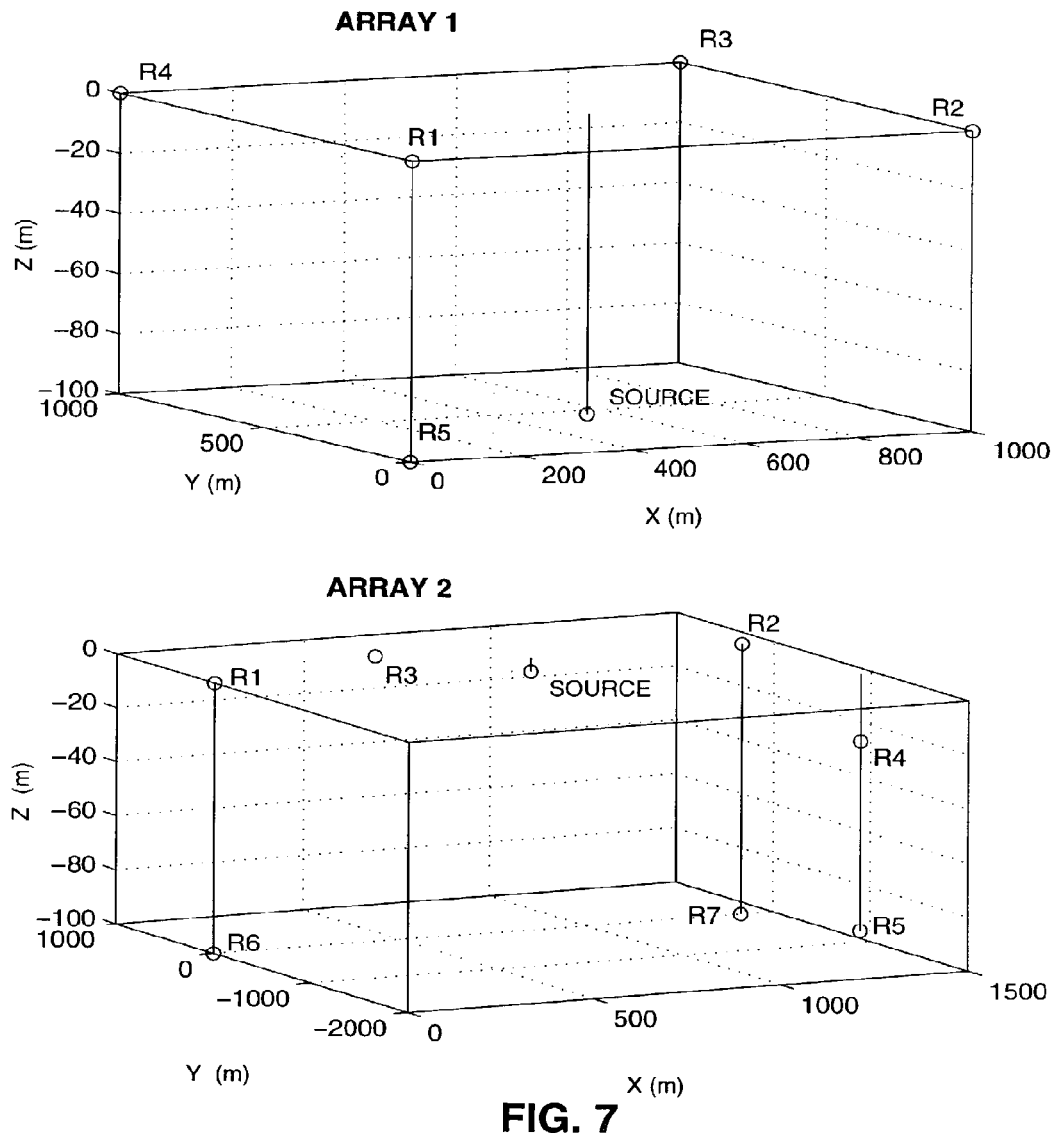

FIG. 7 The receiver and source locations for arrays one and two.

Figure 8:
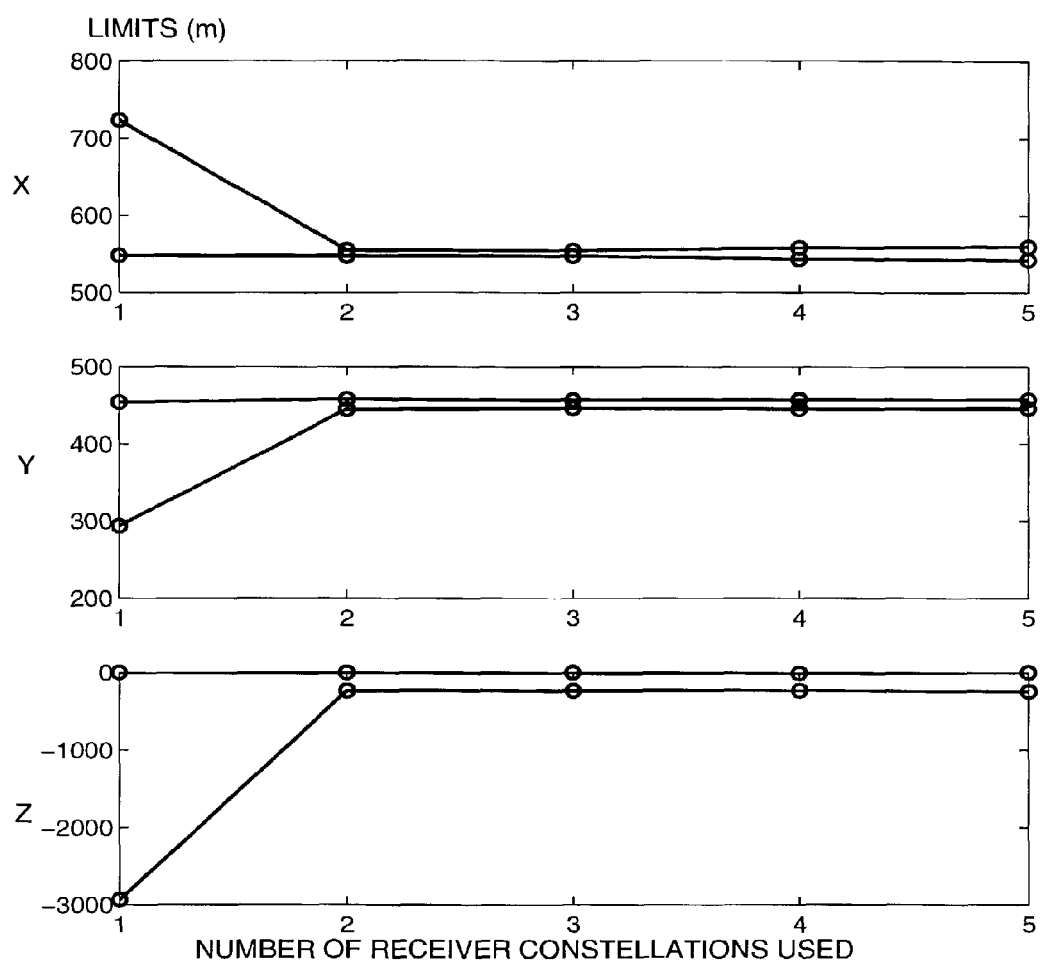

FIG. 8 100% confidence limits for source location as a function of the number of receiver constellations used from array one (FIG. 7). There are five ways of choosing four receivers from five total without replacement. A receiver constellation consists of one of the choices of four receives. As more constellations are used to locate the source, the bounds for the source's location decrease monotonically. The lines join results from different numbers of constellations.

Figure 9:
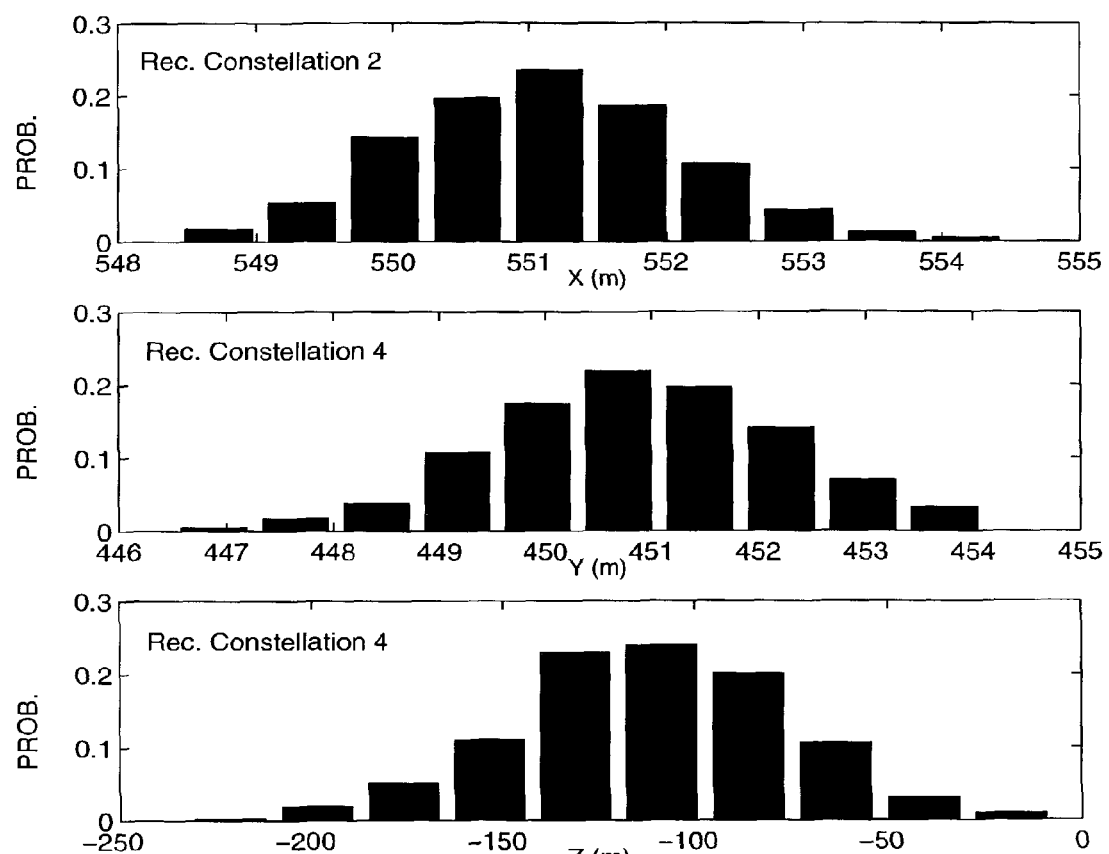

FIG. 9 Probability functions for source location from array one (FIG. 7, top), calculated from the non-linear method in this specification. Receiver constellation 2 is receivers 1, 2, 3, and 5 (FIG. 7, top). Receiver constellation 4 is receivers 1, 3, 4, and 5.

Figure 10:
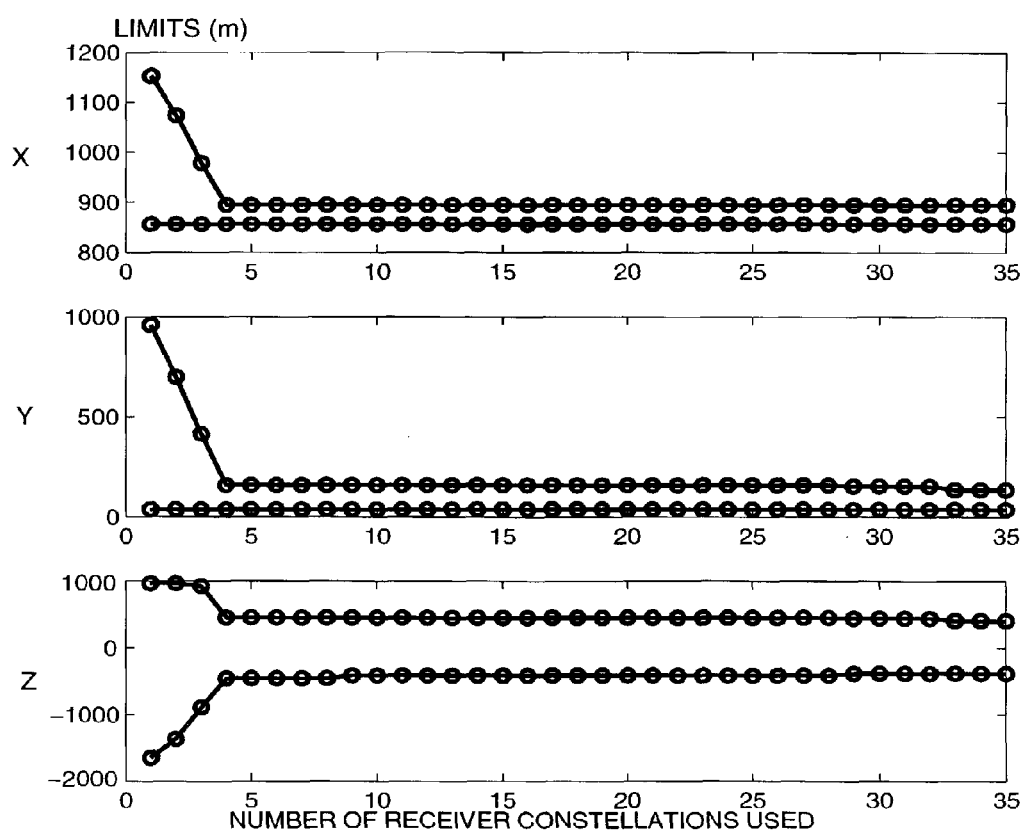

FIG. 10 Same as FIG. 8 except for array two in FIG. 7 and there are 35 ways of choosing 4 receivers from a total of 7 without replacement.

Figure 11:
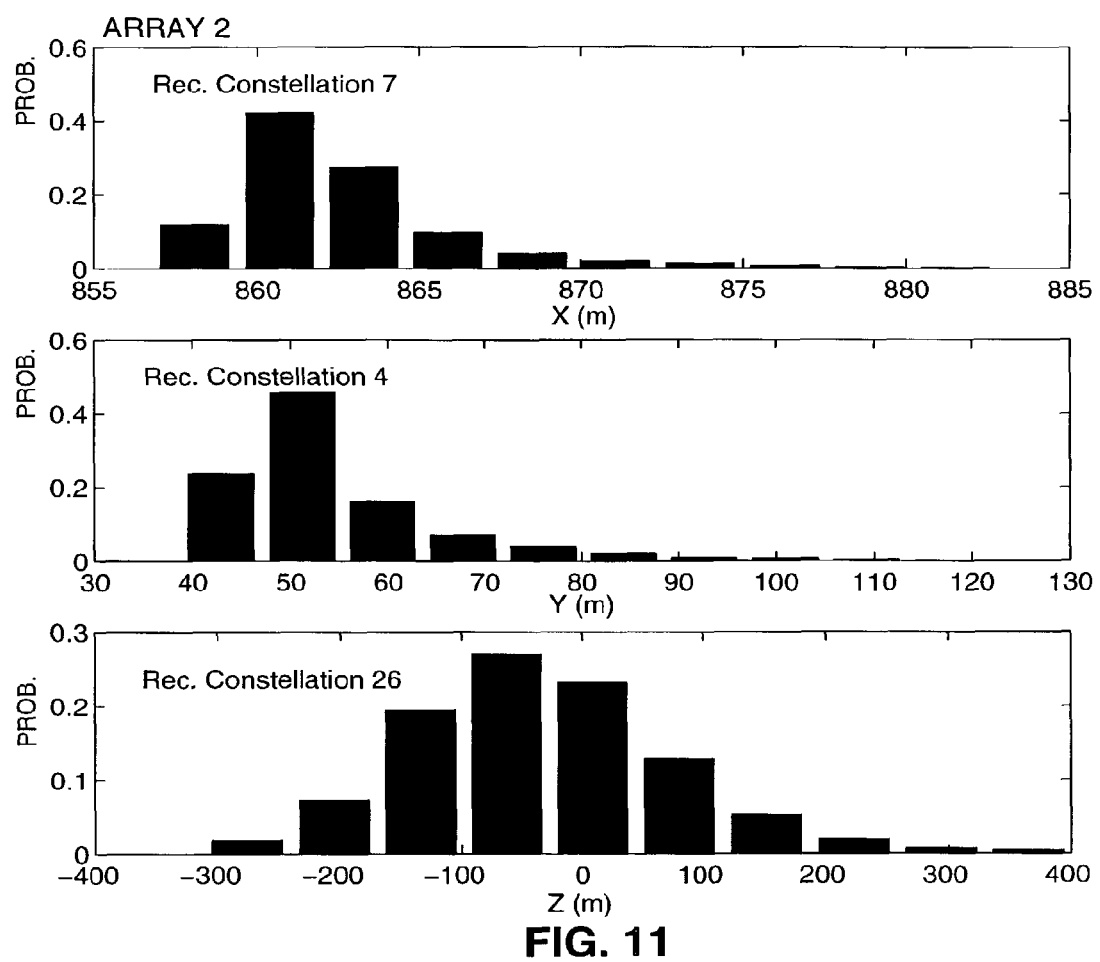

FIG. 11 Probability functions for source location from array two (FIG. 7, bottom) using the non-linear method in this specification. Receiver constellations 7, 4, and 26 are composed from receivers {1, 2, 4, 7}, {1, 2, 3, 7}, and {2, 3, 6, 7} respectively.

Figure 12:
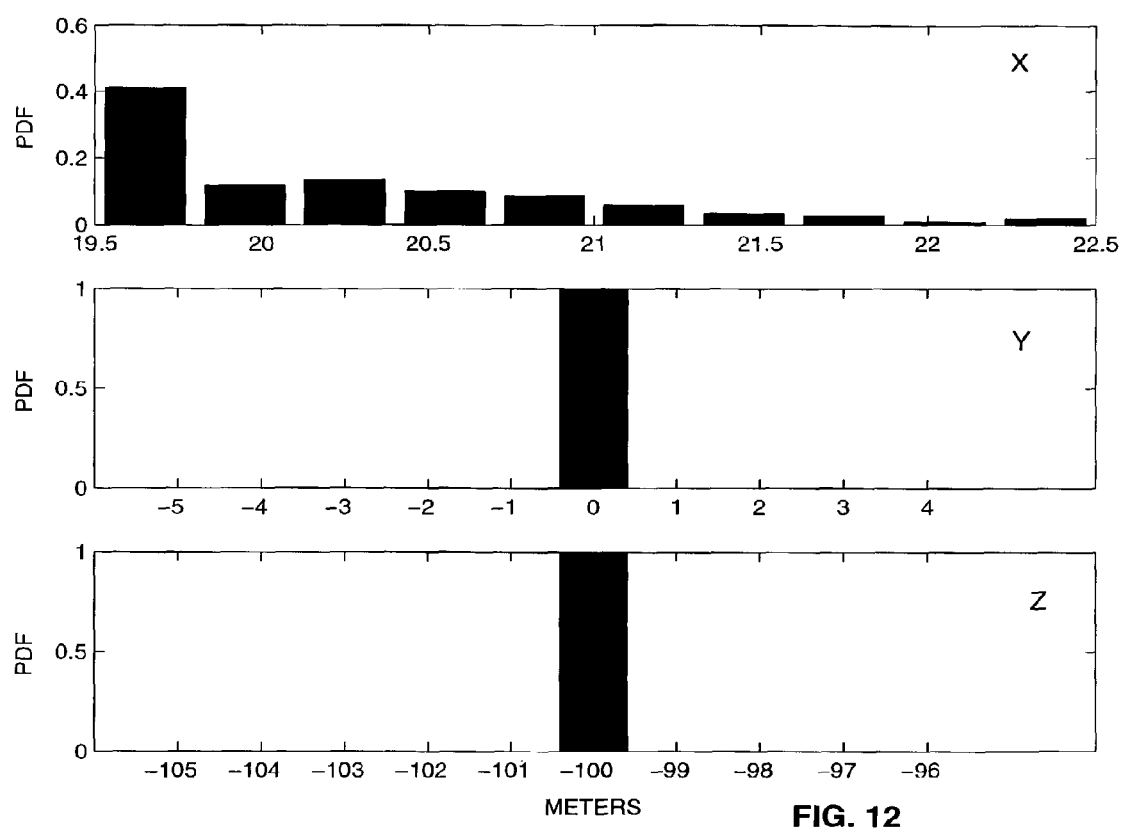

FIG. 12 Probability functions for the Cartesian (x, y, z) coordinates of receiver two (Table III) as determined from Sequential Bound Estimation. The y and z coordinates are set to zero by definition. The correct answer for the x coordinate is 19.76±0.05 m.

Figure 13:
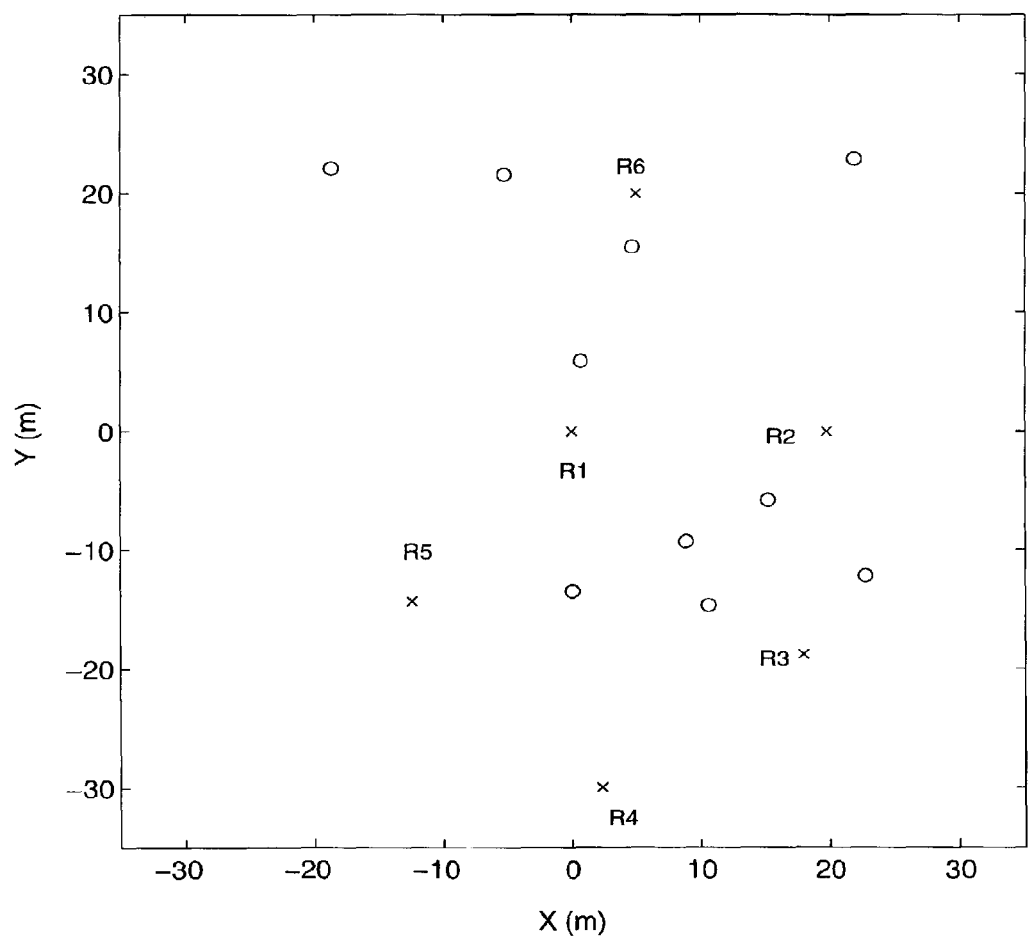

FIG. 13. Horizontal locations of 6 receivers and 10 sources (circles) used to simulate estimation of the spatially homogeneous component of the field of sound speed. The receivers have elevations of 0, 0, 0, −0.02, −0.43, and −5 m respectively.

Figure 14:
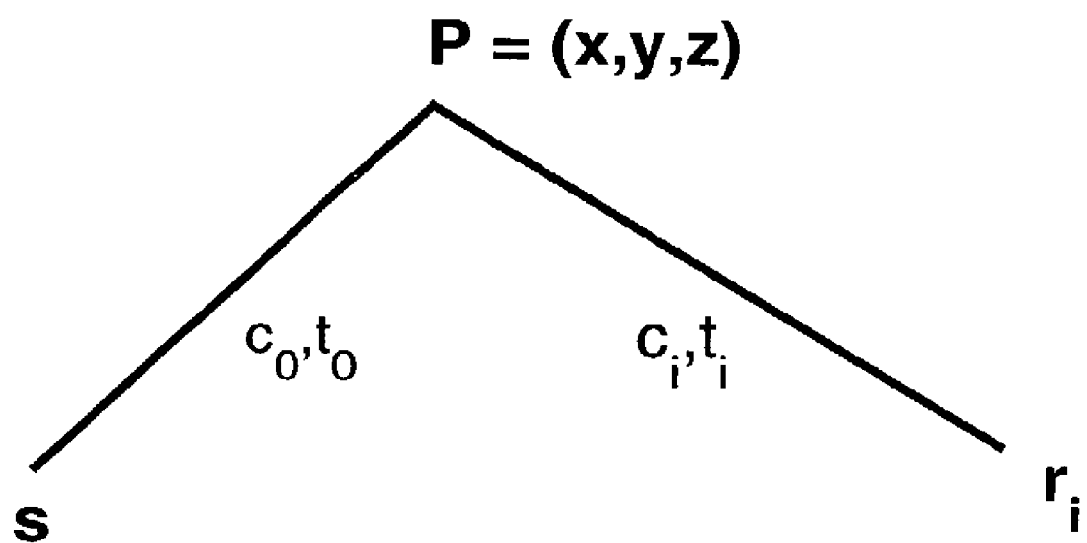

FIG. 14. Geometry for an isosigmachron. The travel time from s to primary point P plus from P to station $r_i$ is $t_0+t_1$, a known quantity. The effective speed of propagation between s and P, $c_0$, differs from the effective speed from P to $r_i$, $c_i$. The locus of points along which the sum of travel times, $t_0+t_1$ is constant defines an isosigmachron. The primary point P is one of the points on the isosigmachron.

Figure 15:
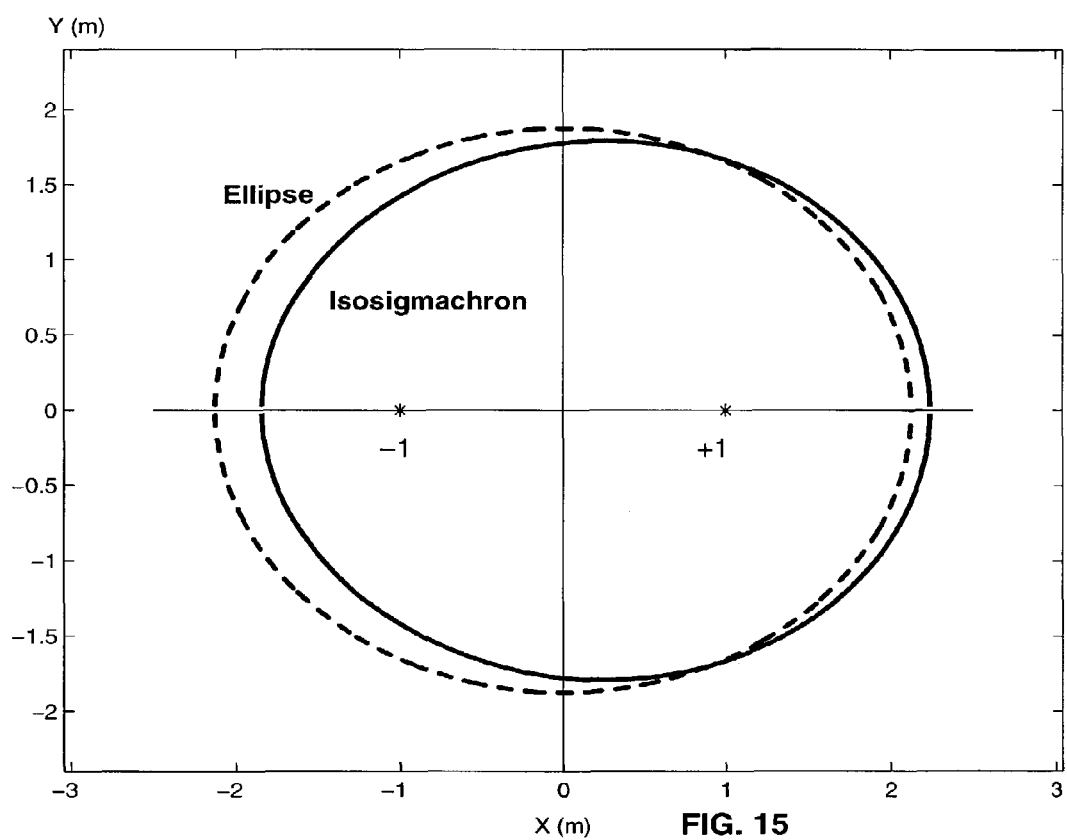

FIG. 15. Comparison of two-dimensional isosigmachron with ellipse. The isosigmachron is drawn for stations at Cartesian coordinates (±1, 0) (asterisks), and for speeds $c_0=3$ m/s and $c_1=2$ m/s respectively, assuming the travel time is T=1.7 s from the station at x=−1 to the isosigmachron and back to x=+1. The ellipse is drawn for the same stations and travel time but assuming the speed of propagation is the average of $c_0$ and $c_1$.

Figure 16:
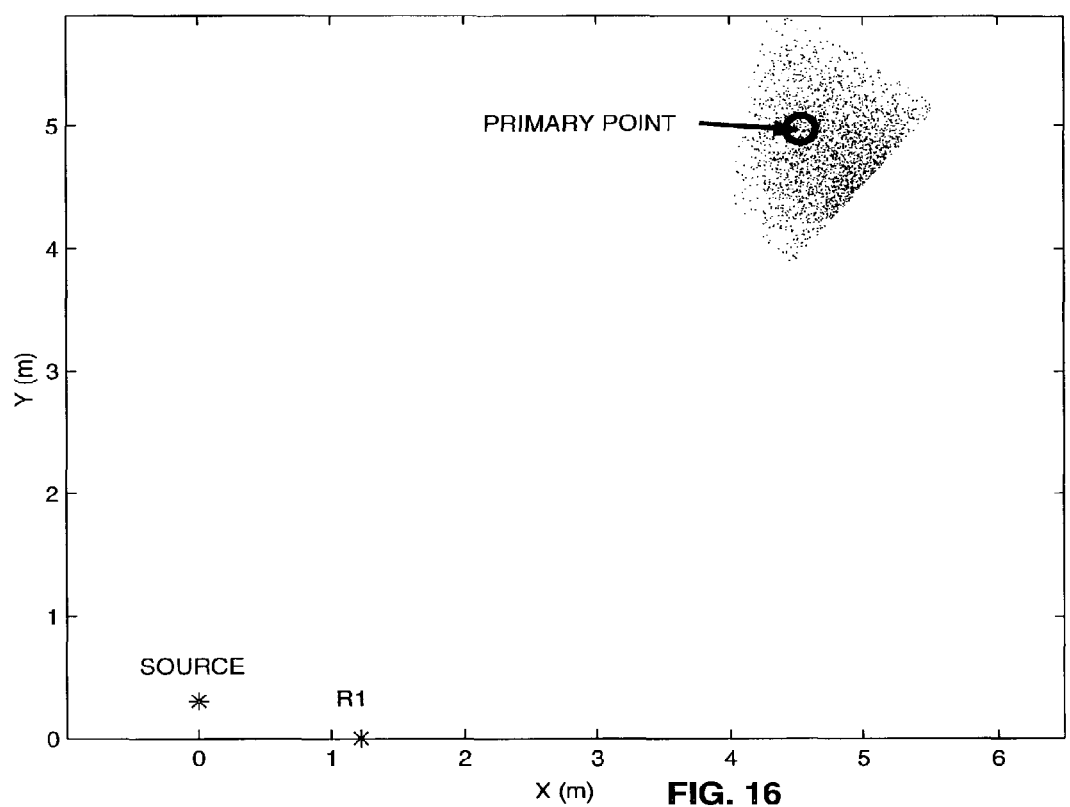

FIG. 16. Cloud of locations of the target after using travel time from source to primary point plus primary point to receiver 1 (R1) and using the information at R1 for the direction to the primary point.

Figure 17:
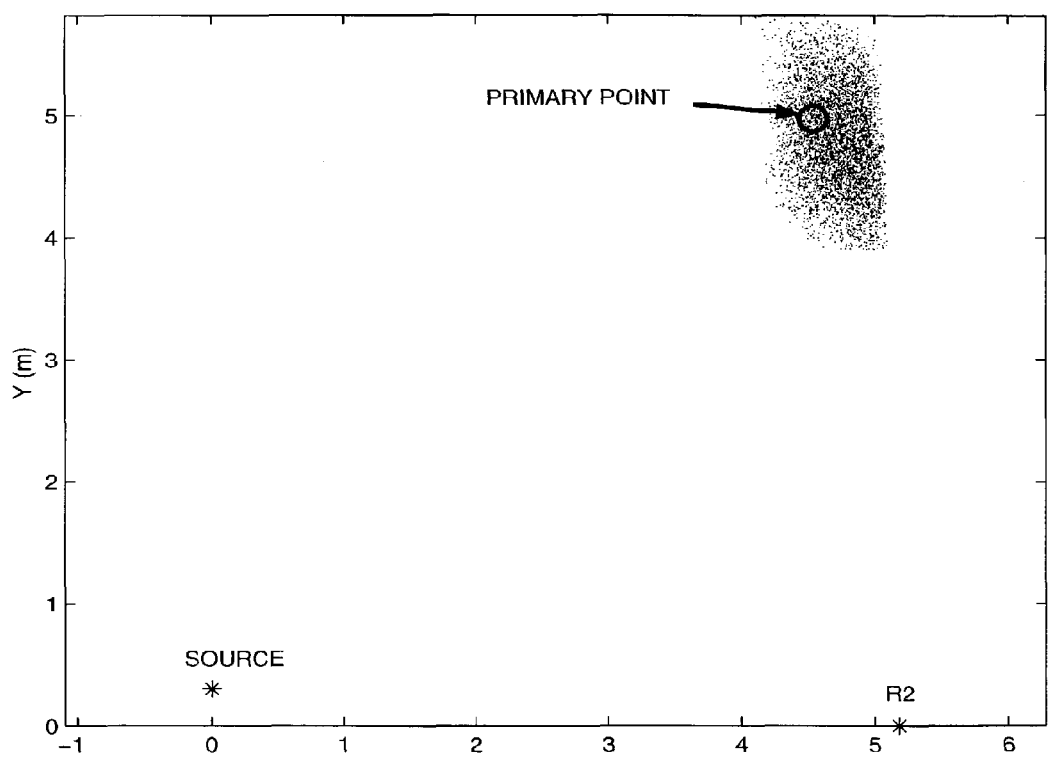

FIG. 17. Same as FIG. 16 except Sequential Bound Estimation is used to combine the travel time and directional data from receiver 1 and receiver 2 (R2).

Figure 18:
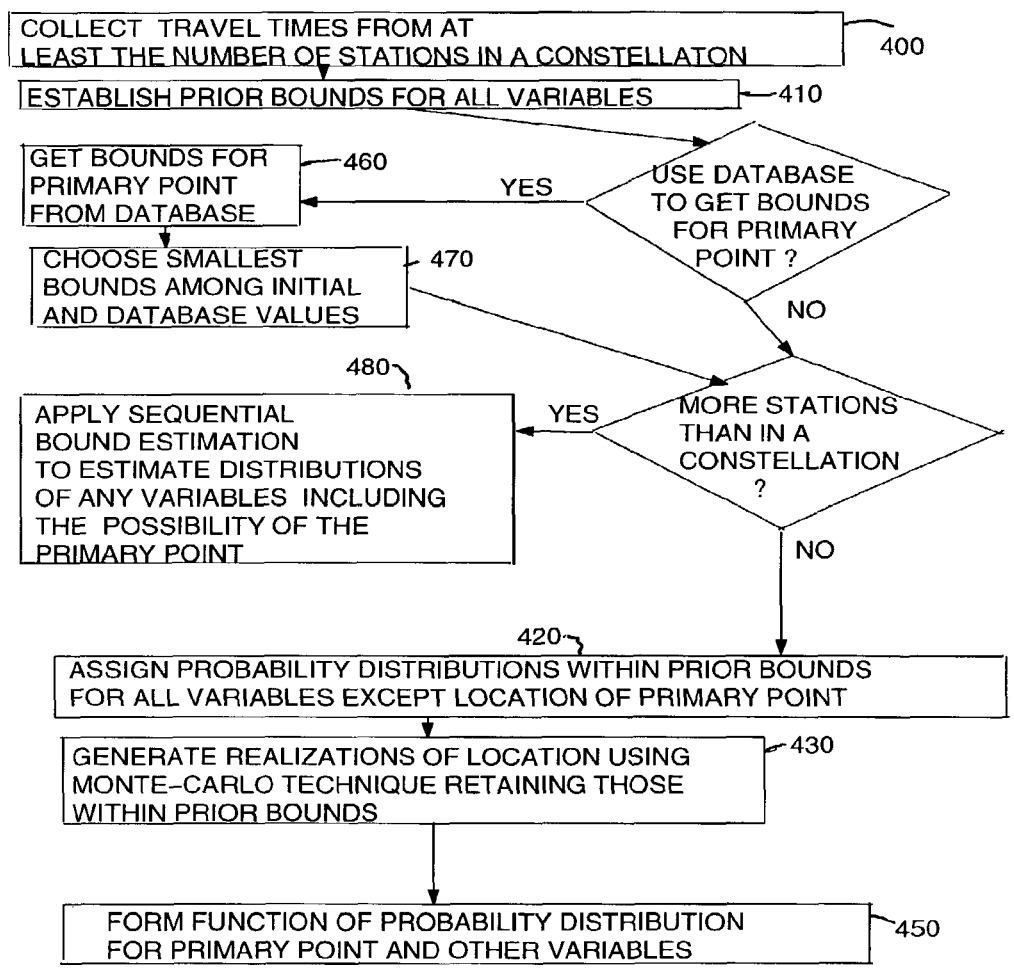

FIG. 18. Flowchart for estimating probability distribution for any variable related to isosigmachronic location.

Figure 19:
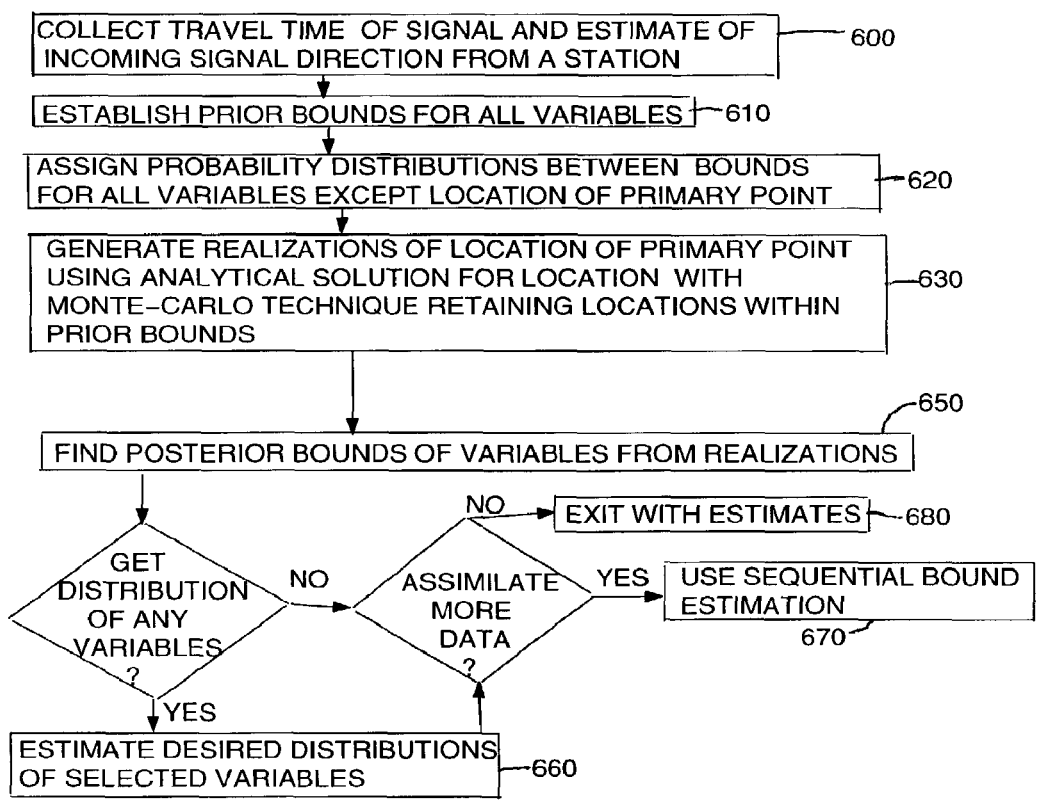

FIG. 19. Flowchart for estimating bounds and probability distributions of location of a primary point for ellipsoidal or isosigmachronic geometries when both the direction and time of the incoming signal are estimated at each station from the signal emitted at a source.

TABLE I Cartesian coordinates of arrays one and two (FIG. 7) and their standard deviations. Receiver one's location is defined to be the origin of the Coordinate system, and so has zero error. The y coordinate of receiver two is defined to be at y=0, and thus has zero error.

TABLE II 68% confidence limits for source locations for the two arrays listed in TABLE I. Results are given for linear and nonlinear analysis.

TABLE III Cartesian (x,y,z) coordinates for the five receivers shown in FIG. 3 of Spiesberger, Journal Acoustical Society America, Vol. 106, 837-846, 1999. Non-zero locations are measured optically within ±0.05 m.

TABLE IV 68% confidence limits for Standard Error Model L1 C/A no SA for the Global Positioning System (Table 2 in http://www.edu-observatory.org/gps/check_accuracy.html). Errors in some cases are translated into equivalent errors in the distance, L, of propagation using L=ct where the speed of light is c and t is time.

TABLE V Eight GPS receivers used for isodiachronic location. These are actual satellite locations near Philadelphia for a certain moment in time.

TABLE VI 68% confidence limits for the precise error model, dual-frequency, P(Y) code for no SA for the Global Positioning System (Table 4 in http://www.edu-observatory.org/gps/check_accuracy.html). Errors in some cases are translated into equivalent errors in the distance, L, of propagation using L=ct where the speed of light is c and t is time.

TABLE VII 68% confidence limits for the precise error model, dual-frequency, P(Y) code for no SA in differential model for the Global Positioning System (Table 4 in http://www.edu-observatory.org/gps/check_accuracy.html). Errors in some cases are translated into equivalent errors in the distance, L, of propagation using L=ct where the speed of light is c and t is time.

TABLE VIII Cartesian (x, y) locations (m) of the source, primary point, and five receivers for the ellipsoidal and isosigmachronic location experiments.

TABLE IX Times (s) for the inventor to walk from the source to primary point, and then from the primary point to each of five receivers (TABLE VIII) as measured by a stopwatch.

DESCRIPTION OF THE PREFERRED EMBODIMENTS

For a better understanding of the location techniques, reference may be had to the following detailed description taken in conjunction with the appended claims and accompanying drawings.

I. SEQUENTIAL BOUND ESTIMATION

A concise description of Sequential Bound Estimation is made first with some examples provided. Further understanding of the workings of the algorithm are provided later through many simulated and experimental examples.

Referring to FIG. 1, Sequential Bound Estimation starts by determining prior bounds for arguments of a primary function and bounds for the primary function itself 10. The term "bounds" in this context means the minimum and maximum value of an argument of the function or the minimum and maximum value of the primary function. If an argument of the primary function is a quantity other than a scaler, then bounds are established for each of the components. For example, the bound for the three-dimensional vector wind field consists of six numbers, an upper and lower bound for each of the (x, y, z) Cartesian components of the wind. The term "bound" refers to either the upper or lower value for a scaler quantity. In many location experiments, one establishes prior bounds for the location of the primary point, the locations of the stations, the speeds of propagation, and errors in the measurements.

As shown in the computer program called "sbnds_ttd-group.m" in the Appendix, one coordinate of the location of a source can depend on another variable, such as a different location coordinate; in other words, bounds need not be constants. If location is expressed in two dimensions (such as x-y coordinate pairs), for example, the bounds for the output location coordinate can depend on the value of the other coordinate. The computer program "sbnds_ttdgroup.m" divides x-y space into rectangles forming a grid and describes the bounds on the x location variable by identifying possible (i.e., in-bound) grid rectangles, allowing x to have different upper and lower bounds depending on the value of y.

In the context of this invention, the term "variables" is used to refer to the set of arguments of the primary function as well as values of the primary function itself. For isodiachronic location, the variables are the noisy measurements, the speeds of propagation between each station and the primary point, the winds, the noisy estimates for the locations of the stations, and the location of the primary point. Next, prior probability distributions are assigned to all arguments of the primary function. The distributions confine the arguments within their respective bounds 20. The primary function is excluded 20 because it is determined by its arguments.

A probability distribution is some complete way of describing the statistics of a variable. A probability distribution can be a probability density function. A cumulative density function, the Fourier transform of a probability density function, or other equivalent representations.

Using the first data, realizations of values of the primary function are generated from realizations of its arguments with a Monte-Carlo technique 30. Only values of the primary function within its prior bounds are retained. For example, some of the realizations may give rise to values of the primary function beyond its prior bounds. These values, and the realizations of arguments that generated these values are excluded from further consideration. For example, there may be sets of random locations for the receivers, speeds of propagation, winds, and measurement errors that lead to locations of a primary point that are beyond where the primary point could lie. Such exclusion can occur if one is locating an airplane and a particular set of arguments places its location underground.

The next step involves finding posterior bounds for the variables in the problem from the set that remain after using the Monte-Carlo technique 40. For a location problem, one can find the spatial bounds for a primary point, and bounds for each of the other variables that are used to generate the location such as the speed of propagation, the winds, the errors in the measurements, and the locations of stations.

The next set of data are used to repeat the process through one of two routes. If one desires to use a model to transition the posterior bounds for some or all of the variables, it can be done 60. The posterior bounds that are transitioned become the prior bounds for the next data 20. For a location problem, one may want to use a posterior bound for the x coordinate of a stationary receiver to be the prior bound for the x coordinate for use with the next data when this transition leads to a smaller interval for x. Or to take another example, one may want to use a model to change the posterior bounds to be consistent with the next set of data. In the location problem, suppose the first data are taken at 1 PM in the afternoon, and the posterior bounds for the speed of sound are between 330 and 333 m/s. If the next set of data are taken at 2 PM, one can use a model to expand the posterior bounds to 325 to 336 m/s corresponding to a growing uncertainty of the speed of sound with time. These become the prior bounds for the data taken at 2 PM.

Alternatively, one may desire to not transition posterior bounds, and proceed with the prior bounds for use with the next data 50. This can be done if the prior bounds are acceptable for use with the next data.

An important part of Sequential Bound Estimation is the assignment of the prior probability distribution after using the first data 20. Instead of transitioning the shapes of the distributions themselves from the first to second data, one approximates the prior distributions for the second and later data with a prior distribution that yields values for the variables only between their prior bounds. Bayes theorem and Kalman filters do not do this at all. Instead, Bayes theorem and Kalman filters have statistically rigorous procedures for transitioning the probability distributions. But as described before, there may be too many computations involved with Bayes theorem for practical use, and Kalman Filters usually deal only with simple distributions of variables like Gaussian distributions, that may not be at all realistic. Sequential Bound Estimation does not evolve the shape of the probability distribution for use with the next data. Instead Sequential Bound Estimation evolves bounds for the variables. A cautious practitioner may want to impose a distribution of maximum ignorance such as one that is uniform between an argument's associated bounds. As will be seen later in simulations and experiments, this method of assigning prior probability distributions is useful and is one of the features that makes Sequential Bound Estimation a robust algorithm.

The algorithm proceeds sequentially until there are no more data. At this point, final bounds are estimated for the variables 70.

The procedure for establishing final bounds 70 depends on the variable and whether bounds for that variable were transitioned. There are four possibilities. Two possibilities occur because a posterior bound may or may not be transitioned. Two other possibilities occur because the statistics of the quantity that is modeled by a variable, may be a function of the sequence step.

First, suppose posterior bounds for a variable are not transitioned and suppose the quantities' statistical properties do not change. For example, in a navigation problem, the quantity could be the x coordinate of a receiver that does not move. The variable would represent the x coordinate of a receiver. Let the upper and lower posterior bound for the variable for sequential step j be denoted as, $$\hat{V}_j \quad (2)$$

$$\check{V}_j \quad (3)$$

respectively. A final bound 70 is given by, $$\hat{V} = \min\{\hat{V}_k\}, k \in \{1, 2, 3, \ldots, J\} \quad (4)$$

$$\check{V} = \max\{\check{V}_p\}, p \in \{1, 2, 3, \ldots, J\}, \quad (5)$$

where there are at least two entries in each of the sets containing $\hat{V}_k$ and $\check{V}_p$ respectively. The best estimate of the final bounds are obtained in Eqs. (4,5) by using all J sets of data.

Second, suppose the posterior bounds for a variable are transitioned and suppose the quantities' statistical properties do not change. Then the posterior bound becomes the prior bound at the next step. For example, the x coordinate of a receiver may not change. Then the final bounds 70 for x are obtained from the J'th sequential step, namely $\hat{V}_J$ and $\check{V}_J$.

Third, suppose the posterior bounds for a variable are not transitioned and suppose the quantities' statistical properties do change. This may not be the wisest way to implement this algorithm, but it is possible to run the algorithm in this manner. This means that the bounds for the variable are the prior bounds established at step 10. Taking the same example as before, the x coordinate of a receiver changes with time. In this case, the prior bounds for this coordinate must be large enough to encompass all possible values of x. If it is somehow known that the change in x is very small for all sequential steps compared with its prior bounds, one can choose a final bound from Eqs. (4,5). Otherwise, one can choose the final bounds for x from the posterior bounds 40 at the sequential step desired.

Fourth, suppose the posterior bounds for a variable are transitioned and suppose the quantities' statistical properties do change. For example, suppose the x coordinate of a receiver changes with time. The variable would represent the x coordinate of a moving receiver. In this case, one must decide at which sequential step one desires a final bound. If the bounds for each step are small compared with the change in x, one specifies sequential step j and the final bounds can be obtained from $\hat{V}_j$ and $\check{V}_j$. On the other hand, it may be known ahead of time that the change in x may be very small compared with its posterior bounds from the sequential steps, so one may get excellent estimates from Eqs. (4,5). So in this case, it may be seen that judgment can be required for obtaining final bounds 70.

When it is desired to obtain further probability distributions of a variable, the procedure in 80 is implemented.

One function of a probability distribution are the variables' bounds. Other commonly used functions are 95% confidence limits, maximum liklihood values, median values, average values, or the identity function yielding the probability distribution itself, etc. A "function of a probability distribution" simply refers to a function applied to a probability distribution to obtain a desired summary of the statistical property of that variable.

To implement 80 it is first necessary to compute final bounds for the variable of interest for the sequential step desired 70. Empirical functions of the distributions are derived from the Monte-Carlo realizations of each variable that were previously computed. To show what is done, we examine the same four cases as above.

First, suppose the posterior bounds for a variable are not transitioned and suppose the quantities' statistical properties do not change. For example, in a navigation problem, the quantity could be the x coordinate of a receiver that does not move. The final bounds, given by Eqs. (4,5), are used to go back and retain only realizations of x between $\hat{V}^x$ and $\check{V}^x$ for each desired sequential step. One then chooses a criterion for the best function of the distributions. For example, realizations from sequential step p, truncated between $\hat{V}^x$ and $\check{V}^x$, may have the smallest 95% confidence intervals, and those are the outputs 80.

Second, suppose the posterior bounds for a variable are transitioned and suppose the quantities' statistical properties do not change. Then the final bounds 70 for x are obtained from the J'th sequential step, namely $\hat{V}_J$ and $\check{V}_J$. The realizations from step J automatically fall within these posterior bounds. One then chooses a function of the distribution from those realizations of x from step J to produce the desired function of the distribution.

Third, suppose the posterior bounds for a variable are not transitioned and suppose the quantities' statistical properties do change. Taking the same example as before, suppose the x coordinate of a receiver changes with time. If it is somehow known that the change in x is very small compared with its prior bounds for all sequential steps, one can choose a final bound from Eqs. (4,5). These final bounds, are used to go back and retain only realizations of x between $\hat{V}^x$ and $\check{V}^x$ for each desired sequential step. One then chooses the step p yielding the best values for the function of the probability distribution of x 80. On the other hand, if x changes significantly compared with the interval of its prior bounds, one can choose the posterior bounds for x at step 40 corresponding to the sequential step desired, and obtain the desired function of its probability distribution from the realizations at that step.

Fourth, suppose the posterior bounds for a variable are transitioned and suppose the quantities' statistical properties do change. For example, the x coordinate of a receiver changes with time. If the posterior bounds for each step are small compared with the change in x, the posterior bounds in 40 can be the final bounds and the desired function of x's distribution 80 is derived from the realizations of x 30. If the change in x is very small compared with the its posterior bounds 40, the bounds, $\hat{V}^x$ and $\check{V}^x$, can be the final bounds 70. One then uses the realizations of x at 40 within $\hat{V}^x$ and $\check{V}^x$ at each sequential step, and the function of the probability distribution of x is computed for each of the sequential steps. This function, for each step j, yielding the best value, is output 80

It is important to note that Sequential Bound Estimation does not attempt to combine different distributions for a particular variable to obtain an optimal distribution for that variable. Bayes rule provides a means for combining different data to obtain a single distribution. But because there are so many computations required to implement Bayes theorem for many problems of interest, Sequential Bound Estimation can be used instead because it provides an efficient and useful approximation for obtaining probability distributions.

Like other sequential algorithms, Sequential Bound Estimation can be run backward to improve the quality of the estimates. For example, suppose after using data set 2 from the forward direction, that the posterior bounds for variables before transitioning 60 are denoted $\hat{V}_2^+$ and $\check{V}_2^+$. For the reverse run, let the posterior bounds immediately after using data set 2 be denoted $\hat{V}_2^-$ and $\check{V}_2^-$. The best upper and lower bounds from the forward and backward runs are given by the minimum of $\{\hat{V}_2^+, \check{V}_2^-\}$ and the maximum of $\{\hat{V}_2^+, \check{V}_2^-\}$ respectively. One simple way to implement Sequential Bound Estimation is to place the J sequential data in the order $d_1$, $d_2$, $d_3$, ..., $d_J$, $d_{J-1}$, $d_{J-2}$, $d_{J-3}$, ..., $d_1$ and run the algorithm for this ordering.

Sequential Bound Estimation has the desirable feature in that it can detect problems with the data, or assumptions about the variables, and so save a user from believing everything is ok when it is not. For example, suppose data are accidentally mis-ordered and prior and posterior bounds are found for the x coordinate of a non-moving receiver. Further suppose that the posterior bounds are not transitioned. Sequential Bound Estimation may then end up with a posterior upper bound for x for one datum that is less than a posterior lower bound for x from a different datum. This is impossible and Sequential Bound Estimation cannot produce a feasible solution because something is wrong with its inputs. The algorithm halts at the point when final bounds are estimated 70. Another possibility occurs when the algorithm yields few or no realizations of a variable within its assigned bounds 40. If there are no realizations within prior bounds, the algorithm needs to stop. Stopping the algorithm is desirable for quality control so one can go back and figure out what went wrong. Not all algorithms have this property. For example, linear and nonlinear least squares produce answers regardless of many problems with data. For the purpose of catching problems early, it may be established that something is wrong if fewer than a minimum number of realizations are obtained for the value of a primary function, where the minimum number can be zero or some small positive value compared with the number of Monte-Carlo realizations.

It is important to note that Sequential Bound Estimation is a robust algorithm. Its results are insensitive to nonlinearities in the system and to details within the distributions of the variables, especially when distributions are chosen to have the least information as found with uniform distributions 20.

II. PROBABILITY DISTRIBUTIONS FOR HYPERBOLIC LOCATION

In this related invention, hyperbolic locations are estimated from differences in distance or differences in travel time to infer differences in distance, given a speed of signal propagation. The use of the word "data" in the context of hyperbolic location means either differences in distance or differences in travel time, depending on what type of data are measured.

The word "variables" in this discussion refers to the data, estimates of a location, estimates for the speed of propagation, and estimates for the locations of stations.

The invention provides a method to obtain any function of the probability distribution for the location of a primary point and for any other variable that functionally influences the location of the primary point such as the location of a station. The method for accomplishing these goals is related to Sequential Bound Estimation as will be described below.

A constellation of stations is defined to be the minimum number required to obtain an unambiguous solution when all constraints, if any, are imposed on any of the variables in the problem. An unambiguous solution is one in which there is only one location of a primary point if one had perfect and noiseless estimates for the data, and the locations of the stations. For example, in three spatial dimensions without any a priori finite bounds for the location of a primary point, a constellation consists of four stations for primary points in some locations, and of five stations if primary points occur in other locations (Spiesberger, J. Acoustical Society America, Vol. 109, 3076-3079. 2001). With the introduction of bounds or constraints of other types, the number of stations in a constellation may decrease.

Referring to FIG. 2, data are collected from a constellation of stations 90. Prior bounds are established for the primary point and for all variables that affect its location 100.

An optional database of pre-computed simulated data may be used to quickly compute the spatial bounds encompassing the primary point 150. The smallest bounds (between the prior set and those from the database) are used to establish prior bounds of the probability distributions for the primary point 110. The database is computed using realizations of data from a Monte-Carlo technique. The region of space within the prior bounds for the primary point is subdivided into cells giving hypothetical locations of the primary point. The primary point is assigned a uniform distribution within each cell, but another distribution could be used. The Monte-Carlo technique is used to generate realizations of data given realizations for the location of the primary point in each cell, realizations of the winds, speed of propagation if using travel time differences, and locations of the stations. The minimum and maximum values of the simulated data are stored in a database for each cell. Bounds for the primary point are computed by finding the cells having minimum and maximum values of simulated data that bound each corresponding data within measurement errors.

With or without the optional database, probability distributions are established for all variables except the primary point 110. These distributions may be uniform if one desires maximum uncertainty. For example, one may establish that the x coordinate of station three is uniformly distributed between 10 and 10.8 m.

The Monte-Carlo technique is used to generate realizations of the primary point using an analytical solution for location 120. Realizations lying outside the initial bounds for the primary point are excluded. It is important to link each realization of variables to its associated realization of the primary point. At the end of this step 120, one has sets of realizations of variables each linked with the location of a primary point. Any function of the probability distribution for the primary point or other variable may be computed from these sets of realizations 140.

The procedure for estimating posterior bounds and functions of probability distributions from realizations of any variables is like that done in Sequential Bound Estimation except one is not using a sequence of data. So the method in this related invention could be called Bound Estimation.

The speeds of propagation in this method may include the effects of advection, such as winds, on the time it may take a signal, such as sound, to propagate between two points. Because hyperbolic locations assume a single speed, the affects of advection can be partly accounted for by increasing bounds on the signal speeds without advection by additive amounts of $\pm |U|$ where $|U|$ is the magnitude of the largest advection in the problem.

Like Sequential Bound Estimation, this algorithm can detect problems with the data, or assumptions about the variables by yielding no solutions for a variable that are consistent with the assumptions. The algorithm must halt if an inconsistency is found 120. One can also inform the user and possibly halt the algorithm if there are fewer than a minimum number of acceptable realizations within prior bounds.

III. LOCATING SOUNDS USING FOUR OR FIVE RECEIVERS WITH INHOMOGENEOUS SOUND SPEED FIELD

Instead of least-squares, a Monte-Carlo technique is used to estimate a probability distribution of location from each constellation of stations. For a constellation, the speed of propagation, winds, and locations of receivers are treated as random variables with some probability distribution. The probability distribution can be obtained from theory, data, or a guess. When guessing, it may be advantageous to let the probability distribution have the largest possible bounds with the most ignorance so as to not overestimate the accuracy of a location. For example, suppose one believes the x location of a primary point is at 10 m with an error of two centimeters. Then the associated probability distribution for this parameter can be taken to be a uniformly distributed random variable in the interval [9.8, 10.2] m. With the a priori probability distribution, the various values of the sound speed, winds, and station locations yield possible locations of a primary point that occupy a cloud in three-dimensional space. The actual primary point must lie within the intersection of the clouds from different constellations. The final probability distribution for the primary point is estimated from the distributions within the constellations. The density function has the benefit of being able to yield many useful values such as an average location, maximum likelihood location, and any desired confidence limit, including upper and lower bounds.

In much of what is discussed below, the primary point is treated as a source of acoustic waves and these waves are picked up at receivers. The mathematics is the same for electromagnetic propagation, except that winds and currents do not affect the speed of electromagnetic propagation as they do for acoustic propagation. The mathematics is also the same if one is trying to locate a receiving point from differences in propagation time from pairs of synchronized transmitters, such as occurs for some location techniques for cellular phones and GPS. Hyperbolic and isodiachronic location techniques apply equally to these situations.

Instead of restricting the speed of sound to be a constant, it is allowed to have a different average value between the source and each receiver. Although five receivers are required in general to locate a source in three dimensions in a homogeneous sound speed field, there are spatial regions where only four are required (Schmidt, 1972). When ambiguous solutions occur with four receivers, the ambiguity is resolved with the travel time difference between the first and fifth receiver. The presentation below thus starts with a minimum constellation of four receivers.

The distance between the ith receiver at $\vec{r}_i$ and a source at $\vec{s}$ is $\|\vec{r}_i - \vec{s}\|$ so we have $\|\vec{r}_i - \vec{s}\|^2 = c_i^2 t_i^2 = c_i^2(\tau_{i1} + t_1)^2$. The average speed and travel time of sound between the source and receiver i are $c_i$ and $t_i$ respectively. $\tau_{i1} \equiv t_i - t_1$ and $\vec{s}$ is a column vector with Cartesian coordinates $(s_x, s_y, s_z)^T$ where T denotes transpose. Putting the first receiver at the origin of the coordinate system, one subtracts the equation for i=1 from i=2, 3, and 4 to get, $$\|\vec{r}_i\|^2 - 2\vec{r}_i^T \vec{s} = c_i^2 \tau_{i1}^2 + 2c_i^2 \tau_{i1} t_1 + t_1^2(c_i^2 - c_1^2).$$

This simplifies to, $$R\vec{s} = \tfrac{1}{2}\vec{b} - t_1 \vec{f} - t_1^2 \vec{g}, \qquad (6)$$

where, $$R \equiv \begin{pmatrix} r_2(x) & r_2(y) & r_2(z) \\ r_3(x) & r_3(y) & r_3(z) \\ r_4(x) & r_4(y) & r_4(z) \end{pmatrix}; \vec{b} \equiv \begin{pmatrix} \|\vec{r}_2\|^2 - c_2^2 \tau_{21}^2 \\ \|\vec{r}_3\|^2 - c_3^2 \tau_{31}^2 \\ \|\vec{r}_4\|^2 - c_4^2 \tau_{41}^2 \end{pmatrix}; \vec{f} \equiv \begin{pmatrix} c_2^2 \tau_{21} \\ c_3^2 \tau_{31} \\ c_4^2 \tau_{41} \end{pmatrix}, \qquad (7)$$

and, $$\vec{g} \equiv \frac{1}{2} \begin{pmatrix} c_2^2 - c_1^2 \\ c_3^2 - c_1^2 \\ c_4^2 - c_1^2 \end{pmatrix}, \qquad (8)$$

and where the Cartesian coordinate of $\vec{r}_i$ is $(r_i(x), r_i(y), r_i(z))$. Eq. (6) simplifies to, $$\vec{s} = R^{-1} \frac{\vec{b}}{2} - R^{-1} \vec{f} t_1 - R^{-1} \vec{g} t_1^2, \qquad (9)$$

that can be squared to yield, $$\vec{s}^T \vec{s} = \|\vec{s}\|^2 = \frac{a_1}{4} - a_2 t_1 + (a_3 - a_4) t_1^2 + 2 a_5 t_1^3 + a_6 t_1^4, \qquad (10)$$

where $$\alpha_1 \equiv (R^{-1}\vec{b})^T(R^{-1}\vec{b})$$

$$\alpha_2 \equiv (R^{-1}\vec{b})^T(R^{-1}\vec{f})$$

$$\alpha_3 \equiv (R^{-1}\vec{f})^T(R^{-1}\vec{f})$$

$$\alpha_4 \equiv (R^{-1}\vec{b})^T(R^{-1}\vec{g})$$

$$\alpha_5 \equiv (R^{-1}\vec{f})^T(R^{-1}\vec{g})$$

$$\alpha_6 \equiv (R^{-1}\vec{g})^T(R^{-1}\vec{g})$$

(11)

and $R^{-1}$ is the inverse of R. A solution for $t_1$ is obtained by substituting, $$\|\vec{s}\|^2 c_1^2 t_1^2, \qquad (12)$$

for $\|\vec{s}\|^2$ in Eq. (10) to yield a quartic equation in $t_1$, $$a_6 t_1^4 + 2 a_5 t_1^3 + (a_3 - a_4 - c_1^2) t_1^2 - a_2 t_1 + \frac{a_1}{4} = 0, \qquad (13)$$

that can be solved analytically or numerically with a root finder. Valid roots from Eq. (13) are finally used to estimate the location of the source using Eq. (9). Note that if the sound speed is spatially homogeneous, i.e. $c_i = c_1 \ \forall \ i$, then the cubic and quartic terms vanish and the resulting quadratic equation is that found before for hyperbolic location (Spiesberger and Wahlberg, Journal Acoustical Society of America, Vol. 112, 3046-3052, 2002).

Ambiguous solutions occur for a spatially homogeneous sound speed field when there are two positive roots to the quadratic equation. For each ambiguous source location, one can generate a model for $\tau_{51}$ and choose the root for $t_1$ that yields a model for $\tau_{51}$ that is closest to that measured. In the cases investigated here, the quartic equation (13) can yield four distinct positive values for $t_1$. This can only happen because the speed of propagation is spatially inhomogeneous. Because the values of $c_i$ are similar here, the four distinct roots yield two pairs of source locations, one pair of which is relatively close to the receivers and the other pair of which is located very far from the receivers. The distant pair is due to the fact that locations are not exactly determined by intersecting hyperboloids for a spatially inhomogeneous speed of propagation. The actual three dimensional locus of points specified by a travel time difference is thus not a hyperboloid.

More precisely, the hyperboloid is the locus of points $\vec{s}$ satisfying, $$\|\vec{r}_i - \vec{s}\| - \|\vec{r}_j - \vec{s}\| = c \tau_{ij}, \qquad (14)$$

where the spatially homogeneous speed of propagation is c. $\tau_{ij} \equiv t_i - t_j$. Letting the speed be different yields the definition of the isodiachron which is the locus of points satisfying, $$\frac{\|\vec{r}_i - \vec{s}\|}{c_i} - \frac{\|\vec{r}_j - \vec{s}\|}{c_j} = \tau_{ij}, \ c_i \neq c_j \qquad (15)$$

which turns out to depend on the Cartesian coordinates through a fourth order polynomial. The values of $c_i$ can incorporate spatially inhomogeneous effects such as winds as well as wave speeds. The coefficients of the third and fourth powers in x, y, and z and their combinations become very small compared to the coefficients in the second, first, and zero powers as the various $c_i$ approach the same value c.

A. Geometry of Isodiachrons

The geometry of an isodiachron is described because it is a new geometrical surface that is important in locating primary points. A mathematical definition of an isodiachron is provided in Eq. (15). When $c_i$ and $c_j$ do not depend on the coordinate of the source, the two dimensional isodiachron approximates a hyperbola in a limited region (FIG. 3). Unlike a hyperbola, for which the difference in distance between $\vec{s}$ and $\vec{r}_i$ and $\vec{r}_j$ and is constant, isodiachrons do not contain points approaching infinity. Instead, the assumption that the difference in propagation time be constant and that the average speeds of propagation are independent of $\vec{s}$ constrains isodiachronic locations to finite distances (FIG. 3).

When the speeds of propagation do not depend on the location of $\vec{s}$, the Cartesian representation of the isodiachron in two dimensions is, $$\alpha_1 y^4 + \alpha_2 y^2 + \alpha_3 = 0, \quad (16)$$

where $$a_1 \equiv \frac{c_j^4 - 2c_i^2 c_j^2 + c_i^4}{c_i^4 c_j^4} \quad (17)$$

$$a_2 \equiv 2(c_i^4 c_j^4)^{-1}(c_j^4 x^2 + c_j^4 x_0^2 + c_i^4 x^2 + c_i^4 x_0^2 - 2c_j^2 x^2 c_i^2 + 2c_j^4 x x_0 - 2c_j^2 c_i^2 x_0^2 - c_j^4 \tau_{ij}^2 c_i^2 - \tau_{ij}^2 c_i^4 c_j^2 - 2c_i^4 x x_0) \quad (18)$$

$$a_3 \equiv x^4(c_j^4 - 2c_i^2 c_j^2 + c_i^4)/(c_i^4 c_j^4) + \quad (19)$$
$$(c_i^4 c_j^4)^{-1}(c_j^4 x_0^4 + 4c_j^4 x^3 x_0 + 6c_j^4 x^2 x_0^2 + 4c_j^4 x x_0^3 - 2c_j^4 x_0^2 c_i^2 + \tau_{ij}^4 c_i^4 c_j^4 - 4c_i^4 x^3 x_0 + 6c_i^4 x^2 x_0^2 - 4c_i^4 x x_0^3 - 2c_j^4 x^2 \tau_{ij}^2 c_i^2 + 4c_j^2 x^2 c_i^2 x_0^2 - 4c_j^4 x x_0 \tau_{ij}^2 c_i^2 - 2c_j^4 x_0^2 \tau_{ij}^2 c_i^2 + c_i^4 x_0^4 - 2\tau_{ij}^2 c_i^4 c_j^2 x^2 + 4\tau_{ij}^2 c_i^4 c_j^2 x x_0 - 2\tau_{ij}^2 c_i^4 c_j^2 x_0^2)$$

where the receivers are at Cartesian coordinates $(-x_0, 0)$ and $(x_0, 0)$. The solution for y in terms of x can be simplified by substituting $z=y^2$ in Eq. (16) which yields a quadratic equation in z. If z is real-valued and non-negative, solutions for y are given by $\pm\sqrt{z}$ for a given value of x. Equation (16) describes a hyperbola when $c_i = c_j$.

Isodiachrons take on values of $y=0$ at four values of x. Setting $y=0$ in Eq. (15), the roots of x occur at (for $x_0 > 0$), $$x = \frac{c_i c_j \tau_{ij} + (c_i + c_j) x_0}{c_i - c_j}; x < -x_0 \quad (20)$$

$$x = \frac{c_i c_j \tau_{ij} + (c_i - c_j) x_0}{c_i + c_j}; -x_0 \leq x \leq x_0$$

$$x = \frac{c_i c_j \tau_{ij} - (c_i + c_j) x_0}{c_j - c_i}; x_0 < x.$$

These yield four roots for x for values of $\tau_{12}$ of opposite sign.

A three-dimensional isodiachron can be formed by rotating the two dimensional isodiachron around the axis joining $-x_0$ to $x_0$ (FIG. 3). It has been noted above that the closed form solution for isodiachronic location can yield four solutions from four receivers. This can be understood geometrically as follows. The first pair of receivers constrains the source to an isodiachron. A third receiver introduces a second isodiachron which can intersect the first one along two different ellipse-like curves (e.g. in the region between x between 0.5 and 1 in panel B of FIG. 3). A fourth receiver introduces a third isodiachron which can intersect the two ellipse-like curves at most four points. In this case, a fifth receiver is needed to determine which of the four points is correct.

Because isodiachronic and hyperbolic surfaces can deviate significantly from one another in the vicinity of the receivers, hyperbolic locations can yield incorrect answers while isodiachronic locations are correct.

A related invention that is useful for applying Sequential Bound Estimation involves the analytical solution for isodiachronic location of a primary point. Referring to FIG. 4, differences in travel time are collected from a constellation of stations 200. Estimates for the speed of the signal are obtained between the primary point and each station 210. When advection of the medium does not significantly affect the delay of the signal between the stations and the primary point, one computes the location of the primary point using an analytical formula 230. It is possible that the analytical equation for isodiachronic location does not yield a real valued solution. This can happen when estimates of the speeds of propagation and station locations are not close enough to their true values.

Attention now turns to FIG. 5 for a discussion of iteration. If the effects of advection due such things as winds or currents significantly affect the time of travel between the primary point and a station, a bound for the location of the primary point is established 240. Because the actual location of the primary point is unknown, the precise travel time change between the primary point and each station due to advection is initially unknown. So a guess is made within prior bounds for the location of the primary point 250. The effective speed between the primary point and each station is computed using the vector projection of the advection along the straight line between the primary point and each station. The effective speed also includes the non-advective component of speed 260. For example, the speed of sound may be 330 m/s, while the effects of the winds are +1 m/s from the primary point to station one. The effective speed from the primary point to station one is therefore 330+1=331 m/s.

The location of the primary point is estimated using an analytical formula given the effective speeds. If this location is close enough to the most recent guess for this location, one exits the iterative procedure with a solution for the location of the primary point 280. Otherwise, the analytical solution for the location of the primary point is used to compute another set of effective speeds to each station until the convergence criterion is either met 280 or exceeded 290. In practical application of this idea, convergence is usually obtained after one or two iterations of the analytical solution.

Like Sequential Bound Estimation, the algorithm shown in FIG. 4 can detect problems with the data, or assumptions about the variables by yielding no solutions for the location of the primary point 230.

In a related invention now refer to FIG. 6. In this case, the goal is to estimate any function of the probability distribution of any variable playing a role in isodiachronic location. The word "variable" in this context means either an argument to the primary function yielding location or the value of this primary function.

Differences in travel time are estimated from a number of stations equal to or exceeding the number in a constellation 300. Prior bounds are established for all variables 310. Optionally, a database of synthetic differences in travel time is used to establish possibly smaller bounds for the location of the primary point 360, 370.

If the number of stations equals the number in a constellation, probability distributions are assigned to each variable within prior bounds except for the location of the primary point that is nonlinearly related to the other variables 320. Realizations of primary points are obtained by applying the analytical solution for the location of the primary point to each set of variables using a Monte-Carlo technique 330. Because this is an isodiachronic problem, the effective speed of propagation for one path is allowed to differ from that for another path in the same realization of a primary point. Realizations leading to primary points outside of its prior bounds are excluded from further consideration 330. The remaining realizations are used to form any function of the probability distribution of any variable 350.

Realizations of primary points here includes the possibility that advection can alter the travel time differences enough to represent a significant effect. In this case, one iterates the analytical solution until convergence is achieved or until convergence is not achieved, and the realization is discarded. This idea is subsumed in FIG. 5 at step 330. Details of iterating the analytical solution are described in FIG. 5.

Like Sequential Bound Estimation, this algorithm can detect problems with the data, or assumptions about the variables by yielding no solutions for the location of the primary point. These problems stop the algorithm and the user can investigate the cause of the problem 360, 380, 330 in FIG. 6. The program can also halt execution if there are fewer than a minimum acceptable number of realizations. It must stop execution if there are zero realizations found at step 330 or within 380.

IV. PROBABILITY DENSITY FUNCTIONS FOR SOURCE LOCATION FROM RRECEIVER CONSTELLATIONS

When $\vec{r}_i$, $\tau_{ij}$, and $c_i$ are random variables, then $t_1$ and $\vec{s}$ are random variables because of Eqs. (9,13). For later convenience in comparing to linear theories, consider the situation where $(r_i(x), r_i(y), r_i(z))$, $\tau_{ij}$, and $c_i$ are mutually uncorrelated Gaussian random variables with given means and variances.

A computer generates a single random configuration of variables for a constellation of four receivers. Each configuration consists of the set $\{r_i(x), r_i(y), r_i(z), \tau_{ij}, c_i\}$ for some i, j∈1, 2, 3, ..., $\mathcal{R}$ and i>j. Then for each constellation, of which there are a total of, $$N \equiv \binom{\mathcal{R}}{4} = \frac{\mathcal{R}!}{(\mathcal{R}-4)!4!}, \tag{21}$$

a source location is computed from Eq. (9) if that equation yields a unique location. If any constellation yields more than one location from this equation, a location is chosen to be that yielding the closest difference in travel time to a randomly chosen fifth receiver and receiver number one.

A valid configuration from a receiver constellation is one in which the source location lies within some pre-determined spatial limits. For example, one would know that sounds from snapping shrimp occur below the surface of the water. If a receiver constellation yields a location above the surface, then that particular configuration of random variables could not have occurred in reality, and that source location is discarded.

Valid configurations from a receiver constellation define a cloud of source locations. Accurate probability density functions of location require a sufficient number of valid configurations. A sufficient number is generated for each of the N constellations.

Some constellations give better locations of the source than others. This happens for several reasons, and is usually due to the geometrical arrangement of the receivers. For example suppose the source is near the geometric center of a pyramid and one constellation consists of four receivers on the vertexes of the pyramid. That constellation would be able to locate the source rather well. Then consider another constellation of four receivers located close to a line at a great distance from the source. This constellation would not be able to locate the source as well.

The only physically possible locations for the source lie within the intersections of the clouds. The other source locations are invalid. Here, the upper and lower bounds of the intersected region, $(\hat{X}, \check{X})$, $(\hat{Y}, \check{Y})$, and $(\hat{Z}, \check{Z})$, are estimated along the Cartesian axes. If $(\hat{x}_c, \check{x}_c)$, $(\hat{y}_c, \check{y}_c)$, and $(\hat{z}_c, \check{z}_c)$ denote the maximum and minimum values of x, y, and z for cloud c, then the region of intersection is, $$\hat{X} = \min(\hat{x}_1, \hat{x}_2, \hat{x}_3, \ldots \hat{x}_N)$$

$$\check{X} = \max(\check{x}_1, \check{x}_2, \check{x}_3, \ldots \check{x}_N)$$

$$\hat{Y} = \min(\hat{y}_1, \hat{y}_2, \hat{y}_3, \ldots \hat{y}_N)$$

$$\check{Y} = \max(\check{y}_1, \check{y}_2, \check{y}_3, \ldots \check{y}_N)$$

$$\hat{Z} = \min(\hat{z}_1, \hat{z}_2, \hat{z}_3, \ldots \hat{z}_N)$$

$$\check{Z} = \min(\check{z}_1, \check{z}_2, \check{z}_3, \ldots \check{z}_N) \tag{22}$$

For each cloud c, locations outside of the bounds in Eq. (22) are discarded. New probability density functions are formed from the remaining locations in each cloud for the x, y, and z values separately. It is not expected that the new probability density functions would asymptotically approach one another because each constellation will be able to locate the source with a different quality.

The probability density functions for the source in its x, y, and z coordinates are dependent distributions. This can be accommodated by forming the joint probability density function of location for each cloud if desired. This is not done here.

P percent confidence limits are estimated by finding the P percent confidence limits for each cloud separately using its probability density functions in x, y, and z. The Cartesian upper and lower bounds for a specified confidence limit for constellation c are denoted $[\hat{P}_c(x), \check{P}_c(x)]$, $[\hat{P}_c(y), \check{P}_c(y)]$, and $[\hat{P}_c(z), \check{P}_c(z)]$. The final bounds for the source are chosen from the smallest bound for x, y, and z from each constellation. For example, suppose constellation p has the smallest value of $\hat{P}(x) - \check{P}(x)$ for all values of c, constellation q has the smallest value of $\hat{P}(y) - \check{P}(y)$ for all values of c, and constellation r has the smallest value of $\hat{P}(z) - \check{P}(z)$ for all values of c. Then the final confidence limits for the source are $[\hat{P}_p(x), \check{P}_p(x)]$, $[\hat{P}_q(y), \check{P}_q(y)]$, and $[\hat{P}_r(z), \check{P}_r(z)]$.

V. EXAMPLES OF HYPERBOLIC AND ISODIACHRONIC LOCATIONS

Examples below utilize 2000 valid configurations of random variables to estimate probability density functions for each cloud.

A. Hyperbolic Location

Because error bars derived from linearized hyperbolic location techniques assume the signal speed is spatially homogeneous, comparison with a linear theory is done using a spatially homogeneous value of 1475 m/s. The travel time differences are computed for this speed. In the error analysis, the sound speed is assumed to be a Gaussian random variable with mean 1475 m/s and standard deviation of 10 m/s. This standard deviation is realistic if one considers paths emitted from a shallow source to receivers at perhaps 3 m and 100 m depth because the surface region can be very warm compared with temperatures below. Travel time differences are assumed to be mutually uncorrelated Gaussian random variables with means given by true values and standard deviations of 0.0001414 s. Receiver locations are assumed to be mutually uncorrelated Gaussian random variables with means given by their true values and standard deviations as shown in Table I.

TABLE I

|  | x (m) | y (m) | z (m) |
|---|---|---|---|
|  | ARRAY 1 | | |
| R1 | 0 ± 0 | 0 ± 0 | 0 ± 0 |
| R2 | 1000 ± 2 | 0 ± 0 | 0 ± 1 |
| R3 | 1000 ± 2 | 1000 ± 2 | 0 ± 1 |
| R4 | 0 ± 2 | 1000 ± 2 | 0 ± 1 |
| R5 | 0 ± 5 | 0 ± 5 | −100 ± 5 |
| SOURCE | 551 | 451 | −100 |
|  | ARRAY 2 | | |
| R1 | 0 ± 0 | 0 ± 0 | 0 ± 0 |
| R2 | 1414 ± 2 | 0 ± 0 | 0 ± 1 |
| R3 | 534 ± 2 | 400 ± 2 | 0 ± 1 |
| R4 | 1459 ± 5 | −1052 ± 5 | −25 ± 5 |
| R5 | 1459 ± 20 | −1052 ± 20 | −95 ∓ 20 |
| R6 | 0 ± 20 | 0 ± 20 | −100 ± 20 |
| R7 | 1414 ± 20 | 0 ± 20 | −100 ± 20 |
| SOURCE | 860 | 47 | −5 |

The errors in the travel time differences and receiver locations may not be mutually uncorrelated as assumed above. For example, errors in $\tau_{i1}$ may be correlated with $\tau_{j1}$ because both involve $t_1$. Also, for example, the errors in the location of receiver 3 are not necessarily uncorrelated between two constellations that both contain receiver 3. Linear error analysis can accommodate correlations between random variables, as can the non-linear analysis done here. However, incorporating these correlations leads to larger computational times in the non-linear analysis, so they are not implemented. Error models that follow are done assuming that random variables are mutually uncorrelated for both the linear and non-linear analysis. We found that the results were identical for the linear analysis (Spiesberger and Wahlberg, 2002) when the random variables were correlated.

To mimic marine examples, array one has five receivers separated by O(1000) m horizontally and up to 100 m vertically (FIG. 7, Table I). The five receiver constellations (Eq. 21), one through five, are {1, 2, 3, 4}, {1, 2, 3, 5}, {1, 2, 4, 5}, {1, 3, 4, 5}, and {2, 3, 4, 5} respectively. The 100% confidence limits for the source are computed from Eq. (22) for increasing numbers of constellations where N is set to 1, 2, 3, 4, and 5 respectively in this equation for FIG. 8. As more clouds are intersected, the limits for the source decrease monotonically, with the biggest improvement occurring with the addition of constellation two with one. Constellation one only uses the receivers at z equal zero. Constellation two is the first one that includes the receiver at z=−100 m. This deeper receiver not only helps in locating the source's vertical coordinate, but significantly helps locate the horizontal coordinates as well. The probability density functions for the source location come from constellations two and four (FIG. 9). These density functions appear to be approximately Gaussian. The 68% confidence limits span only a few meters in the horizontal coordinates and are about 50 m in the vertical coordinate (Table II). The confidence limits from the non-linear analysis are about a factor of ten less than those from the standard linear analysis of errors in the horizontal coordinates. The non-linear analysis has smaller limits because the hyperboloids are not well approximated by planes in the horizontal directions as required by the linear analysis. Non-linear analysis yields somewhat larger limits in z than linear analysis (Table II). Similarity of results in z indicates that the hyperboloids are fairly well approximated as planes in the vertical coordinate in the vicinity of the source.

TABLE II

| CARTESIAN | 68% CONFIDENCE LIMITS (m) | |
|---|---|---|
| COORDINATE | NON-LINEAR | LINEAR |
|  | ARRAY 1 | |
| x | 550 to 552 | 530 to 573 |
| y | 450 to 452 | 432 to 471 |
| z | −145 to −77 | −121 to −80 |
|  | ARRAY 2 | |
| x | 860 to 865 | 236 to 1486 |
| y | 46 to 62 | −1890 to 1988 |
| z | −138 to 65 | −163 to 153 |

Array two has seven receivers with the largest horizontal and vertical separations being about 1400 and 100 m respectively (FIG. 7). There are 35 receiver constellations (Eq. 21) of which the first four provide most of the accuracy for locating the source at the 100% confidence limits (FIG. 10). These constellations are the first of the 35 that include all the deeper receivers. There are modest increases in accuracy from other constellations, most notably 29 and 33. The probability density functions in the x-y-z coordinates come from constellations 7, 4, and 26 respectively (FIG. 11). The distributions in x and y do not look very Gaussian, while the distribution in z looks more Gaussian-like. These departures from Gaussian distributions are quite different than the Gaussian distributions usually assumed from linear analysis. This time, the 68% confidence limits from the non-linear analyses are two orders of magnitude smaller than those from standard linear analysis in x and y (Table II). The linear and non-linear confidence limits are similar for the vertical coordinate.

B. Isodiachronic Location

Consider a situation where the speed of sound is similar, but not exactly the same between each source and receiver. Consider an atmospheric example for locating a sound at Cartesian coordinate (20,100,7) m from five receivers at (0,0, 0), (25,0,3), (50,3,5), (30,40,9), and (1,30,4) m respectively. The speed of sound is a typical 330 m/s. The speed of propagation is made to be inhomogeneous by introducing a wind of 10 m/s in the positive y direction. Next, simulated values of the travel time differences are computed using these values. The source is located using hyperbolic and isodiachronic location. It will be seen that only isodiachronic location yields a correct solution.

All Gaussian random variables in this simulation are truncated to have a maximum of two standard deviations for the following two reasons. First, many experimental situations are inaccurately represented by assuming that random variations differ from an estimate by say 10 standard deviations. Instead, it is more realistic to truncate the variations. Second, it is important to note that a realistic truncation is easy to impose with the models developed here but is difficult to implement with analytical and linear approximations for error.

The standard deviation for receiver locations is 0.02 m. The variations are zero for the x, y, and z coordinates of receiver 1, the y and z coordinates of receiver 2, and the z coordinate of receiver 3. The coordinates with zero variations merely define the origin and orientation of the coordinate system. The x and z components of the winds are modeled to have a value of 0 m/s. For hyperbolic location, the speed of acoustic propagation must be spatially homogeneous. The mean and standard deviation for sound speed are 330 m/s and 10 m/s respectively. For isodiachronic location, the speed of propagation is inhomogeneous. The speed of sound is taken to be 330 m/s. The a priori value of the wind in the y direction has mean 0 and standard deviation 10 m/s. Values of the speed of acoustic propagation, $c_i$ between receiver i and the source are unknown because the location of the source is initially unknown. Therefore, it is impossible to precompute the component of the wind vector along the direction from the source to each receiver. Instead, the value for each $c_i$ is computed using an iterative procedure. First, the spatial limits for the source are obtained by searching a pre-computed data base of travel time differences as a function of source location. These travel time differences are generated using the assumptions for receiver, measurement, and environmental uncertainties described above. The first guess for the location of the source is obtained by choosing a location at random within the spatial bounds. Next, the effects of winds on the data are computed by using this location guess and the locations of the receivers into account. Then the speed of propagation between the source and each receiver is computed, and a solution for source location is obtained from the quartic equation for isodiachronic location. This solution is used as a new guess for the location of the source, from which a new set of speeds of propagation are computed between this source and the receivers, and again an isodiachronic solution for source location is obtained. This procedure continues until the difference between the guessed location and the location from the isodiachronic locations reaches a specified small enough threshold, at which point iteration ceases. The only points used to form points within the clouds are those for which the iteration converges.

The error in travel time due to the straight path approximation is typically less than a microsecond at these ranges. The travel time differences are derived with ideal values for means and from a standard deviation of 16 µs. The 16 µs value is derived from standard methods for an r.m.s. bandwidth of 1000 Hz and a peak signal-to-noise ratio of 20 dB in the cross-correlation function of the signals between receivers.

Incorrect locations are obtained using the hyperbolic method. For example, the source's 100% confidence limits for y are 102.0 to 108.1 m m, but its actual y coordinate is 100 m. So given a priori variations of receiver locations, travel time differences, and environmental variations, the hyperbolic method always yields incorrect answers.

With isodiachronic location, 95% confidence limits for the source are x: 16.6 to 20.5 m, y: 98.8 to 101.7 m, z: 3.5 to to 40.5 m. These are statistically consistent with the correct answer. Other confidence limits could be given but they are not shown because the point is that isodiachronic location yields a correct answer at a stringent confidence of 95%.

Another case where isodiachronic location would be useful is one where the speed of sound is quite different between the source and each receiver. In this case, hyperbolic locations would be inappropriate to use because the speed of sound is not nearly constant in space. For example suppose low frequency sources such as Finback whales are located.

Suppose some receivers close to the source pick up only the first acoustic path through the sea, while other distant receivers pick up only the acoustic path that propagates below the sea-floor because the paths through the water are blocked by the sea-mounts. The speed of propagation along the water and solid-Earth paths can differ by more than a factor of two (Spiesberger and Wahlberg, 2002). In other scientific fields, sounds can propagate to receivers along paths with different speeds of sound, such as from vehicles where paths propagate through the air and ground.

C. EXPERIMENTAL DATA

1. First Experiment

An experimental example is given for hyperbolic and isodiachronic locations.

On 24 Jun. 1991, eight microphones were set up at the inventor's house at 15 Redwing Terrace, North Falmouth, Mass. Signals from the microphones were cabled to a PC were the signals were digitized. Acoustic signals were played from an audio speaker at Cartesian coordinate (11.07±0.05, 14.67±0.05, −4.82±0.13) m. The coordinates of the eight microphones were (0,0,0), (20.064, 0, −4.947), (32.876, 13.637, −4.649), (17.708, 22.766, −4.479), (1.831, 15.718, 0.951), (19.888, 9.177, −4.570), (13.710, 6.437, −0.518), and (28.982, 18.491, −6.515) m. The locations were measured optically and were accurate within ±0.1 m horizontally and ±0.026 m vertically. The relative humidity was about 55% and the temperature was about 23.5° C., given a speed of sound of about 347 m s$^{-1}$. The speed of the wind was less than 1 m s$^{-1}$. The speaker emitted a narrowband signal near 1700 Hz with a bandwidth of a few hundred Hertz.

The accuracy of the straight path approximation is about 0.1 µs for these conditions. The signals from microphones one through eight are cross-correlated, yielding estimates for $\tau_{j1}$, j=2, 3, 4, . . . 8.

For hyperbolic location, the speed of sound is allowed to vary by ±4 m s$^{-1}$. Each Cartesian components of the wind varies up to ±2 m s$^{-1}$. There are 35 constellations of receivers with eight receivers, where only the constellations involving $\tau_{j1}$, j=2, 3, 4, . . . 8 are used. The 100% limits for the source are for x: 10.94 to 11.17 m; y: 14.58 to 14.88 m; z: −5.26 to −4.16 m. These are consistent with the optically surveyed location of the source.

For isodiachronic location, the same values are assumed for the random variables. The data base of travel time differences yields bounds for the source within x: 10 to 14 m; y: 12 to 16 m; z: −10 to +6 m. Within these bounds the isodiachronic location method yields 100% limits for the source within x: 10.79 to 11.42; y: 14.46 to 15.00; z: −5.48 to −3.65 m. These are consistent with the location of the speaker.

2. Second Experiment

On 4 Jun. 1995, five omni-directional microphones recorded sounds from a Redwing Blackbird, in Port Matilda, Pa. (Bird B1 in FIG. 3 of Spiesberger, Journal Acoustical Society America, Vol. 106, 837-846, 1999). Isodiachronic location is done using published data (Table 2 in Spiesberger, 1999). The reference speed of sound is 344 m/s. A priori distributions of other variables are taken to be Gaussian and truncated at one standard deviation. The standard deviations for the differences in travel times is 0.000067 s. The standard deviation of the speed of sound is 2 m/s. The standard deviation of each horizontal component of the wind is 2 m/s. The standard deviation of the vertical component of the wind is 0.5 m/s. The standard deviation of the travel time due to the straight path approximation is 0.1 µs. The standard deviation of each Cartesian coordinate of a receiver is 0.05 m/s except as follows.

Receiver one is defined to be at the origin without error. Receiver two is defined such that the y axis passes through it and its z coordinate is zero. Receiver three is defined such that its z coordinate is zero. These definitions merely define the absolute location and rotation of the coordinate system (Table III).

TABLE III

| RECEIVER | CARTESIAN COORDINATE (m) | | |
|---|---|---|---|
| | x | y | z |
| R1 | 0 | 0 | 0 |
| R2 | 19.76 | 0 | 0 |
| R3 | 17.96 | −18.80 | 0 |
| R4 | 2.34 | −29.92 | −0.02 |
| R5 | −12.41 | −14.35 | −0.43 |

With five receivers, there are five constellations of receivers. Hyperbolic locations and their probability distributions are estimated using Sequential Bound Estimation. A priori bounds for the location of the Redwing Blackbird are taken to be huge, namely x and y: $-10^9$ to $10^9$ m; z: −2900 m to +100 m. Cartesian coordinates have 95% and 100% confidence limits of (9.74±0.038, 7.79±0.50, 0.36±4.8) m and (9.74±0.048, 7.68±0.73, 0.43±5.3) m respectively. Both estimates are consistent with 95% confidence limits for the location of the bird, namely (9.8±0.5, 6.8±0.5, 2.3±1) m (Table IV in Spiesberger, 1999).

With isodiachronic location, a priori distributions of random variables are the same except the speed of sound is allowed to independently vary for each section with standard deviation of 2 m/s, truncated at one standard deviation as before. The a priori bounds for the location of the Redwing Blackbird are smaller than before, namely x: 5 to 10 m; y: 5 to 15 m; z: −5 to +10 m. These limits are obtained using a simulated database as will be explained shortly. Cartesian coordinates have 95% and 100% confidence limits of (9.73±0.15, 7.74±1.3, 0.58±5.4) m and (9.73±0.22, 7.96+1.9, 0.98±6.0) m respectively. These are consistent with the location of the bird (above).

The database of simulated data is constructed by subdividing Cartesian space within x and y: −30 to +30 m and z from −5 to +10 m with cells of rectangular parallelepipeds with sides of length about 3 m. Within each cell, the probability distribution of a simulated bird is assumed to be uniformly distributed. Probability distributions for the speeds of propagation, winds, and locations of the receivers are the same as used for isodiachronic location as described above. Monte-Carlo realizations are used to generate thousands of differences in travel times from each cell. The maximum and minimum values of the simulated differences in travel time are stored in a database. The data of travel time differences are compared to the simulated maximum and minimum values from each cell. If the maximum and minimum values of all simulated travel time differences are consistent with measured travel time differences within measurement error, the cell is a possible location for the Redwing Blackbird. Otherwise that cell is not further considered for the location of the bird. After applying this method, the a priori bounds for the Redwing Blackbird reduce to x: 5 to 10 m; y: 5 to 15 m; z: −5 to +10 m.

D. Global Positioning System

The Global Positioning System (GPS) allows receivers to locate themselves through measurements of the difference in travel time of electromagnetic waves between synchronized emissions from the satellites and the receiver. Location is traditionally achieved using hyperbolic location techniques.

1. Standard Error Model L1 C/A and No Selective Availability

The simulation of location accuracy with isodiachronic location is made for a GPS receiver using the Standard Error Model L1 C/A and no Selective Availability (SA) (Table IV). Using the errors in Table IV, a commercially available GPS receiver can locate itself horizontally within 10.2 m at the 68% confidence interval (Table 2 in http://www.edu-observatory.org/gps/check_accuracy.html). Using identical errors, isodiachronic location yields a 68% confidence limit of 6.3 m, about half that obtained from a standard GPS receiver.

The isodiachronic location assumes that location is made from only one set of data from eight GPS receivers (Table V), so there is no averaging or filtering in time or space of any data. The increase in location accuracy is solely due to the way that location is estimated isodiachronically. The isodiachronic location uses no additional information over and above that collected by a GPS receiver.

TABLE IV

| Type of Error | 68% Confidence limit |
|---|---|
| Satellite position for each of (x, y, z) Cartesian coordinates | 2.1 m |
| Satellite clock bias | 2. m of path distance |
| Satellite clock random error | 0.7 m |
| Ionosphere bias | 4 m |
| Troposphere bias | 0.5 m |
| Multipath bias | 1 m |
| Receiver measurement bias | 0.5 m |
| Receiver random measurement error | 0.5 m |

TABLE V

| Satellite | Elevation (deg) | Azimuth (deg) |
|---|---|---|
| GPS BIIA-23 (PRN 04) | 40.1 | 222.9 |
| GPS BIIA-20 (PRN 07) | 65.2 | 319.5 |
| GPS BIIA-21 (PRN 09) | 14.7 | 312.8 |
| GPS BIIR-03 (PRN 11) | 18.67 | 51.8 |
| GPS BIIR-04 (PRN 20) | 37.0 | 87.3 |
| GPS BII-08 (PRN 21) | 36.4 | 84.7 |
| GPS BIIA-11 (PRN 24) | 8.2 | 223.3 |
| GPS BIIR-05 (PRN 28) | 64.2 | 149.7 |

In the simulation above, Sequential Bound Estimation is used to simultaneously solve for the location of the GPS receiver, the speed of light between the receiver and each satellite, and for the correction of location for each satellite.

2. Precise Error Model, Dual-frequency, P(Y) Code, No Selective Availability, No Differential Capability This simulation is similar to that in the previous section except this is for a dual-frequency GPS unit without access to differential data.

The simulation of location accuracy with Sequential Bound Estimation is made for a Precise error model, dual-frequency, P(Y) code with errors given by Table 4 of http://www.edu-observatory.org/gps/check_accuracy.html. The errors from this table are repeated in Table VI here. This case does not have selective availability.

Using the errors in Table VI, a commercially available GPS receiver can locate itself horizontally within 6.6 m at the 68% confidence interval (Table 4 in http://www.edu-observatory.org/gps/check_accuracy.html). Using identical errors, isodiachronic location yields a 68% confidence limit of 4.3 m.

The isodiachronic location is made from only one set of data from eight GPS receivers (Table V), so there is no averaging or filtering in time or space of any data. It appears that the increase in location accuracy is solely due to the way that location is estimated. The isodiachronic method uses no additional information over and above that collected by a GPS receiver.

TABLE VI

| Type of Error | 68% Confidence limit |
| --- | --- |
| Satellite position for each of (x, y, z) Cartesian coordinates | 2.1 m |
| Satellite clock bias | 2. m of path distance |
| Satellite clock random error | 0.7 m |
| Ionosphere bias | 1 m |
| Troposphere bias | 0.5 m |
| Multipath bias | 1 m |
| Receiver measurement bias | 0.5 m |
| Receiver random measurement error | 0.5 m |

In this simulation, Sequential Bound Estimation is used to simultaneously solve for the location of the GPS receiver, the speed of light between the receiver and each satellite, and for the correction of location for each satellite.

3. Differential GPS Location with Dual Frequency

This simulation is similar to that in the previous section except this is for a dual-frequency GPS unit with access to differential data from a reference station.

The simulation of location accuracy with Sequential Bound Estimation is made for a Precise error model, dual-frequency, P(Y) code with errors given by Table 4 of http://www.edu-observatory.org/gps/check_accuracy.html for differential GPS. The errors from this table are repeated in Table VII here. This case does not have selective availability.

Using the errors in Table VII, a commercially available GPS receiver can locate itself horizontally within 3 m at the 68% confidence interval (Table 4 in http://www.edu-observatory.org/gps/check_accuracy.html). Using identical errors, isodiachronic location yields a 68% confidence limit of 1.7 m.

The isodiachronic location assumes that location is made from only one set of data from eight GPS receivers (Table V), augmented with data from a differential GPS station, so there is no averaging or filtering in time or space of any data. It appears that the increase in location accuracy is solely due to the way that location is estimated isodiachronically. The isodiachronic algorithm uses no additional information over and above that collected by a GPS receiver.

TABLE VII

| Type of Error | 68% Confidence limit |
| --- | --- |
| Satellite position for each of (x, y, z) Cartesian coordinates | 2.1 m |
| Satellite clock bias | 0. m of path distance |
| Satellite clock random error | 0. m |
| Ionosphere bias | 0.1 m |
| Troposphere bias | 0.1 m |
| Multipath bias | 1.4 m |
| Receiver measurement bias | 0.5 m |
| Receiver random measurement error | 0. m |

In this simulation, Sequential Bound Estimation is used to simultaneously solve for the location of the GPS receiver, the speed of light between the receiver and each satellite, and for the correction of location for each satellite.

VI. SEQUENTIAL BOUND ESTIMATION

It is useful to further discuss Sequential Bound Estimation to exemplify its workings.

For hyperbolic and isodiachronic locations in three spatial dimensions, steps for Sequential Bound Estimation could be, 1. Partition the stations into groups of four. For R stations there are P=R!/(R−4)!4! such groups called "constellations.". If a fifth station is needed to resolve a solution ambiguity, that fifth station is chosen at random from the remaining R−4 stations.
2. Form a priori distributions for variables affecting the location of the primary point. Those variables are the locations of the stations, the speeds of signal propagation, the winds or currents (if any), and the travel time differences.
3. Use Monte-Carlo simulations to generate spatial clouds for the location of the primary point for each of the P groups.
4. Form upper and lower bounds for the primary point by intersecting the P clouds. This can be done at the end or sequentially.
5. Discard primary points for each group that are outside the intersected region.
6. Form new probability distributions for the primary point for each group from the remaining primary points within the intersected region.
7. The probability distribution for the primary point location is chosen from the group giving the smallest specified confidence limits for each of the x, y, and z Cartesian coordinates.

1. Incorporating Temporal Evolution from Models

Like a Kalman filter, Sequential Bound Estimation can incorporate a model to transition variables from one time to another. A simple model is used here to demonstrate how Sequential Bound Estimation is used to estimate locations of receivers and the sound speed field from a temporal sequence of sounds at unknown locations. This joint location/tomography problem is nonlinear. It is not known if a correct solution can be achieved by linearizing the equations that connect these variables.

The bounds for the temporal evolution from times $t_1$ to $t_2$ of the sound speed field, relative to a reference speed, are given by, $$\delta\hat{c}_r(t_2) = \min\left\{+|c_{max}|, \hat{c}_r(t_1) + |t_2 - t_1|\left|\frac{d\delta c_r}{dt}\right|\right\}, \quad (23)$$

$$\delta\check{c}_r(t_2) = \max\left\{-|c_{max}|, \check{c}_r(t_1) - |t_2 - t_1|\left|\frac{d\delta c_r}{dt}\right|\right\},$$

where the average deviation of speed between the source and receiver r is $\delta c_r(t)$, the maximum deviation is $|c_{max}|$, the maximum allowed rate of change of the fluctuation is $$\left|\frac{d\delta c_r}{dt}\right|,$$

and upper and lower bounds are denoted by ^ and ˇ respectively. Eq. (23) is a method for relaxing prior constraints on bounds to maximum limits at a specified maximum rate of change. In the absence of further data, the bounds expand to a priori values. Bounds for the winds obey similar relationships.

In the simulations given later, it is assumed that receivers do not move, but their locations are uncertain. Thus the spatial limits for receiver r for group p are those determined from the previous group's limits; i.e. the limits determined from group p−1.

B. Surveying with Data

Sequential Bound Estimation is applied to provide information about the location of the x coordinate of receiver two (Table III) from Sec. V, part C, No. 2 above. The information is provided only from the sounds recorded on the five microphones from one call of a Redwing Blackbird. In particular, the a priori statistics are unchanged except as follows. The reference location of receiver two is changed from (19.76, 0, 0) to (21, 0, 0). The a priori probability distribution is Gaussian with mean of 21 m and standard deviation of 1.5 m, with variation truncated at one standard deviation. It is important to note that the algorithm does not know that the x coordinate of receiver two is really 19.76±0.05 m but instead only knows that it is 21±1.5 m.

Sequential Bound Estimation is applied to each of the five receiver constellations in sequential order. At the end of this algorithm, it is found that the 95% confidence limits for the x coordinate of receiver two are between 19.50 and 21.98 m. This is consistent with the correct answer of 19.76±0.05 m. Additionally, the 95% confidence interval 19.5 to 21.98 m, is smaller than the a priori range from 19.5 to 22.5 m. Furthermore, the resulting probability distribution of the x coordinate is highly skewed toward 19.76 m (FIG. 12). Therefore, Sequential Bound Estimation yields statistically significant information about the location of the x coordinate of receiver two that is obtained only through use of the sounds from a single call of a Redwing Blackbird.

Simulation for Estimation of Signal Propagation Speed

Sequential bound estimation is used to find a probability distribution for the homogeneous component of the sound speed when the locations of the receivers are well known. Six receivers are distributed in air over a region of about 30 m by 30 m (FIG. 13). Their elevations are about 2 m except for receiver 6 which is at an elevation of 7 m. The initially unknown locations for 10 sources are chosen at random (FIG. 13). The sources are assumed to produce sound at 10 s intervals. The elevations of the sources are assumed to be between 3 and 6 m.

The errors in the travel time differences are taken to be Gaussian with standard deviation of 0.0001 s, but the errors are truncated at one standard deviation.

The speed of sound is composed of spatially homogeneous and inhomogeneous components.

The homogeneous component is about 329.5 m s$^{-1}$. It is allowed to vary at a maximum rate of 0.01 m s$^{-2}$, so in 10 s, it can vary by 0.1 m s$^{-1}$.

The initial estimates for the receiver locations are incorrect. The Cartesian coordinate of each receiver is selected from a uniform distribution having a span of ±0.05 m on either side of the true value. No error is assigned to the location of receiver one (defined to be the origin), to the y and z coordinates of receiver two, and the z coordinate of receiver three because these merely define the origin and orientation of the coordinate system. The a priori errors for the initial estimates are taken to be independently distributed Gaussian random variables with means at the incorrect locations and standard deviations of 0.098 m, except the distributions are truncated at one standard deviation.

Mild values for the winds are assumed. The mean values for the winds in the x, y, and z directions are zero. The x, y, and z components of the winds are allowed to fluctuate as Gaussian random variables with mean zero and standard deviations of 1 m s$^{-1}$ except for the z component with a standard deviation of 0.5 m s$^{-1}$. The variations are truncated at one standard deviation. The maximum rate of change of any component of the wind is 1 m s$^{-2}$.

The speed of sound is composed of spatially homogeneous and inhomogeneous components. The inhomogeneous component may vary from section to section by up to ±0.1 m s$^{-1}$ at a maximum rate of 0.01 m s$^{-2}$. The actual value for the homogeneous component is about 329.5 m s$^{-1}$. It is allowed to vary at a maximum rate of 0.01 m s$^{-2}$, so in 10 s, it can vary by 0.1 m s$^{-1}$. Before data are taken, it is assumed that the spatially homogeneous component of the sound speed is uniformly distributed in the interval 330±50 m s$^{-1}$. Following the use of source one, the lower and upper bounds for the deviation are 330−6.9 and 330+5.3 m s$^{-1}$. Following the use of source two, these bounds are 330−3.1 and 330+2.7 m s$^{-1}$. These bounds do not change significantly following the use of sources three through ten. The correct value of the speed of sound, about 329.5 m s$^{-1}$, falls within the bounds provided by Sequential Bound Estimation. Sequential Bound Estimation shows the initial uncertainty of ±50 is reduced by a factor of about 16. An uncertainty of ±3 m s$^{-1}$ is equivalent to ±5° C.

Consider adding four additional receivers at Cartesian coordinates (20, 0, 3), (−20, 22, 4), (25, 21, 2), and (−5, 3, 3) m. Modeling the environment and receiver errors in the same way as above, it is found that the homogeneous component of the sound speed field has 100% confidence limits between 330−2.5 m s$^{-1}$ and 330+1.7 m s$^{-1}$ following the use of the first three sources. The uncertainty of about ±2.1 m s$^{-1}$ is equivalent to ±3.5° C. The source locations are different than above, but are similarly situated and not chosen to optimize any measure of performance.

VII. ADDITIONAL APPROACHES FOR LOCATION

A. Constraints

Besides the use of travel time differences themselves, locations may be constrained by other data or equations. For example, it may be known that an emitter of sound or electromagnetic energy is on the surface of the Earth. There may be an equation describing this surface. This constraint reduces the number of receivers required to obtain an unambiguous solution.

It is important to distinguish between an ambiguous solution and the infinite number of location solutions arising from errors in variables. The distinction can be made by assuming for the moment that measurements of arrival time difference are made without error and the variables such as the speeds of signal propagation are known exactly and the locations of stations are known exactly. Then, if the equations for location yield a unique solution, an unambiguous solution exists. Otherwise, an ambiguous solution exists. Schmidt (1972) identifies regions where ambiguous and unambiguous solutions occur for hyperbolic location. When one adds errors in measurements and uncertainties to the variables, the actual location of the primary point becomes blurred into a region of space containing an infinite number of locations in this bounded region.

The addition of a constraint on the location of a primary point can sometimes reduce the number of stations required to obtain an unambiguous solution.

One can use many types of constraints to reduce the number of receivers in a constellation. Constraints that have been used include differential Doppler (when there is relative motion between the primary point and the stations), altitude measurements of a primary point being located with GPS, a priori information about the location of a primary point, etc.

VIII. ELLIPSOIDAL AND ISOSIGMACHRONIC LOCATION: THEORY

A. Isosigmachronic Location

When the speed of propagation between one station and a primary point differs from the speed between the primary point and a different station location, ellipsoidal location can no longer be utilized in a strict sense. The method for obtaining an analytical solution for the location of a primary point in this situation is derived here in a manner analogous to that used for isodiachronic location. Instead of an ellipse defined by the locus of points along which the sum of distances is constant from two stations, an "isosigmachron" is defined to be the locus of points along which the sum of travel times is constant from two stations when the speeds differ.

1. Solution Using Four Receiver Constellation

Let the location of a primary point be $P \equiv [x\ y\ z]^T$ in Cartesian coordinates where T denotes transpose. Suppose a signal from a source at $\vec{s}$ propagates to the primary point with effective speed $c_0$ with a time of $t_0$ (FIG. 14). Then suppose the signal then propagates to station $r_i$ from primary point $\vec{P}$ with effective speed $c_i$ and time $t_i$. It is assumed that $t_0 + t_i$ is known unlike the situation for hyperbolic or isodiachronic location in which only differences in arrival time are known at the outset.

Define the sum of travel times as, $$T_i \equiv t_0 + t_i, \tag{24}$$

so $$t_i = T_i - t_0. \tag{25}$$

The distance squared between $\vec{P}$ and $\vec{r}_i$ is, $$\|\vec{P} - \vec{r}_i\|^2 = c_i^2 t_i^2. \tag{26}$$

Put Eq. (25) in (26) to get, $$\|\vec{P} - \vec{r}_i\|^2 = c_i^2 (T_i - t_0)^2. \tag{27}$$

Without loss of generality, the origin is defined to be at $\vec{r}_1$ so $\vec{r}_1 = \vec{0}$. For i=1 in Eq. (27) we get, $$\|\vec{P}\|^2 = c_1^2 (T_1 - t_0)^2. \tag{28}$$

Subtract Eq. (28) from (27) to get, $$\|\vec{P} - \vec{r}_i\|^2 - \|\vec{P}\|^2 = c_i^2 (T_i - t_0)^2 - c_1^2 (T_1 - t_0)^2,\ \ i=2,3,4$$

which simplifies to, $$R\vec{P} = \frac{\vec{b}_e}{2} - t_0 \vec{f}_e - t_0^2 \vec{g}_e,\ i = 2, 3, 4 \tag{29}$$

where $$R \equiv \begin{pmatrix} r_2(x) & r_2(y) & r_2(z) \\ r_3(x) & r_3(y) & r_3(z) \\ r_4(x) & r_4(y) & r_4(z) \end{pmatrix}; \tag{30}$$

When the inverse of R exists, which is the usual case, Eq. (29) is equivalent to, $$\vec{P} = R^{-1}\frac{\vec{b}_e}{2} - t_0 R^{-1}\vec{f}_e - t_0^2 R^{-1}\vec{g}_e,\ i = 2, 3, 4 \tag{31}$$

where, $$\vec{b}_e \equiv \begin{pmatrix} \|\vec{r}_2\|^2 + (c_1^2 T_1^2 - c_2^2 T_2^2) \\ \|\vec{r}_3\|^2 + (c_1^2 T_1^2 - c_3^2 T_3^2) \\ \|\vec{r}_4\|^2 + (c_1^2 T_1^2 - c_4^2 T_4^2) \end{pmatrix}; \tag{32}$$

$$\vec{f}_e \equiv \begin{pmatrix} T_1 c_1^2 - T_2 c_2^2 \\ T_1 c_1^2 - T_3 c_3^2 \\ T_1 c_1^2 - T_4 c_4^2 \end{pmatrix}; \vec{g}_e \equiv \frac{1}{2}\begin{pmatrix} c_2^2 - c_1^2 \\ c_3^2 - c_1^2 \\ c_4^2 - c_1^2 \end{pmatrix},$$

and where the Cartesian coordinate of $\vec{r}_i$ is $(r_i(x), r_i(y), r_i(z))$. the inverse of R is $R^{-1}$. We form the quantity $\vec{P}^T \vec{P}$ from Eq. (31) to obtain, $$\vec{P}^T \vec{P} \equiv \|\vec{P}\|^2 = \frac{\alpha_1}{4} - \alpha_2 t_0 + (\alpha_3 - \alpha_4) t_0^2 + 2\alpha_5 t_0^3 + \alpha_6 t_0^4, \tag{33}$$

where $$\alpha_1 \equiv (R^{-1}\vec{b}_e)^T (R^{-1}\vec{b}_e)$$

$$\alpha_2 \equiv (R^{-1}\vec{b}_e)^T (R^{-1}\vec{f}_e)$$

$$\alpha_3 \equiv (R^{-1}\vec{f}_e)^T (R^{-1}\vec{f}_e)$$

$$\alpha_4 \equiv (R^{-1}\vec{b}_e)^T (R^{-1}\vec{g}_e)$$

$$\alpha_5 \equiv (R^{-1}\vec{g}_e)^T (R^{-1}\vec{g}_e) \tag{34}$$

Expanding Eq. (28), we get, $$\|\vec{P}\|^2 = c_1^2 (T_1^2 - 2t_0 T_1 + t_0^2), \tag{35}$$

which is substituted into Eq. (33) to yield a quartic equation in $t_0$, $$\alpha_6 t_0^4 + 2\alpha_5 t_0^3 + (\alpha_3 - \alpha_4 - c_1^2) t_0^2 + (2T_1 c_1^2 - \alpha_2) t_0 + \frac{\alpha_1}{4} - c_1^2 T_1^2 = 0. \tag{36}$$

This can be solved for $t_0$ analytically or with a root finder. Valid roots for $t_0$ are substituted into Eq. (31) to obtain the location of the primary point, $\vec{P}$. Some of the roots for Eq. (36) can be invalid because they do not satisfy Eq. (24). This occurs because the algebra involves squaring quantities, and one must remain on the correct branch when trying to un-do the squaring. One can guarantee that the solution for $t_0$ is on the correct branch by requiring each real and non-negative solution of Eq. (36) to obey Eq. (24). Choosing the correct branch for the solution comes up again when discussing the geometry of isosigmachrons (below).

The solution to Eqs. (31) and (36) can lead to ambiguous locations even after removing solutions not obeying Eq. (24). In this case, one requires another datum to decide which ambiguous primary point solution is correct. One can use the location of the source with each ambiguous primary point location to predict $T_i$, i=1, 2, 3, 4. Let the predictions be denoted $\tilde{T}_i$. One can then choose the ambiguous primary point location that minimizes, $$F \equiv \sum_{i=1}^{4} (T_i - \tilde{T}_i)^2. \tag{37}$$

There are many other objective functions that can be used beside F. Alternatively, one could also use the travel time measurement from a fifth receiver to find which ambiguous primary point yields a predicted time closest to that at a fifth receiver.

One can summarize the ambiguities as follows. For three spatial dimensions, one starts with four receivers to determine the location of a primary point in the absence of errors. If ambiguous solutions occur, one can use either the location of the source or the data from a fifth receiver to decide which ambiguous solution for the primary point is correct.

When these equations are utilized for ellipsoidal location, i.e. all speeds of propagation are identical, ambiguous solutions can occur. As above, one can use either the location of the source or the data from a fifth receiver to decide which ambiguous solution for the primary point is correct.

In two spatial dimensions, one starts with three receivers to determine the location of a primary point in the absence of errors. If ambiguous solutions occur, one can use either the location of the source or the data from a fourth receiver to decide which ambiguous solution for the primary point is correct.

For two-dimensional locations, one drops station $\vec{r}_4$ and the datum $T_4$ from the equations above to obtain a solution for the primary point.

2. Solution Using Three-Receiver Constellation and Source Location

There is another way to find an analytical solution for the location of the primary point that uses three receivers instead of four in three dimensions. One uses an equation not used above, namely, $$\|\vec{P} - \vec{s}\|^2 = c_0^2 t_0^2, \tag{38}$$

and subtracting Eq. (28) from Eq. (38) yields, $$\|\vec{P} - \vec{s}\|^2 - \|\vec{P}\|^2 = c_0^2 t_0^2 - c_1^2 (T_1 - t_0)^2.$$

This simplifies to, $$\vec{s}^T \vec{P} = \frac{1}{2} \|\vec{s}\|^2 + \frac{c_1^2 T_1^2}{2} - c_1^2 T_1 t_0 + \frac{1}{2}(c_1^2 - c_0^2) t_0^2. \tag{39}$$

Without loss of generality, use Eq. i=2, 3 from Eq. (29) in addition to Eq. (39) to get, $$Q\vec{P} = \frac{1}{2}\vec{\beta} - t_0 \vec{\rho} - t_0^2 \vec{\gamma}, \tag{40}$$

where, $$Q \equiv \begin{pmatrix} r_2(x) & r_2(y) & r_2(z) \\ r_3(x) & r_3(y) & r_3(z) \\ s(x) & s(y) & s(z) \end{pmatrix}; \tag{41}$$

and, $$\vec{\beta} \equiv \begin{pmatrix} \|\vec{r}_2\|^2 + (c_1^2 T_1^2 - c_2^2 T_2^2) \\ \|\vec{r}_3\|^2 + (c_1^2 T_1^2 - c_3^2 T_3^2) \\ \|\vec{s}\|^2 + c_1^2 T_1^2 \end{pmatrix}; \tag{42}$$

$$\vec{\rho} \equiv \begin{pmatrix} T_1 c_1^2 - T_2 c_2^2 \\ T_1 c_1^2 - T_3 c_3^2 \\ T_1 c_1^2 \end{pmatrix};$$

$$\vec{\gamma} \equiv \frac{1}{2} \begin{pmatrix} c_2^2 - c_1^2 \\ c_3^2 - c_1^2 \\ c_0^2 - c_1^2 \end{pmatrix},$$

and where the Cartesian coordinates of the source are $\vec{s} \equiv (s(x), s(y), s(z))$. The solution for the primary point, $\vec{P}$, is found in a manner analogous to that in the previous section. Eq. (40) is multiplied by $Q^{-1}$, which usually exists, $$\vec{P} = \frac{1}{2} Q^{-1} \vec{\beta} - t_0 Q^{-1} \vec{\rho} - t_0^2 Q^{-1} \vec{\gamma}, \tag{43}$$

and then one forms $\vec{P}^T \vec{P} = \|\vec{P}\|^2$ and equates this to Eq. (35) to yield a quartic equation in $t_0$, $$A_6 t_0^4 + 2 A_5 t_0^3 + (A_3 - A_4 - c_1^2) t_0^2 + (2 T_1 c_1^2 - A_2) t_0 + \frac{A_1}{4} - c_1^2 T_1^2 = 0. \tag{44}$$

where, $$A_1 \equiv (Q^{-1}\vec{\beta})^T (Q^{-1}\vec{\beta})$$

$$A_2 \equiv (Q^{-1}\vec{\beta})^T (Q^{-1}\vec{\rho})$$

$$A_3 \equiv (Q^{-1}\vec{\rho})^T (Q^{-1}\vec{\rho})$$

$$A_4 \equiv (Q^{-1}\vec{\beta})^T (Q^{-1}\vec{\gamma})$$

$$A_5 \equiv (Q^{-1}\vec{\rho})^T (Q^{-1}\vec{\gamma})$$

$$A_6 \equiv (Q^{-1}\vec{\gamma})^T (Q^{-1}\vec{\gamma}) \tag{45}$$

The valid solution for $t_0$ is substituted into Eq. (43) to yield the location of the primary point. Some ambiguous solutions can be eliminated by ensuring that it gives a location on the correct branch by making it obey Eq. (24). If this does not resolve the ambiguity, one needs the travel time collected at a fourth receiver to resolve the ambiguity. The ambiguity is resolved by seeing which ambiguous location yields a travel time closest to that measured by a fourth receiver.

When these equations are utilized for ellipsoidal location, i.e. all speeds of propagation are identical, ambiguous solutions can occur and can be resolved in the same way as above.

For two-dimensional isosigmachronic locations, one drops station $\vec{r}_3$ and the datum $T_3$ from the equations above to obtain a solution for the primary point.

B. Geometry of Isosigmachrons

An isosigmachron is a geometrical shape that facilitates an analytical solution for location. Its geometry is described here.

Let $l_0$ and $l_1$ denote distances from Cartesian coordinates $(-a, 0, 0)$ and $(a, 0, 0)$. An isosigmachron is defined to be the locus of points, $(x, y, z)$ satisfying, $$\frac{l_0}{c_0} + \frac{l_1}{c_1} = T;$$

$$c_0 \neq c_1$$

(46)

where the speeds of propagation are $c_0$ and $c_1$ from $(-a, 0, 0)$ to $(x, y, z)$ and from $(x, y, z)$ to $(a, 0, 0)$ respectively, and where $l_0 = \sqrt{(x+a)^2 + y^2 + z^2}$ and $l_1 = \sqrt{(x-a)^2 + y^2 + z^2}$. When the speeds of propagation are equal, one no longer has an isosigmachron, but rather an ellipsoid. The geometry of isosigmachrons will be described in the x–y plane without loss of generality. Rotating a two-dimensional isosigmachron about the line passing through $(-a, 0)$ and $(a, 0)$ yields the three-dimensional isosigmachron.

With T given by Eq. (24), the Cartesian coordinates of the two-dimensional isosigmachron obey, $$\frac{\sqrt{(x+a)^2 + y^2}}{c_0} + \frac{\sqrt{(x-a)^2 + y^2}}{c_1} = T.$$

(47)

The simplest isosigmachron is one in which $c_0$ and $c_1$ are independent of coordinate. Making this assumption, one employs algebra to yield a polynomial that can be written in two equivalent ways. The first way is, $$d_4 x^4 + d_3 x^3 + d_2 x^2 + d_1 x + d_0 = 0,$$

(48)

where, $$d_4 = -(c_0 - c_1)^2 (c_0 + c_1)^2$$

(49)

$$d_3 = 4a(c_0 - c_1)(c_0 + c_1)(c_0^2 + c_1^2)/c_1^4$$

$$d_2 = \frac{-2}{c_1^4}(3a^2 c_1^4 + y^2 c_1^4 + 3c_0^4 a^2 +$$

$$c_0^4 y^2 - c_0^2 T^2 c_1^4 - c_0^4 T^2 c_1^2 + 2c_0^2 c_1^2 a^2 - 2c_0^2 c_1^2 y^2)$$

$$d_1 = \frac{4a}{c_1^4}(c_0 - c_1)(c_0 + c_1)(c_0^2 a^2 + c_0^2 y^2 - c_0^2 T^2 c_1^2 + a^2 c_1^2 + y^2 c_1^2)$$

$$d_0 = \frac{-1}{c_1^4}(c_0^2 T^2 c_1^2 + a^2 c_1^2 + y^2 c_1^2 + 2c_0 a^2 c_1 + 2c_1 y^2 c_0 + c_0^2 a^2 + c_0^2 y^2)$$

$$(-c_0^2 T^2 c_1^2 + a^2 c_1^2 + y^2 c_1^2 - 2c_0 a^2 c_1 - 2c_1 y^2 c_0 + c_0^2 a^2 + c_0^2 y^2)$$

and the second is, $$e_4 y^4 + e_2 y^2 + e_0 = 0$$

(50)

where, $$e_4 = -(c_0 - c_1)^2 (c_0 + c_1)^2 / c_1^4$$

$$e_2 = \frac{-2}{c_1^4}(x^2 c_1^4 + a^2 c_1^4 + c_0^4 x^2 - 2c_0^4 xa +$$

$$c_0^4 a^2 + 2xac_1^4 - c_0^2 T^2 c_1^4 - c_0^4 T^2 c_1^2 - 2x^2 c_0^2 c_1^2 - 2c_0^2 a^2 c_1^2)$$

$$e_0 = \frac{-1}{c_1^4}(-c_0 c_1 T + c_0 x + c_1 x - c_0 a + c_1 a)(c_0 c_1 T + c_0 x - c_1 x - c_0 a - c_1 a)$$

$$(-c_0 c_1 T + c_0 x - c_1 x - c_0 a - c_1 a)(c_0 c_1 T + c_0 x + c_1 x - c_0 a + c_1 a)$$

The polynomial in x can be simplified by substituting, $$w \equiv y^2,$$

(51)

in Eq. (50) to yield, $$e_4 w^2 + e_2 w + e_0 = 0.$$

(52)

When $e_4$ is not zero, $$w = \frac{-e_2 \pm \sqrt{e_2^2 - 4 e_0 e_4}}{2 e_4}.$$

(53)

After choosing values of x for which w is real and non-negative, one can obtain the solution for y as, $$y = \pm \sqrt{w},$$

(54)

where one needs to choose the proper sign ± in Eq. (53) such that Eq. (24) is obeyed.

When $e_4$ is zero and when $e_2$ is not zero, the solution is, $$y = \pm \sqrt{-e_0/e_2}; \ e_4 = 0 \text{ and } e_2 \neq 0 \text{ and } -e_0/e_2 \geq 0.$$

(55)

The x intercepts for the isosigmachron are given by, $$x = \begin{cases} \dfrac{c_0 c_1 T + a(c_0 - c_1)}{c_0 + c_1} & \text{for } x \geq a \\ \dfrac{-c_0 c_1 T - a(c_1 - c_0)}{c_0 + c_1} & \text{for } x \leq -a \end{cases}$$

(56)

which reduce to the ellipse's x intercepts of $\pm cT/2$ when $c_0 = c_1 = c$. The isosigmachron looks like a skewed ellipse (FIG. 15).

C. Ellipsoidal And Isosigmachronic Location Via Sequential Bound Estimation

Suppose the signal initiating at $\vec{s}$ is received at fewer stations than needed to obtain an unambiguous solution for the location of the primary point $\vec{P}$. Next, suppose another signal is transmitted from another location, $\vec{s}'$, and received, after encountering $\vec{P}$, on possibly a different set of stations.

Consider a situation where the primary point is moving and data of the type in Eq. (24) are measured sequentially in time.

One can use Sequential Bound Estimation to estimate the location of the mobile primary point in the following way. Without loss of generality, assume the geometry is two-dimensional in the x-y Cartesian plane.

1. The datum of travel time from the first receiver, $T_1(t)$, is used to constrain the primary point within a cloud of locations in the plane by using an analytical solution for an ellipse or an isosigmachron. Here, $T_i$ is given by Eq. (24) and t is geophysical time (the time the measurement was taken). The cloud of points is found by varying all relevant variables with a priori probability distributions. Such variables are noise in the measurement, the effective speed of propagation including currents if any, and the locations of the receivers.
2. Find spatial bounds for the location of the primary point from the cloud of locations.
3. A model is used to expand the spatial bounds for the primary point between times t and t+δt, the time at which the next datum, $T_2$, is measured. The expansion of the bounds is made in a manner consistent with the velocity of the primary point.
4. The datum from $T_2(t+\delta t)$ is used to constrain the location of the primary point with a new cloud of locations by using an analytical solution for an ellipse or an isosigmachron like in item 1. The probability distributions of the variables are started anew with a priori distributions but using possibly new bounds as obtained from item 3.

It can be seen that this procedure is sequential, and can be continued until all travel time data are utilized. The procedure is Sequential Bound Estimation because each datum is assimilated using a priori distributions modified by bounds established from previous steps and models.

It can also be seen that one can additionally utilize all bounds from the previous step to constrain the probability distributions of the variables for the next step. For example, suppose the a priori limits for the location of a receiver are larger than the cloud of receiver locations that fit the data. Then one has estimated more accurate limits for that receiver's location. The same procedure can be used to improve estimates for any of the variables, including error in the data, receiver locations, speeds of signal propagation, and locations of the source and primary point. At the end of each step, one has a probability distribution for each of these variables from which any confidence limit or other function of the probability distribution can be obtained. If any of these variables have uncertainties that change with time, or if there is a model that can be used to estimate these variables, those constraints are simple to impose on the variables to transition them to the time of the next datum.

One can use measurements of the direction of the incoming signal at a receiver to constrain the locations of the primary point in the following way. Suppose that a receiver is equipped with an array that measures the incoming signal between the bounds of $\theta_1$ and $\theta_2$ degrees with a probability distribution $F(\theta)$. Suppose that the locus of points along which the primary point resides obeys the equation $y(x, c_0, c_1, \vec{r}_1, \vec{s})$ where $\vec{c}_0$ is the effective speed of propagation from $\vec{s}$ to $(x, y(x))$ (a location on an ellipse or isosigmachron), and $\vec{c}_1$ is the effective speed between $(x, y(x))$ and $\vec{r}_1$. The function, $y(x, c_0, c_1, \vec{r}_1, \vec{s})$, describes an ellipse or an isosigmachron for any particular set of simulated random variables, $\{x, c_0,$ $c_1, \vec{r}_1, \vec{s}\}$. The prior directional information from $F(\theta)$ can be translated into a prior distribution for the variable, x, using, $$F(\theta_j \leq \theta \leq \theta_k) = F(x(\theta_j, c_0, c_1, \vec{r}_1, \vec{s}) \leq x \leq x(\theta_k, c_0, c_1, \vec{r}_1, \vec{s})), \quad (57)$$

where $x(\theta, c_0, c_1, \vec{r}_1, \vec{s})$ is the value of x given the set of random variables $\{\theta, c_0, c_1, \vec{r}_1, \vec{s}\}$. It is assumed that $\theta_j$ and $\theta_k$ represent a small enough interval within $\theta_1$ to $\theta_2$ so that sufficiently accurate estimates can be obtained for the right side in Eq. (57). The function, $x(\theta, c_0, c_1, \vec{r}_1, \vec{s})$, can be obtained numerically or analytically. For example, when $y(x, c_0, c_1, \vec{r}_1, \vec{s})$ is described by an ellipse, $$x = \|\vec{s} - \vec{r}_1\|/2 + \frac{a(1-e^2)\cos\theta}{1+e\cos\theta}, \quad (58)$$

where the semi-major and minor axes of the ellipse are a and b respectively, and the eccentricity is $e = \sqrt{1-b^2/a^2}$. The x axis in Eq. (58) is defined to pass through $\vec{s}$ and $\vec{r}_1$. If this does not correspond to the axes of the original problem, it can be transformed back to the unshifted and unrotated Coordinate frame using a transformation of coordinates. To further help the reader understand how to use Eq. (58), suppose it is known, for simplicity, that $F(\theta)$ is distributed according to a truncated Gaussian distribution. One can generate a truncated Gaussian distribution between $\theta_1$ and $\theta_2$ with some mean, and put these random variables for θ into Eq. (58) to obtain the corresponding random variables for x. Thus the priori distribution of arrival angle is incorporated into the distribution of random variables in x, which in turn is used to generate a consistent set of points for the cloud of locations for the primary point.

Applications of this idea can be used by the Navy who sometime locate ships in the sea by measuring the travel time of sound from a source to a point of interest such as a submarine and back to an acoustic receiver. There are other applications for location of this type that occur in medicine when one uses sound to insonify the body, and the travel time to a receiver is measured after reflecting from the body's interior. Another application includes the use of sound for geophysical mapping of the Earth, or for the exploration of oil.

It is important to note that no linear approximation has been made and one is sequentially processing data without any difficulty for realistic probability distributions for all the variables that come into play.

IX. ELLIPSOIDAL AND ISOSIGMACHRONIC LOCATION: EXPERIMENT

On 12 Apr. 2003 an experiment was conducted at 6 Derring Dale Rd, Radnor, Pa. to collect data for the purpose of verifying the new methods for locating a primary point using ellipsoidal or isosigmachronic techniques. An approximate Cartesian x'-y' grid was drawn using chalk on a blacktop with the x' and y' axes extending for 9.1 and 6.7 m respectively. The angle between the x' and y' axes was estimated as follows. The distance between a point on the x' axis to a point on the y' axis was measured with a steel tape, and then the law of cosines was used derive the angle by also using the distances of the sides of the triangle along the x' and y' axes respectively. The procedure was done for two sets of measurements to yield estimates of 89.48° and 89.22° for the angle between the primed axes. Their average of 89.35° degrees was used for the remaining calculations. Conversion to a Cartesian x–y grid was made from the primed reference frame using trigonometry.

The locations of the source, primary point, and each of five stations were marked with chalk on the grid. A steel tape measure was used to measure distances along the primed axes and to measure the locations of the source, primary point, and stations. The locations of points not on the x' or y' axes were estimated by measuring their distances from three different points on the x' or y' axes, and then using the law of cosines to provide two different estimates of the same location. The difference between the two estimates provided information on the accuracy of each location. Remaining values for locations are converted to the Cartesian grid using trigonometry (Table VIII).

TABLE VIII

| LOCATION | (x, y) (m) |
| --- | --- |
| SOURCE | (0.0034, 0.305) |
| PRIMARY POINT | (4.538, 4.971) |
| STATION 1 | (1.219, 0) |
| STATION 2 | (5.182, 0) |
| STATION 3 | (9.144, 0) |
| STATION 4 | (0.0692, 6.096) |
| STATION 5 | (7.373, 4.185) |

Errors for the locations in Table VIII are modeled as being mutually uncorrelated Gaussian random variables with means of zero and standard deviations of 0.06 m, 0.06 m, and 0.15 m respectively for the x, y, and z Cartesian coordinates respectively except as follows. The location of station one has zero error as it defines the origin of the coordinate system. All errors are truncated at one standard deviation.

The time for signal propagation between the source and primary point plus primary point to each station was measured by timing the author's walking time-of-travel along each route with a Radio Shack model 63-5017 stopwatch (Table IX). The time between the source and primary point was measured five times. The walking time was measured between the primary point and each station. Each of these measurements was taken four or five times. Repetitions of the times were important for estimating errors. To eliminate the changes in transit times that arise from walking the corner at the primary point, the inventor measured the times of each walk in a straight line and added two timings together to get the time from the source to primary point plus primary point to each station. To further reduce errors due to the change in speed from a standstill, the inventor started the walk a few steps before each starting point and walked through each ending point always striving to maintain a steady speed. The inventor did not look at the stopwatch to start and end its interval timer. Rather, the inventor looked at the chalk marks on the ground to initiate start and stop times. The values in Table IX are averages of the four to five separate measurements. The largest deviation in walking time between the four to five separate measurements was 0.2 s. The errors in the travel times for the location algorithm were modeled as mutually uncorrelated Gaussian random variables with means given by Table IX and standard deviations of 0.22 s. The distributions were truncated at one standard deviation.

To convert times to distances, it is necessary to estimate the speed of walking. The author measured his speed over a straight line of 7.925 m ten separate times, again using a stopwatch. The average speed was 1.481 m/s with largest deviation being 0.098 m/s. The location algorithm assumed the speed of walking was 1.481 m/s with a Gaussian random error of 0.15 m/s and truncated at one standard deviation. Thus the error in speed was probably slightly overestimated for the sake of caution.

TABLE IX

| DESTINATION | TIME (s) |
| --- | --- |
| STATION 1 | 8.375 |
| STATION 2 | 7.695 |
| STATION 3 | 8.814 |
| STATION 4 | 7.465 |
| STATION 5 | 6.355 |

A. Four Receiver Constellation

There are five ways of choosing four stations from a total of the five in Table VIII. For each four-receiver (station) constellation, up to 500,000 Monte-Carlo simulations were run to estimate locations for the primary point (Table VIII) from the measured times of travel (Table IX) using Eqs. (31) and (36). The a priori bounds for the primary point were set at x: 0 to 20 m; y: 0 to 30 m; z: −0.2 to +0.2 m. For isosigmachronic location, the 100% confidence limits for the primary point are x: 3.81 to 5.29 m; y: 3.77 to 7.17 m; z: −0.20 to 0.29 m. The 95% confidence limits for the primary point are x: 4.11 to 5.10 m; y: 4.06 to 5.95 m; z: −0.19 to 0.19 m. Both are consistent with the location of the primary point (Table VIII).

For ellipsoidal location, the 100% confidence limits for the primary point are x: 4.14 to 5.09 m; y: 4.24 to 5.98 m; z: −0.2 to +0.2 m. The 95% confidence limits for the primary point are x: 4.27 to 4.93 m; y: 4.35 to 5.61 m; z: −0.19 to +0.19 m. Both are consistent with the location of the primary point (Table VIII). In general, however, ellipsoidal location need not be consistent with the measured value of the primary point when the speed of propagation is inhomogeneous.

B. Three-Receiver Constellation and Source Location

There are ten ways of choosing three stations from a total of five in Table VIII. For each three-receiver (station) constellation plus source location, up to 500,000 Monte-Carlo simulations were run to estimate locations for the primary point (Table VIII) from the measured times of travel (Table IX) using Eqs. (43) and (44). The a priori bounds for the primary point were set at x: 0 to 20 m; y: 0 to 30 m; z: −0.2 to +0.2 m. For isosigmachronic location, the 100% confidence limits for the primary point are x: 3.78 to 5.22 m; y: 3.99 to 5.74 m; z: −0.20 to +0.20 m. The 95% confidence limits for the primary point are x: 4.01 to 5.00 m; y: 4.22 to 5.56 m; z: −0.19 to +0.19 m. Both are consistent with the location of the primary point (Table VIII).

For ellipsoidal location, the 100% confidence limits for the primary point are x: 4.16 to 5.08 m; y: 4.25 to 5.73 m; z: −0.20 to +0.20 m. The 95% confidence limits for the primary point are x: 4.22 to 4.98 m; y: 4.36 to 5.60 m; z: −0.19 to +0.19 m. Both are consistent with the location of the primary point (Table VIII). In general, however, ellipsoidal location need not be consistent with the measured value of the primary point when the speed of propagation is inhomogeneous.

C. Sequential Location From Under-Determined Systems

The method given in Section VIII, subsection C above is applied to this experiment to demonstrate its efficacy. The same errors and locations are assumed as above.

First, the travel time at R1 is combined with the estimate of the direction toward the primary point to obtain the cloud of locations given by small dots in FIG. 16. A two-dimensional approximation is used for this experiment so the cloud of points come from a two-dimensional isosigmachron. The direction from R1 toward the primary point was estimated by eye to be within 15° to 40° degrees True where the y axis is assumed to point North. The a priori distribution of this angle is assumed for simplicity to be uniformly distributed between these angular limits. Eq. (58) is used to generate random values of x in a rotated coordinate frame from the uniformly distributed values of θ. Compared with a priori limits for the primary point of x: 0 to 20 m, y: 0 to 30 m, the cloud in FIG. 16 have limits of x: 4.05 to 5.50 m and y: 3.90 to 5.90 m.

Next, Sequential Bound Estimation is used to estimate the next cloud of primary point locations. The a priori Cartesian limits are those from the end of the last step, namely x: 4.05 to 5.50 m and y: 3.90 to 5.90 m. Then, the travel time and directional information from R2 is used to find realizations of primary point locations (FIG. 17). The direction toward the primary point is estimated by eye from R2 to be between 340° and 358° degrees True. The cloud in FIG. 17 has Cartesian limits of x: 4.11 to 5.09 m, and y: 3.91 to 5.82 m. These are less than the limits before and are consistent with the location of the primary point (Table VIII).

X. ELLIPSOIDAL AND ISOSIGMACHRONIC LOCATION: CONCISE DESCRIPTION

This section concisely describes the inventions as they relate to ellipsoidal and isosigmachronic location and Sequential Bound Estimation. The word "station" can refer to either a source or a receiver as discussed in the previous discussions on ellipsoidal and isosigmachronic location.

Referring to FIG. 4 for isosigmachronic location, travel times are collected from a constellation of stations 200. Estimates for the speed of the signal are obtained between the primary point and each station 210. When advection of the medium does not significantly affect the delay of the signal between the stations and the primary point, one computes the location of the primary point using an analytical formula 230. When isosigmachronic location is implemented the effective speed of propagation is different among some of the paths. It is possible that the analytical equation for isosigmachronic location does not yield a real valued solution. This can happen when estimates of the speeds of propagation and station locations are not close enough to their true values.

Attention now turns to FIG. 5 for a discussion of iteration. If the effects of advection due such things as winds or currents significantly affect the time of travel between the primary point and a station, a bound for the location of the primary point is established 240. Because the actual location of the primary point is unknown, the precise travel time change between the primary point and each station due to advection is initially unknown. So a guess is made within the bounds for the location of the primary point 250. The effective speed between the primary point and each station is computed using the vector projection of the advection along the straight line between the primary point and each station. The effective speed also includes the non-advective component of speed 260. For example, the speed of sound may be 330 m/s, while the effects of the winds are +1 m/s from the primary point to station one. The effective speed from the primary point to station one is therefore 330+1=331 m/s.

The location of the primary point is estimated using an analytical formula given the effective speeds. If this location is close enough to the most recent guess for this location, one exits the iterative procedure with a solution for the location of the primary point 280. Otherwise, the analytical solution for the location of the primary point is used to compute another set of effective speeds to each station until the convergence criterion is either met 280 or exceeded 290. In practical application of this idea, convergence is usually obtained after one or two iterations.

Like Sequential Bound Estimation, this algorithm can detect problems with the data, or assumptions about the variables by yielding no solutions for the location of the primary point. The process stops if such problems are encountered. Problems can be found at step 230.

In a related invention now refer to FIG. 18. In this case, the goal is to estimate any function of the probability distribution of any variable playing a role in isosigmachronic location. The variables are the arguments of a nonlinear function for location and the value of a nonlinear function. Travel times are estimated from a number of stations equal to or exceeding the number in a constellation 400. Prior bounds are established for all variables 410. Optionally, a database of travel times is used to establish possibly smaller bounds for the location of the primary point 460, 470.

If the number of stations equals the number in a constellation, probability distributions are assigned to each variable within prior bounds except for the location of the primary point that is nonlinearly related to the other variables 420. Realizations of primary points are obtained by applying an analytical solution for the location of the primary point to realizations of arguments of the nonlinear function using a Monte-Carlo technique 430. Realizations leading to primary points outside of assigned bounds are excluded from further consideration 430. The remaining realizations are used to form any function of the probability distribution of any variable 450.

Realizations of primary points here includes the possibility that advection can alter the travel times enough to represent a significant effect. In this case, one iterates the analytical solution until convergence is achieved or until convergence is not achieved, and the realization is discarded. Details of iterating the analytical solution are described in FIG. 5.

Like Sequential Bound Estimation, this algorithm can detect problems with the data, or problems concerning assumptions about the variables by yielding no solutions for the location of the primary point. The process stops if no realizations are obtained for the primary point 460, 480, 430. The algorithm halts execution if posterior bounds are inconsistent with prior bounds 480 from different steps of Sequential Bound Estimation.

Returning again to FIG. 18, another related invention is estimating any function of the probability distribution of any variable playing a role in ellipsoidal location. The method is the same as used for isosigmachronic location except as follows.

The effective speed of propagation between the primary point and each station must be the same value for any particular realization. Naturally, the single value of the effective speed used for realization j can be allowed to differ from that for realization k at the stage where the Monte-Carlo technique is implemented. If travel times are significantly affected by advection, the bounds for the effective speed can be modified to attempt to account for some of this effect as follows. Let the magnitude of velocity due to advection be $|U_{max}|$. When bounds are chosen for the effective speed for each path, instead of using upper and lower bounds respectively for the unadvected speeds of propagation, $\hat{c}$ and $\check{c}$, one can use bounds for the effective speed, $\hat{\mu}$ and $\check{\mu}$, such as, $$\hat{\mu} = \hat{c} + |U_{max}| \quad (59)$$

$$\check{\mu} = \check{c} - |U_{max}| \quad (60)$$

Naturally, one uses equations such as these only for signals that are affected by advection like sonic signals, since the speed of electromagnetic waves is unaffected by advection. It is also important to note that the analytical solutions for ellipsoidal locations exist that do not require iteration of the analytical solution. Two such solutions are given Eqs. (31,36) and (43,44) where all coefficients are evaluated with the same value for the effective speed of propagation. Other methods for finding the primary point by intersecting ellipses are found elsewhere (Eberly, Magic Software, Inc., http://www.magic-software.com, Oct. 10, 2000). In this invention, the phrase "primary function" is the function whose arguments include the sums of travel times, the locations of stations, and the speed of propagation. This function may be linear (Eberly, 2000) or nonlinear. This function may also include other variables.

In a related invention now refer to FIG. 19. The travel time of a signal and its incoming direction from a primary point are estimated at a station 600. Prior bounds are established for all variables including the speed of propagation, advective effects such as currents (if significant), the location of the station, the location of the source of the signal, and errors of the data 610. For ellipsoidal location, one accounts for significant effects of advection on the travel time using the method in the previous paragraph. For isosigmachronic location, one may use the iterative procedure from FIG. 5 to iterate analytical solutions for location. These are the variables that are "functionally affecting" the location of the primary point.

Probability distributions are assigned to each variable except for the location of the primary point which is related to the other variables through a primary function 620. Statistical information regarding the direction of the incoming signal can be transformed to a Cartesian coordinate for later use via expressions such as Eq. (57) or (58). Other coordinate systems could be used to make this transformation. Realizations for the location of the primary point are simulated from the probability distributions of the other variables using a Monte-Carlo technique 630. Ellipsoidal locations use identical speeds of signal propagation for all paths within any one realization, though that speed may differ from one realization to the next. For isosigmachronic locations, the speed of signal propagation is allowed to differ among different paths within any single realization.

The only realizations that are used are those falling within the spatial bounds for the primary point 630. The posterior bounds for the primary point are estimated from the realizations 650. Optionally, one can obtain any function of the probability distributions of any variable at 660. If there are more data to assimilate, one employs Sequential Bound Estimation 670. Otherwise, the algorithm exits with the requested information 680. The procedure can be used with either ellipsoidal or isosigmachronic geometry.

This algorithm can detect problems with the data, or assumptions about the variables by yielding no solutions for the location of the primary point. These problems stop the algorithm 630 and 670. The algorithm stops if bounds associated with one step are inconsistent with those from another step 670.

The procedure in FIG. 19 has application to locating ships and other objects at sea with active sonar. When implemented for a two-dimensional geometry, the algorithm requires about 10 seconds to run on a personal computer. The three-dimensional implementation of ellipsoidal or isosigmachronic location requires significantly more computer time.

XI. DESCRIPTION OF OPERATION AND GENERAL CONTENT OF COMPUTER PROGRAM LISTINGS

The following software is submitted as part of this application as a computer program listing appendix on CDROM with a duplicate copy.

1. drawisosigma.m: Matlab code which draws ellipse and isosigmachron in two dimensions. Parameters for the geometrical shapes are defined at the top of the program. To run the program, start matlab and type the name of this script file.
2. isodiachron.m: Matlab code which draws an isodiachron and a hyperbola in two dimensions. Parameters for the geometrical shapes are defined near the top of the program. To run the program, start matlab and type the name of this script file.
3. boundP_2d.m: Matlab main script file. Does 2-D ellipsoidal or isosigmachronic location for one receiver at a time. The receiver has directional information about the primary point. Program has several ascii input files that supply data and modes for its operation. This program is used to do sequential bound estimation if desired. Program starts by starting matlab and typing boundP_2d.m. It calls the following matlab script files:
   (a) comb1.m: Computes the number of ways of selecting M things from K bins without replacement.
   (b) genarr.m: Generates arrangements of K things taken M at a time.
   (c) getisosigma.m: This generates (x,y) points on the isosigmachron or ellipse.
   (d) getx_rv.m: Gets random values of x from directional information to the primary point from a receiver. These values of x are later used to obtain (x,y) points on an ellipse or isosigmachron.
   (e) plot_tbounds.m: plots the bounds for the primary point as a function of constellation number for 2-D locations.
   (f) usedirninfo.m: Uses directional information at receiver to retain only realizations of (x,y) for the primary point that are consistent with the directional information.
4. boundP_3d.m: Main matlab program. Can do Sequential Bound Estimation for ellipsoidal or isosigmachronic locations using constellations of four stations. It uses an analytical solution for location, and can iterate analytical solution if there are advective effects. Program has several ascii input files that supply data and modes for its operation. The program is started by starting matlab and typing the program name. It calls the following matlab script files plus some others that have been listed already:
   (a) PU_lim.m: Gets the P % confidence limits for the winds using all constellations.
   (b) Pcc_lim.m: Gets the P % confidence limits for each speed of sound between the primary point and each receiver using all constellations and between the source and primary point.
   (c) Precpos_lim.m: Gets the P % confidence limits for coordinates of the receivers using all constellations.

(d) Ptxyz.m: Gets the P % confidence limits for each of x, y, and z for the primary point from each constellation of receivers.
(e) Pxyz.m: Gets the P % confidence limits for each of x, y, and z for the source from each constellation.
(f) chkint_type.m: Checks if the bounds for a parameter yield at least one physical location from their intersections.
(g) confidlim.m: Computes P percent confidence limits for a one-dimensional variable, x.
(h) funl.m: Used to compute the value of a quartic polynomial.
(i) getrvar.m: Gets random variables for a realization.
(j) plot_c.m: plots the bounds for the speed of sound between the primary point and each receiver and between the source and the primary point.
(k) plt_U.m: This plots the bounds for the spatially homogeneous winds as a function of constellation number used.
(l) plt_reclim.m: This plots the bounds for the receiver coordinates as a function of constellation.
(m) plt_sourcelim.m: This plots the bounds for the source location as a function of constellation.
(n) plt_tbnds.m: This plots the bounds for the primary point as a function of constellation.
(o) sign_chg.m: Is used to aid in location of finding roots of polynomials for high precision root finding.
(p) sol_quartic$_{isosig}$_location.m: Provides solution to analytical equations for quartic equation. Used for isosigmachronic location and for ellipsoidal location.
5. boundP.m: Can implement Sequential Bound Estimation for ellipsoidal and isosigmachronic locations in three dimensions using constellations of three receivers and one source. Program has several ascii input files that supply data and modes for its operation. It is a matlab program which can be started by starting matlab and typing boundP.m. It has several ascii input files that provide it data and tell it what to do. It calls the following programs that have not yet been listed above:
(a) comp1.m: Finds the compliment of the values in a vector. Values in the vector can be 0 or 1.
(b) ranint.m: Generates N independent uniformly distributed integers.
(c) sol_quartic_isosig_loc.m: Solves quartic or quadratic equation for isosigmachronic or ellipsoidal location in three dimensions.
6. boundsposit_4rec_d.m: Uses isodiachronic or hyperbolic location to implement Sequential Bound Estimation. This program can use a synthetic database of travel time differences to aid in finding location of the primary point. To run this program, ascii input files are made containing data and instructions for the program. Once these files are made, the program is started by starting matlab, and typing boundsposit_4rec_d.m. It calls the following new matlab script files that have not been listed above:
(a) removepair.m: Is used to remove receivers that are not desired for locating the primary point.
(b) getsrcbnds.m: Finds spatial bounds for the primary point from a synthetic database of differences in travel time.
(c) sbnds_ttdgroup.m: Called by getsrcbnds.m.
(d) unpack_binmatch.m: Called by sbnds_ttdgroup.m.
(e) bin_numb_to_coord.m: Called by sbnds_ttdgroup.m.
(f) getrv.m: Forms many of the random variables for the Monte-Carlo realizations.
(g) solve_quartic_location.m: Provides solution to analytical equation for the quartic equation for isodiachronic geometry. Also provides solution when the equation involves hyperbolic geometry.
(h) plt_sbnds.m: Plots bounds for the location of the primary point as a function of constellation number.
(i) plt_c.m: This plots the bounds for the speed of sound between the primary point and each station.
(j) Pc_lim.m: Gets the P % confidence limits for each speed of sound between the primary point and each station.

Conclusions, Ramifications, and Scope

Thus the reader will see the utility of using the methods for computing probability distributions and bounds for many types of location problems. The methods are robust and incorporate realistic prior distributions of error including locations of the stations, errors in the measurements, errors in the speed of propagation, and errors related to the models of winds and currents that may significantly affect the data. The methods do not make the ubiquitous linear approximation for obtaining bounds or probability distributions. Instead, the methods incorporate nonlinearity of a problem without approximation.

When the speeds of propagation differ between a primary point and at least two stations, locations from differences in times can be estimated using a new geometrical surface called an "isodiachron." An isodiachron is the locus of points on which the difference in travel time is constant. It is possible to use the idea of isodiachrons to obtain analytical solutions for location thus reducing the computational effort required to obtain bounds and probability distributions for location.

When the speeds of propagation differ between a primary point and at least two stations, locations can be made from measured travel times that traverse these three points. Analytical solutions for location can make use of a new geometrical surface called an "isosigmachron." It is defined to be the locus of points on which the sum of travel times is constant. The analytical solutions for location reduce the computational effort required to obtain bounds and probability distributions for location.

A new method called "Sequential Bound Estimation" is introduced for obtaining bounds or probability distributions of location for hyperbolic, isodiachronic, ellipsoidal, isosigmachronic, or spherical location. It has the advantage of being able to handle fully nonlinear relationships between location and the measurements and other variables without making any linearizing approximation. Furthermore, it can handle data or model evolution in a sequential manner without restricting any parameters or variables to be Gaussian. In fact, the prior distributions of the measurements and variables can be realistic, which leads to more realistic estimates than obtained from prior art.

Sequential Bound Estimation can be applied to problems involving data and variables through a primary function. Such problems arise in many fields in navigation and location.

Sequential Bound Estimation can be applied in other fields such as those dealing with the control of systems and machinery, robotics, and both linear and nonlinear geophysical inversion methods.

It is important to mention that the methods in this invention apply when the locations of a source and receivers are interchanged. When there are no effects from advection, the reciprocity theorem guarantees the field at the source is identical to that at a receiver. When advection plays a significant role, the techniques for locating a primary point are the same. It is also important to point out that if one estimates travel times, differences, or sums of travel time, that the travel times can be obtained in many different ways such as with transponders. The methods given in this invention apply to obtaining the data in different ways.

In the foregoing specification, the estimation methods and location techniques have been described with reference to specific exemplary embodiments thereof. These techniques are considered to have been described in such full, clear, concise and exact terms as to enable a person of ordinary skill in the art to make and use the same. It will be apparent to those skilled in the art, that a person understanding the method for obtaining bounds or probability distributions for location may conceive of changes or other embodiments or variations, which utilize the principles of this invention without departing from the broader spirit and scope of the invention as set forth in the appended claims. All are considered within the sphere, spirit, and scope of the invention. The specification and drawings are, therefore, to be regarded in an illustrative rather than restrictive sense. Accordingly, it is not intended that the invention be limited except as may be necessary in view of the appended claims, which particularly point out and distinctly claim the subject matter Applicants regard as their invention.

What is claimed is:

1. A method of computer-estimating at least one function of a probability distribution of at least one variable, wherein said at least one variable is an output or at least one of the arguments of a primary function, and wherein at least one of said arguments of said function has multiple data values that are separated into at least two groups and processed sequentially, the method comprising using available information concerning:
   (i) prior bounds for said data values of said at least one argument and said primary function; and
   (ii) prior probability distributions within said prior bounds for all of said arguments of said primary function;
automatically, with a computer, sequentially processing the data values by:
   (a) generating realizations of said primary function from realizations of said arguments drawn from the respective prior probability distributions for said arguments;
   (b) determining at least one posterior bound among said realizations of said primary function and said arguments;
   (c) stopping said sequential processing when there are fewer than a predetermined minimum number of acceptable realizations of said primary function generated that are within said prior bounds for said primary function;
   (d) stopping said sequential processing when said at least one posterior bound is inconsistent with the prior bound corresponding thereto; and
   (e) after said data values are sequentially processed, determining at least one final bound among said realizations of said primary function and said arguments, and using said at least one final bound to define the estimated function of said probability distribution of said at least one variable.

2. A computing device programmed to perform a method of estimating at least one function of a probability distribution of at least one variable, wherein said at least one variable is an output or at least one of the arguments of a primary function, and wherein at least one of said arguments of said function has multiple data values that are separated into at least two groups and processed sequentially, the method comprising using available information concerning:
   (i) prior bounds for said data values of said at least one argument and said primary function; and
   (ii) prior probability distributions within said prior bounds for all of said arguments of said primary function;
automatically sequentially processing the data values by:
   (a) generating realizations of said primary function from realizations of said arguments drawn from the respective prior probability distributions for said arguments;
   (b) determining at least one posterior bound among said realizations of said primary function and said arguments;
   (c) stopping said sequential processing when there are fewer than a predetermined minimum number of acceptable realizations of said primary function generated that are within said prior bounds for said primary function;
   (d) stopping said sequential processing when said at least one posterior bound is inconsistent with the prior bound corresponding thereto; and
   (e) after said data values are sequentially processed, determining at least one final bound among said realizations of said primary function and said arguments, and using said at least one final bound to define the estimated function of said probability distribution of said at least one variable.

3. A computer-readable non-transitory storage medium storing a set of computer instructions that, when executed by a computing device, performs a method of estimating at least one function of a probability distribution of at least one variable, wherein said at least one variable is an output or at least one of the arguments of a primary function, and wherein at least one of said arguments of said function has multiple data values that are separated into at least two groups and processed sequentially, the method comprising using available information concerning:
   (i) prior bounds for said data values of said at least one argument and said primary function; and
   (ii) prior probability distributions within said prior bounds for all of said arguments of said primary function;
automatically, with the computing device, sequentially processing the data values by:
   (a) generating realizations of said primary function from realizations of said arguments drawn from the respective prior probability distributions for said arguments;
   (b) determining at least one posterior bound among said realizations of said primary function and said arguments;
   (c) stopping said sequential processing when there are fewer than a predetermined minimum number of acceptable realizations of said primary function generated that are within said prior bounds for said primary function;
   (d) stopping said sequential processing when said at least one posterior bound is inconsistent with the prior bound corresponding thereto; and
   (e) after said data values are sequentially processed, determining at least one final bound among said realizations of said primary function and said arguments, and using said at least one final bound to define the estimated function of said probability distribution of said at least one variable.

* * * * *